US007813916B2

(12) United States Patent
Bean

(10) Patent No.: US 7,813,916 B2
(45) Date of Patent: Oct. 12, 2010

(54) ACQUISITION AND APPLICATION OF CONTEXTUAL ROLE KNOWLEDGE FOR COREFERENCE RESOLUTION

(75) Inventor: David L. Bean, West Bountiful, UT (US)

(73) Assignee: University of Utah, Salt Lake City, UT (US)

( * ) Notice: Subject to any disclaimer, the term of this patent is extended or adjusted under 35 U.S.C. 154(b) by 918 days.

(21) Appl. No.: 10/994,196

(22) Filed: Nov. 18, 2004

(65) Prior Publication Data

US 2009/0326919 A1 Dec. 31, 2009

Related U.S. Application Data

(60) Provisional application No. 60/523,209, filed on Nov. 18, 2003.

(51) Int. Cl.
*G06F 17/27* (2006.01)

(52) U.S. Cl. .................................. 704/9; 704/1; 704/10

(58) Field of Classification Search ..................... 704/9, 704/1, 10; 707/2-6
See application file for complete search history.

(56) References Cited

U.S. PATENT DOCUMENTS 4,661,924 A 4/1987 Okamoto et al.
4,965,763 A 10/1990 Zamora ....................... 364/900
4,992,972 A 2/1991 Brooks et al. ............... 364/900
5,146,405 A 9/1992 Church ........................ 364/419
5,424,947 A 6/1995 Nagao et al. ........... 364/419.08
5,475,587 A 12/1995 Anick et al. ........... 364/419.08
5,614,899 A 3/1997 Tokuda et al. ................. 341/51
5,696,916 A 12/1997 Yamazaki et al. ........... 395/356
5,708,822 A * 1/1998 Wical ............................ 704/1

(Continued)

FOREIGN PATENT DOCUMENTS

WO WO 98/24016 6/1998

(Continued)

OTHER PUBLICATIONS

Carbonell et al., Anaphora Resolution: A Multi-Strategy Approach, Apr. 15, 1988, Proceedings of the 12 conference on Cmputational linguistics, vol. 1, p. 96-101.*

(Continued)

*Primary Examiner*—David R Hudspeth
*Assistant Examiner*—Lamont M Spooner
(74) *Attorney, Agent, or Firm*—Workman Nydegger

(57) ABSTRACT

Coreference resolution is the process of identifying when two noun phrases (NP) refer to the same entity. Two main contributions to computational coreference resolution are made. First, this work contributes a new method for recognizing when an NP is anaphoric. Second, traditional approaches to coreference resolution typically select the most appropriate antecedent by recognizing word similarity, proximity, and agreement in number, gender, and semantic class. This work contributes a new source of evidence that focuses on the roles that an anaphor and antecedent play in particular events or relationships. I show that using contextual role knowledge as part of the coreference resolution process increases the number of anaphors that can be resolved, and I demonstrate an unsupervised method for acquiring contextual role knowledge that does not require an annotated training corpus. A probabilistic model based on the Dempster-Shafer model of evidence is used to incorporate contextual role knowledge with traditional evidence sources.

19 Claims, 25 Drawing Sheets

Architectural Overview of BABAR

U.S. PATENT DOCUMENTS

| | | | | |
|---|---|---|---|---|
| 5,799,268 | A | 8/1998 | Boguraev | 704/9 |
| 5,802,504 | A | 9/1998 | Suda et al. | 706/11 |
| 5,844,798 | A | 12/1998 | Uramoto | 364/419.02 |
| 5,878,385 | A | 3/1999 | Bralich et al. | 704/9 |
| 5,890,103 | A | 3/1999 | Carus | |
| 5,901,068 | A | 5/1999 | Batchilo et al. | 364/512 |
| 5,963,940 | A | 10/1999 | Liddy et al. | |
| 6,056,428 | A | 5/2000 | Devoino et al. | 364/512 |
| 6,102,969 | A | 8/2000 | Christianson et al. | |
| 6,167,370 | A | 12/2000 | Tsourikov et al. | 704/9 |
| 6,202,043 | B1 | 3/2001 | Devoino et al. | 703/17 |
| 6,304,870 | B1 | 10/2001 | Kushmerick et al. | |
| 6,343,266 | B1 * | 1/2002 | Paul et al. | 704/9 |
| 6,405,162 | B1 | 6/2002 | Segond et al. | |
| 6,859,931 | B1 * | 2/2005 | Cheyer et al. | 719/317 |
| 7,490,092 | B2 * | 2/2009 | Sibley et al. | 707/100 |
| 2003/0149586 | A1 | 8/2003 | Chen et al. | |
| 2004/0078750 | A1 | 4/2004 | Frank | |
| 2004/0128615 | A1 | 7/2004 | Carmel et al. | |
| 2005/0086592 | A1 * | 4/2005 | Polanyi et al. | 715/512 |
| 2005/0216443 | A1 * | 9/2005 | Morton et al. | 707/3 |

FOREIGN PATENT DOCUMENTS

| | | | |
|---|---|---|---|
| WO | WO 99/18527 | 4/1999 | 364/488 |
| WO | WO 00/14651 | 3/2000 | 704/9 |
| WO | WO 00/46703 | 8/2000 | 703/2 |

OTHER PUBLICATIONS

Kehler, Probabilistic Coreference in Information Extraction, 1997, Proceedings of the Second Conference on Empirical Methods in Natural Language Processing, p. 1-11.*

Altmann, Thematic Role Assignment in Context, 1999, Journal of Memory and Lnaguage 41, pp. 124-145.*

Modjeska, Lexical and grammatical role constraints in resolving other-anaphora, 2002, Citeseer, Proc. of DAARC 2002, pp. 129-134.*

Baldwin, CogNIAC: high precision coreference with limited knowledge and linguistic resources, 1997, ACL, Proceedings of a Workshop on Operational Factors in Practical, Robust Anaphora Resolution for Unrestricted Texts, pp. 38-45.*

Ng et al., Improving Machine Learning Approaches to Coreference Resolution, Jul. 2002, ACL, Proceedings of the 40th Annual Meeting of the Association for Computational Linguistics, pp. 104-111.*

Riloff, Ellen, "Automatically Constructing A Dictionary for Information Extraction Tasks", Proceedings of the Eleventh National Conference on Artificial Intelligence (1993), pp. 811-816.

Riloff, Ellen, "Automatically Generating Extraction Patterns from Untagged Text", Proceedings of the Thirtheenth National Conference on Artificial Intelligence (1995), pp. 1044-1049.

Riloff, Ellen, "Using Learned Extraction Patterns for Text Classification", Connectionist, Statistical and Symbolic. Approaches to Learning for Natural Language Processing (1996), pp. 275-289.

Riloff, Ellen, "Little Words Can Make a Big Difference for Text Classification", Proceedings of the 18$^{th}$ Annual International ACM SIGIR Conference on Research and Development in Information Retrieval, pp. 130-136, 1995.

Riloff, Ellen and Schmelzenbach, Mark, "An Empirical Approach to Conceptual Case Frame Acquisition", Proceedings of the Sixth Workshop on Very Large Corpora (1998), 8 pages.

* cited by examiner

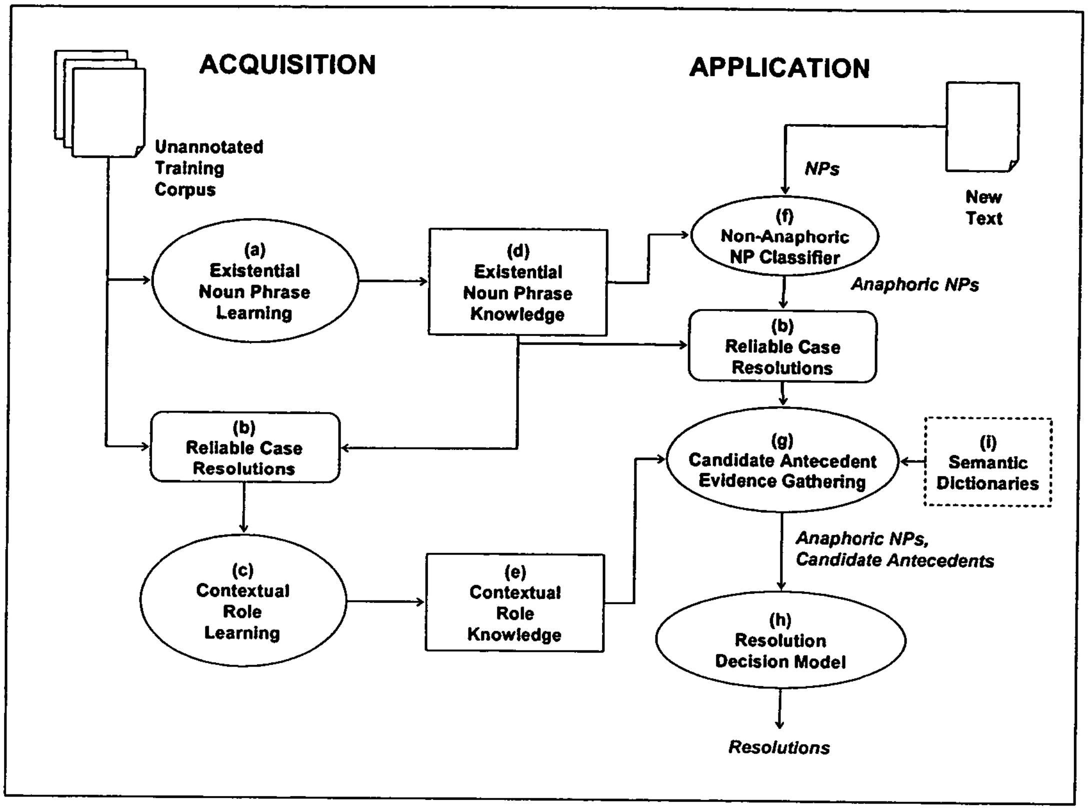
Figure 1 – Architectural Overview of BABAR

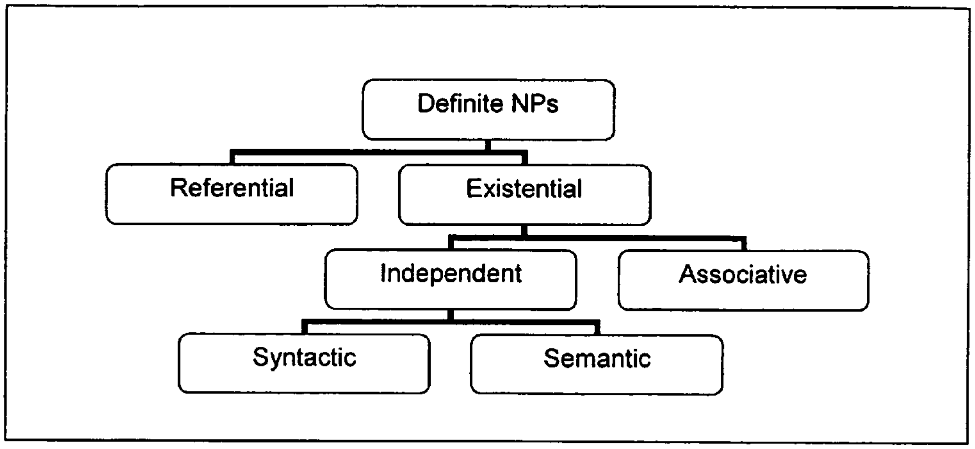
Figure 2 – Definite NP Taxonomy
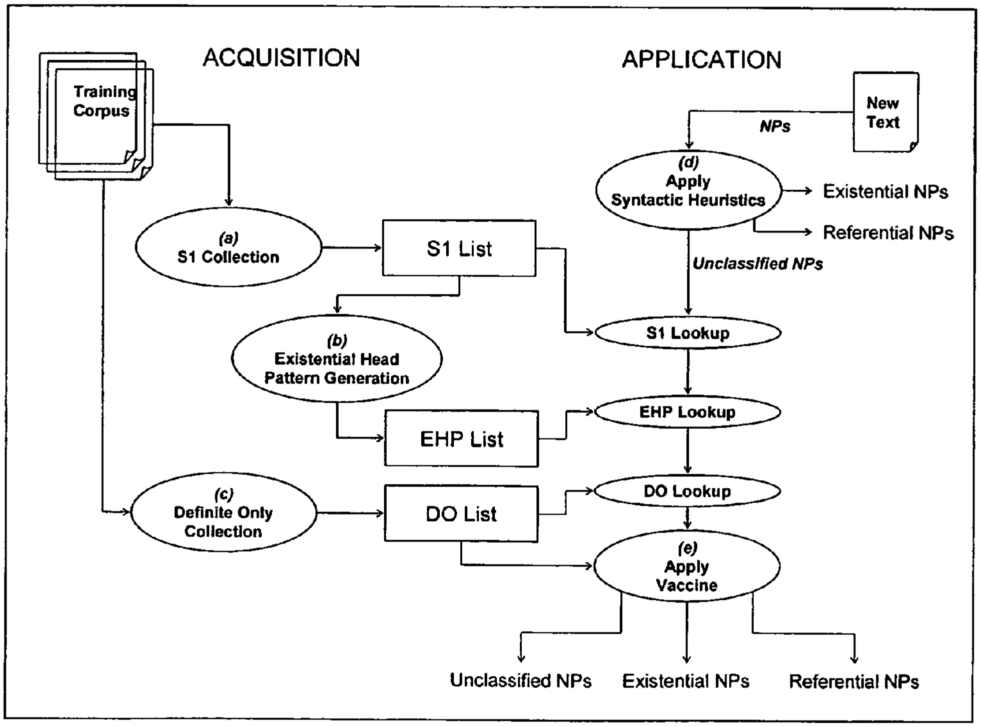
Figure 3 – Architecture

| | |
|---|---|
| **Step 1** | For each definite NP of more than two words, build a candidate pattern of the form:<br>"the <x+> *head*"<br>where *head* is the rightmost word in the NP. |
| **Step 2** | Count how many times the pattern matches NPs in the corpus. |
| **Step 3** | **IF** the NP has a modifier (any noun or adjective) to the left of *head*,<br>**THEN** specify the pattern by prepending the modifier to the *head*, goto Step 4<br>**ELSE** return the pattern and its frequency, stop |
| **Step 4** | Count how many times the more specific pattern matches NPs in the corpus<br>**IF** the more specific pattern count is equal to the prior count,<br>**THEN** goto Step 3,<br>**ELSE** return the prior pattern and its frequency, stop. |

Figure 4 – EHP Algorithm

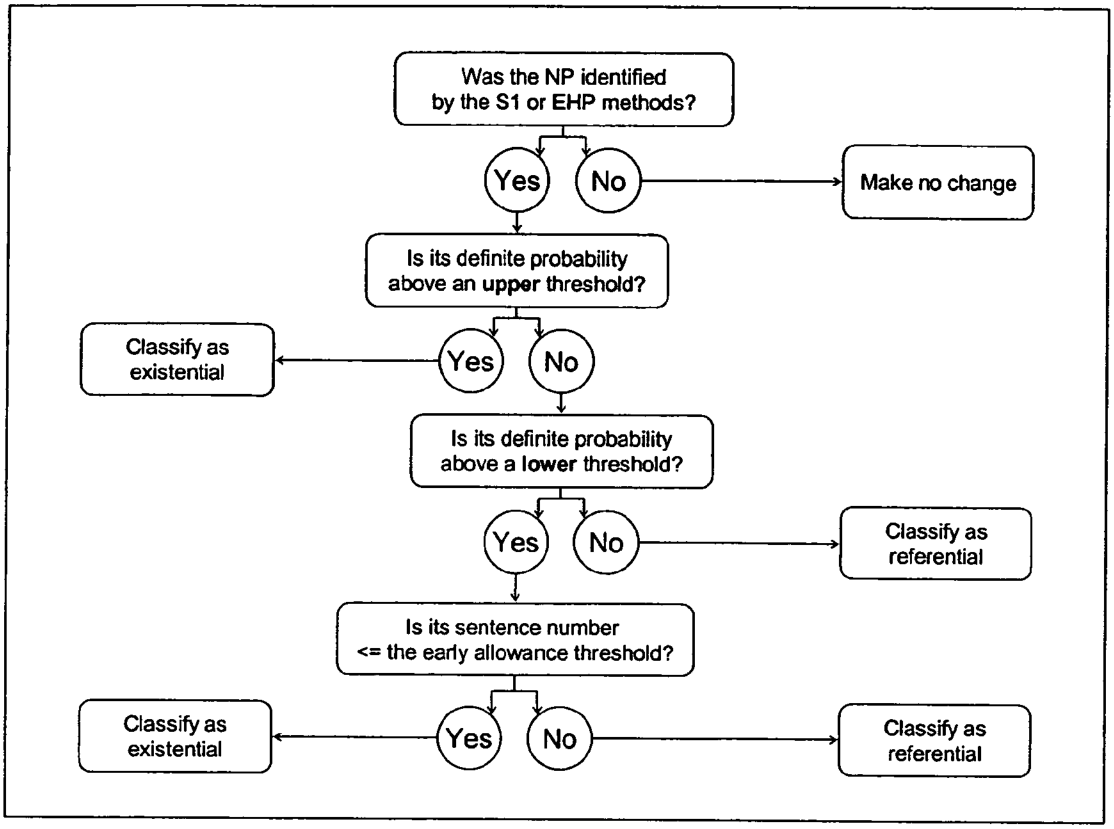
Figure 5 – Vaccine Algorithm

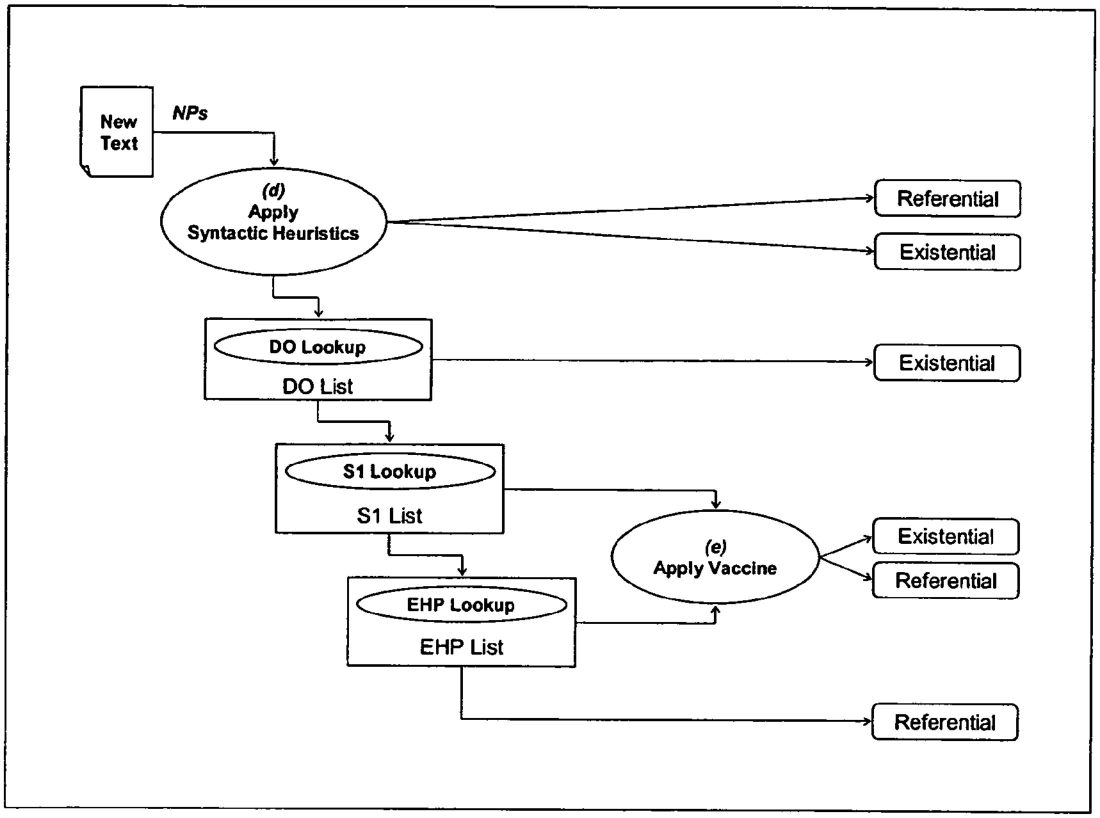
Figure 6 – Existential Identification Algorithm

Abstracted Caseframe: <agent> kidnap

| | |
|---|---|
| Extraction: | guerrillas (2) |
| Extraction: | he (3) |
| Extraction: | men (4) |
| Extraction: | ELN (3) |
| Extraction: | FMLN (9) |

Figure 7 – Sample Caseframe with Extractions

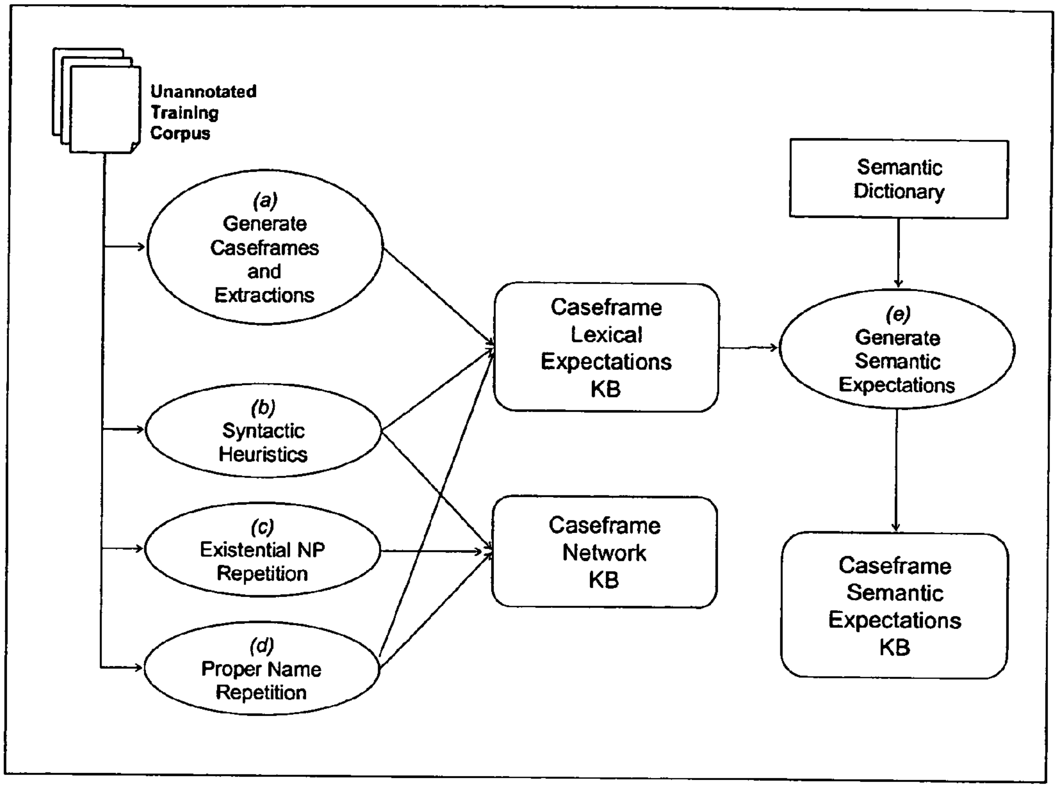
Figure 8 – BABAR's Contextual Role Acquisition Architecture

| SYNROLE | ACTIVATION FUNCTION | TRIGGER TERM(S) |
|---|---|---|
| SUBJ | ACTIVE_VERB_DOBJ | OVERPOWERED:RESIDENTS |
| SUBJ | ACTIVE_VERB_DOBJ | KIDNAPPED:STUDENTS |
| SUBJ | ACTIVE_VERB | STRIVE |
| SUBJ | ACTIVE_VERB | THRIVE |
| SUBJ | ACTIVE_VERB | DRIVE |
| SUBJ | ACTIVE_VERB | CONTEMPLATED |
| SUBJ | ACTIVE_VERB | STATED |
| SUBJ | ACTIVE_VERB | PARTICIPATED |
| SUBJ | AUXTOBE_NOUN | INCIDENTS |
| SUBJ | AUXTOBE_NOUN | GAME |
| SUBJ | PASSIVE_VERB | CONTEMPLATED |
| SUBJ | PASSIVE_VERB | RELATED |
| DOBJ | NOUN_AUXTOBE | PRESIDENTS |
| DOBJ | NOUN_AUXTOBE | INCIDENTS |
| DOBJ | INFINITIVE | DO |
| DOBJ | ACTIVE_VERB | STATED |
| PREP | NOUN_PP | ATTACK:AT |
| PREP | INFINITIVE_PP | LOOK:AT |
| PREP | INFINITIVE_PP | ASK:AS |
| PREP | ACTIVE_VERB_PP | LOOK:AT |

Figure 9 – Caseframes from Terrorism

| SYNROLE | ACTIVATION FUNCTION | TRIGGER TERM(S) |
|---|---|---|
| SUBJ | ACTIVE_VERB_DOBJ | CARRYING:CEMENT |
| SUBJ | ACTIVE_VERB_DOBJ | ORDERED:PAYMENT |
| SUBJ | ACTIVE_VERB_DOBJ | MADE:PAYMENT |
| SUBJ | ACTIVE_VERB_DOBJ | CLAIMED:60 |
| SUBJ | ACTIVE_VERB_DOBJ | INJURED:64 |
| SUBJ | ACTIVE_VERB_DOBJ | QUOTED:STATEMENT |
| SUBJ | ACTIVE_VERB_DOBJ | ASK:PARLIAMENT |
| SUBJ | ACTIVE_VERB | DROWN |
| SUBJ | ACTIVE_VERB | THROWN |
| SUBJ | ACTIVE_VERB | SEND |
| SUBJ | ACTIVE_VERB | TOILED |
| SUBJ | PASSIVE_VERB | THROWN |
| SUBJ | AUXTOHAVE_NOUN | AGREEMENT |
| SUBJ | AUXTOBE_NOUN | DEPLOYMENT |
| SUBJ | VERB_INFINITIVE | DECIDED:SEND |
| SUBJ | VERB_INFINITIVE | MOBILISED:SEND |
| DOBJ | ACTIVE_VERB | THROWN |
| DOBJ | INFINITIVE | SEND |
| DOBJ | ACTIVE_VERB | SEND |
| DOBJ | VERB_INFINITIVE | DECIDED:SEND |
| DOBJ | VERB_INFINITIVE | MOBILISED:SEND |

Figure 10 – Caseframes from Natural Disasters

CASEFRAME: <AGENT VERB ATTACKED>
Lexical Expectations: column, commando, fighters, FMLN, forces, group, guerrilla, helicopter, killer, rebel, sniper, terrorist, troops, unit

CASEFRAME: <PATIENT VERB ATTACKED>
Lexical Expectations: area, forces, army, battalion, branch, brigade, brothel, building, bus, company, convoy, embassy, farm, forces, garrison, group, guard, headquarters, home, installation, military, neighborhood, office, pipeline, police, station, position, post, Ramon, residence, staff, target, town, towns, troops, unit

CASEFRAME: <AGENT VERB SEIZED>
Lexical Expectations: agent, army, authorities, FMLN, forces, police, policemen, soldier, troops, unit

CASEFRAME: <PATIENT VERB SEIZED>
Lexical Expectations: arms, document, equipment, farm, firearm, machinegun, materiel, power, rifle, town, vehicle, weapon

CASEFRAME: <PATIENT VERB FIRED>
Lexical Expectations: missile, rifle, rocket, shots, weapon

Figure 11 – Caseframe Lexical Expectations from Terrorism

CASEFRAME: <AGENT VERB RESCUED>
Lexical Expectations: authorities, guard, crew, firefighters, firemen, fishermen, forces, helicopter, Kasalova, navy, police, searchers, soldiers, team, worker

CASEFRAME: <PATIENT VERB RESCUED>
Lexical Expectations: Albanians, anglers, boat, Bullimore, Canadians, children, competitors, crew, crewmember, Dinelli, dozen, Dubois, fishermen, Frenchman, member, men, miner, motorists, occupant, official, others, participant, passengers, people, person, police, sailor, ship, sixteen, skier, survivor, survivors, tourists, victims, woman, worker

CASEFRAME: <PP-OBJECT PASSIVE VERB RESCUED:FROM>
Lexical Expectations: area, areas, boat, debris, ferry, fire, ocean, raft, rubble, ruins, trawler, vessel, water, wreckage, yacht

CASEFRAME: <AGENT VERB_DOBJ CAUSED:DAMAGE>
Lexical Expectations: earthquake, explosion, fire, flood, flooding, Fran, hurricane, Lili, quake, rains, ship, storm, tremor, volcano, wind

CASEFRAME: <PATIENT VERB DAMAGED>
Lexical Expectations: agriculture, apartment, area, areas, Bhandari, boat, bridge, building, bus, business, cabin, cable, car, carrier, church, coral, corn, crop, dike, economy, ecosystems, embankment, equipment, Eurotunnel, facility, floor, fuselage, garage, harvest, hectares, home, hospital, house, huts, inland, Jabalpur, Kinabalu, land, line, livestock, metres, museum, office, plane, plant, property, rafts, rails, reef, region, riverwalk, roads, roof, room, school, section, ship, shop, studio, tank, tanker, tunnel, vehicle, vessel, village, warehouse, wheat

Figure 12 – Caseframe Lexical Expectations from Natural Disasters

*The White House* today announced that Halliburton Inc. has been awarded a contract for rebuilding most of Iraq. *The company* will open operations in that country next month. Also mentioned was the awarding of a $15B contract to General Dynamics for next-generation weapons development. Although General Dynamics has a history of winning government contracts, sources inside *the White House* say that *the company* has recently developed an advanced air-to-air missile that increased its chances of winning the bid.

Figure 13 – Repeated Existential NP Example

Figure 14 – Log Likelihood

$$-2\log\lambda = 2[\log L(c_{12}, c_1, p) + \log L(c_2 - c_{12}, N - c_1, p) - \log L(c_{12}, c_1, p_1) - \log L(c_2 - c_{12}, N - c_1, p_2)]$$

where $c_1$ = occurrence of item 1,
$c_2$ = occurrence of item 2,
$c_{12}$ = co-occurrence of item 1 and item 2, $p = \frac{c_2}{N}$,
$p_1 = \frac{c_{12}}{c_1}$,
$p_2 = \frac{c_2 - c_{12}}{N - c_1}$, and $L(k,n,x) = x^k(1-x)^{n-k}$.

| SYNROLE | ACT.FUNC. | TRIGGER(S) | SEMANTIC CLASS EXPECTATIONS |
|---|---|---|---|
| PP-OBJECT | ACTIVE_VERB_PP | CARRIED_OUT:BY | group |
| PP-OBJECT | ACTIVE_VERB_PP | CARRIED_OUT:IN | location |
| PP-OBJECT | ACTIVE_VERB_PP | CARRIED_OUT:ON | time |
| PP-OBJECT | ACTIVE_VERB_PP | CARRIED_OUT:THROUGHOUT | location |
| PP-OBJECT | ACTIVE_VERB_PP | CARRIED_OUT:WITH | artifact |
| AGENT | VERB | CRITICIZED | human |
| PATIENT | VERB | CRITICIZED | group |
| AGENT | VERB | UNLEASHED | group |
| PATIENT | VERB | UNLEASHED | activity, event |
| PP-OBJECT | PASSIVE_VERB_PP | DOWNED:IN | location |
| PP-OBJECT | PASSIVE_VERB_PP | ELECTED:BY | human |
| PP-OBJECT | PASSIVE_VERB_PP | ENGAGED:IN | event |
| PP-OBJECT | PASSIVE_VERB_PP | ESTIMATED:AT | quantity |
| PP-OBJECT | NOUN_PP | TRAFFICKING:OF | artifact |
| PP-OBJECT | NOUN_PP | TRAFFICKERS:TO | location |
| PP-OBJECT | ACTIVE_VERB_PP | WAGING:AGAINST | group, human |
| PP-OBJECT | ACTIVE_VERB_PP | PLANNED:BY | group |
| PP-OBJECT | ACTIVE_VERB_PP | PLANNED:FOR | time |
| PP-OBJECT | ACTIVE_VERB_PP | PLANTED:BY | human |
| PP-OBJECT | ACTIVE_VERB_PP | PLANTED:IN | location |
| PP-OBJECT | ACTIVE VERB PP | PLANTED:UNDER | artifact |

Figure 15 – Caseframe Semantic Expectations from Terrorism

| SYNROLE | ACT.FUNC. | TRIGGER(S) | SEMANTIC CLASS EXPECTATIONS |
|---|---|---|---|
| PP-OBJECT | ACTIVE_VERB_PP | AFFECTED:BY | natphenom |
| PP-OBJECT | ACTIVE_VERB_PP | AFFECTED:DURING | natphenom |
| PP-OBJECT | ACTIVE_VERB_PP | BEAT:UP | human |
| PP-OBJECT | ACTIVE_VERB_PP | CHARTERED:BY | group, human |
| PP-OBJECT | ACTIVE_VERB_PP | CHARTERED:FROM | group |
| PP-OBJECT | ACTIVE_VERB_PP | CHARTERED:TO | location |
| PP-OBJECT | NOUN_PP | CHEMICAL:IN | substance |
| PP-OBJECT | NOUN_PP | CIRCUMSTANCES:OF | natphenom |
| PP-OBJECT | NOUN_PP | COLLISION:BETWEEN | artifact |
| PP-OBJECT | NOUN_PP | COLLISION:IN | condition, location |
| PP-OBJECT | NOUN_PP | COLLISION:NEAR | location |
| PP-OBJECT | NOUN_PP | COLLISION:OF | artifact |
| PP-OBJECT | NOUN_PP | COLLISION:WITH | artifact |
| PP-OBJECT | PASSIVE_VERB_PP | POPULATED:BY | human |
| AGENT | VERB_DOBJ | ARRESTED:PEOPLE | group |
| AGENT | VERB_DOBJ | BREATHED:SIGH | human |
| AGENT | VERB_DOBJ | CAUSED:DAMAGE | natphenom |
| AGENT | VERB_DOBJ | CAUSED:DEATHS | natphenom |
| AGENT | VERB | ENGULFED | natphenom |
| PATIENT | VERB | ENGULFED | artifact, group |
| PATIENT | VERB | RESCUED | group, human |
| PATIENT | VERB_INFIN | TRIED:COOK | substance |
| PATIENT | VERB_INFIN | TRIED:ESCAPE | natphenom |
| PATIENT | VERB | TRIGGERED | event, natphenom |

Figure 16 – Caseframe Semantic Expectations from Natural Disasters

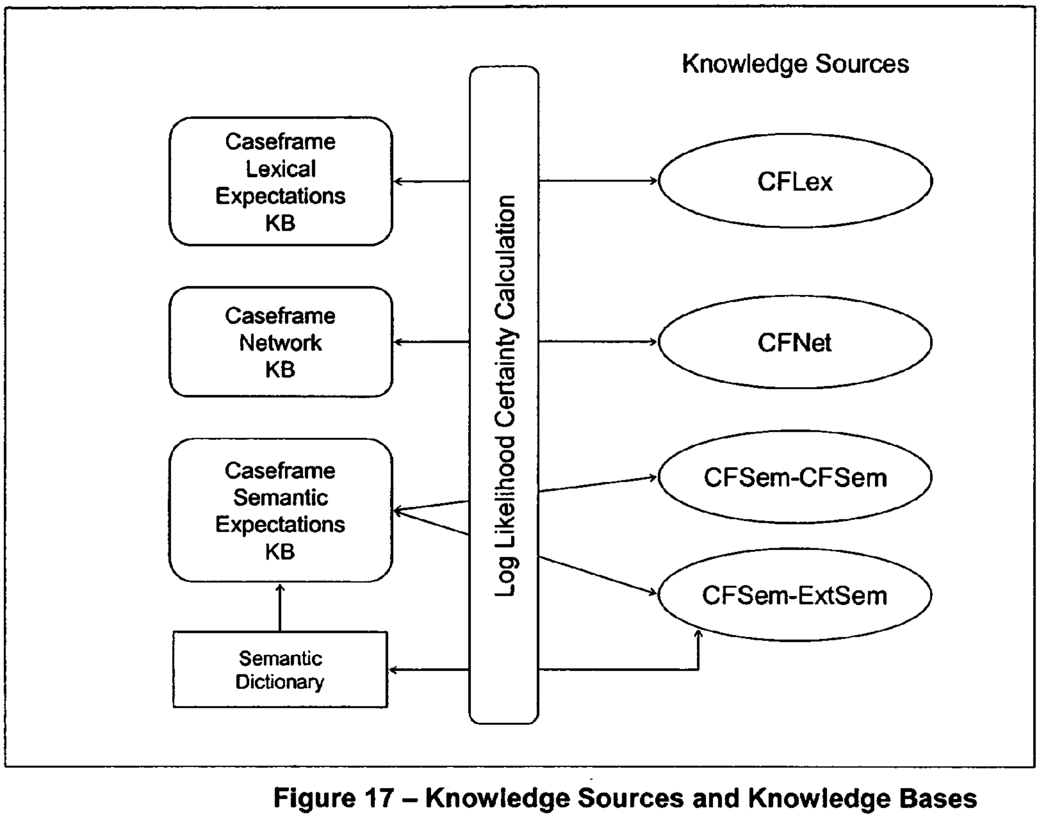
Figure 17 – Knowledge Sources and Knowledge Bases

*The hurricane* struck Bermuda on Monday afternoon. U.S. residents braced for flooding early in the week, but by Friday morning, *it* had destroyed 34 houses and caused $5MM in damage.

Figure 18 – Walk Through Example the
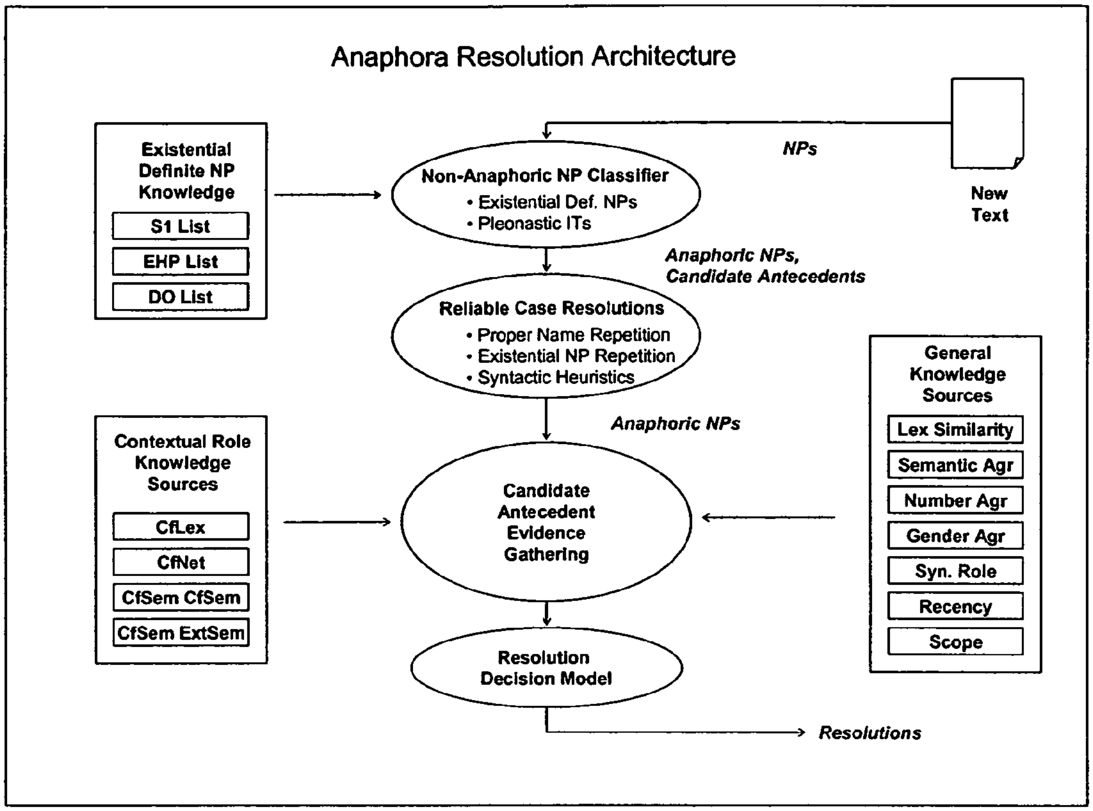
Figure 19 – BABAR's Coreference Resolution Architecture

| |
|---|
| John met Jane at a restaurant where they exchanged state secrets. The CIA later reported that ***he*** was a counterintelligence agent who has been working the espionage case for six months. |

Figure 20 – Knowledge Source Example

$$recency = 1 - \frac{\#\,words\ from\ anaphor}{\#\,words\ in\ collection\ window}$$

Figure 21 – Recency Calculation

```
entity {
  group {}
  anim {
       animal {}
     human {}
          plant {}
  }
  inanm {
        artifact {}
        nat_object {}
        substance {}
        attribute {}
        quantity {}
        relation {}
        time {}
        psyftr {}
        natphenom {}
        activity {}
        event {}
        location {}
        possession {}
        shape {}
        condition {}
  }
}
```

Figure 22 – BABAR's Semantic Hierarchy

Results for "Hypernyms (this is a kind of...)" search of noun "airline"

2 senses of airline

Sense 1
airline, air hose -- (a hose that carries air under pressure)
=> hose, hosepipe -- (a flexible pipe for conveying a liquid or gas)
=> tube, tubing -
(conduit consisting of a long hollow object (usually cylindrical) used to hold and conduct liquids or gases)
=> conduit --
(a passage (a pipe or tunnel) through which water or electric wires can pass; "the computers were connected through a system of conduits")
=> passage -- (a way through or along which someone or something may pass)
=> way --
(any artifact consisting of a road or path affording passage from one place to another; "he said he was looking for the way out")
=> artifact, artefact -- (a man-made object taken as a whole)
=> object, physical object --
(a tangible and visible entity; an entity that can cast a shadow; "it was full of rackets, balls and other objects")
=> entity, physical thing --
(that which is perceived or known or inferred to have its own physical existence (living or nonliving))
=> whole, whole thing, unit --
(an assemblage of parts that is regarded as a single entity; "how big is that part compared t o the whole?"; "the team is a unit")
=> object, physical object --
(a tangible and visible entity; an entity that can cast a shadow; "it was full of rackets, balls and other objects")
=> entity, physical thing --
(that which is perceived or known or inferred to have its own physical existence (living or nonliving))

Sense 2
airline, airline business, airway --
(a commercial enterprise that provides scheduled flights for passengers)
=> line -- (a commercial organization serving as a common carrier)
=> carrier, common carrier --
(a person or firm in the business of transporting people or goods or messages)
=> business, concern, business concern, business organization, business organisation --
(a commercial or industrial enterprise and the people who constitute it; "he bought his brother's business"; "a small mom-and-pop business"; "a racially integrated business concern")
=> enterprise --
(an organization created for business ventures; "a growing enterprise must have a bold leader")

Figure 23 – A WordNet Example

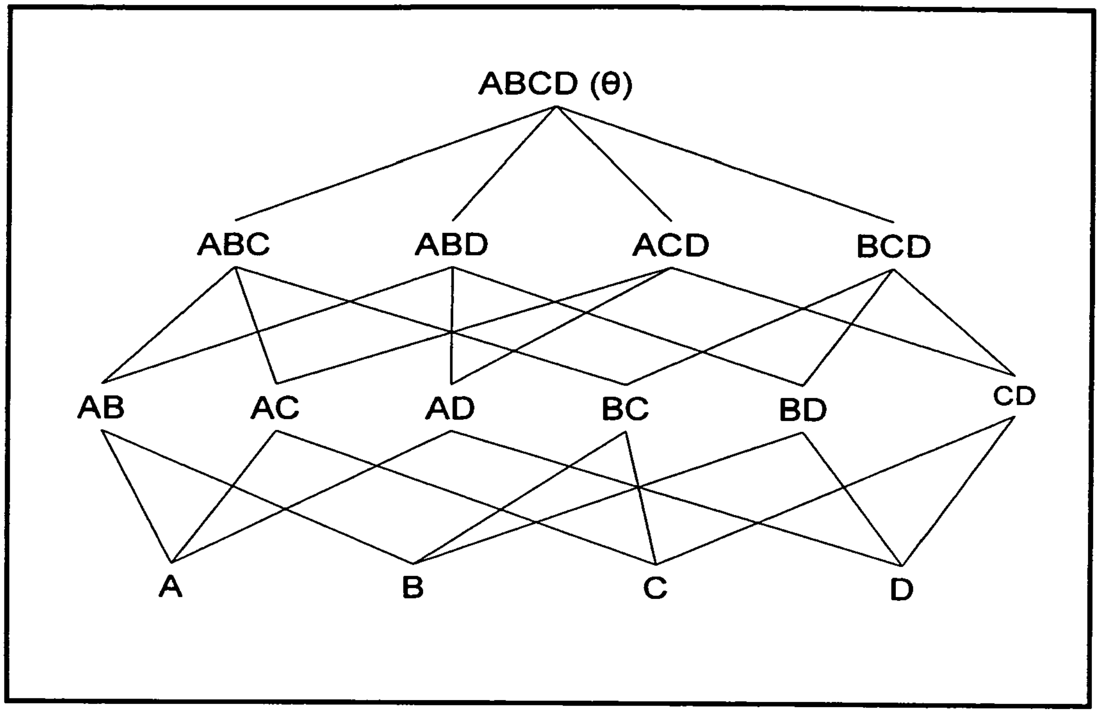
Figure 24 – Dempster-Shafer Combinations

$$m_3(Z)=\frac{\sum_{X\cap Y=Z} m_1(X)\bullet m_2(Y)}{1-\sum_{X\cap Y=\{\}} m_1(X)\bullet m_2(Y)}$$

Figure 25 – Combining Evidence

$$Belief(p) = \sum m(x) \; for \; x \subseteq p$$

$$Doubt(p) = Belief(\neg p)$$

$$Plausibility(p) = 1 - Doubt(p)$$

Figure 26 – Dempster-Shafer Measures

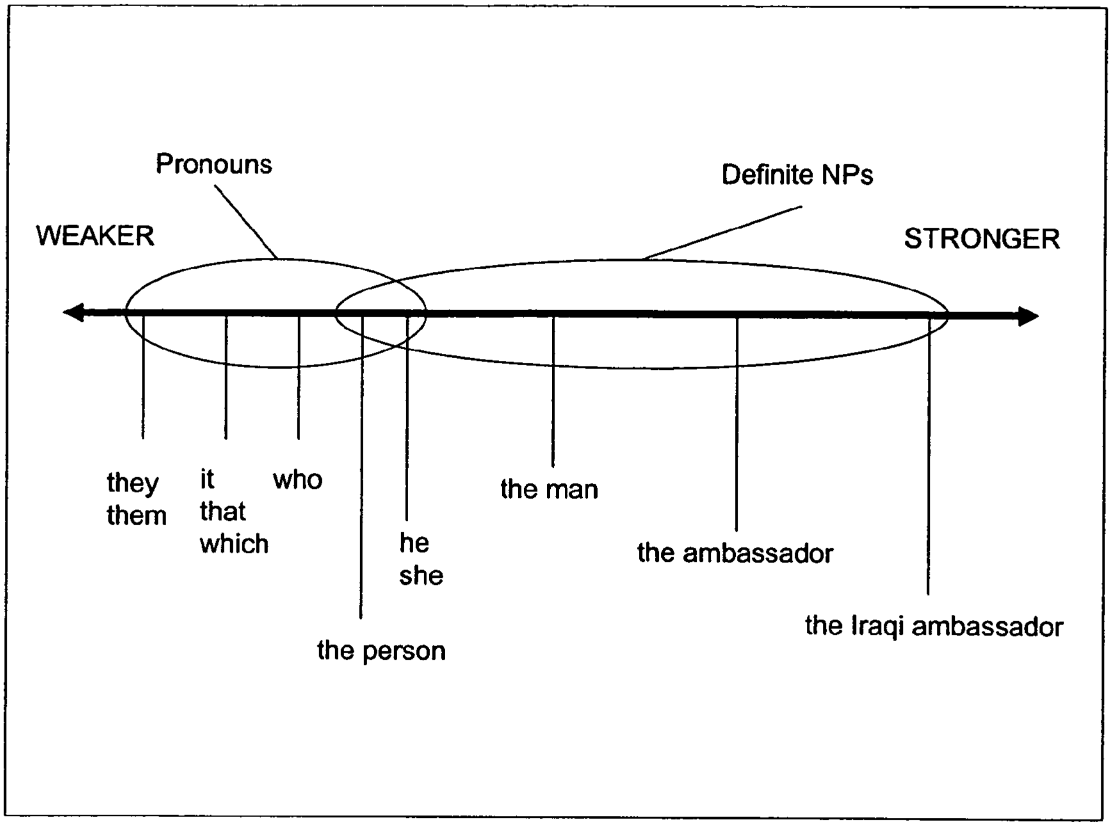
Figure 27 – Semantically Weak vs. Semantically Strong Anaphors

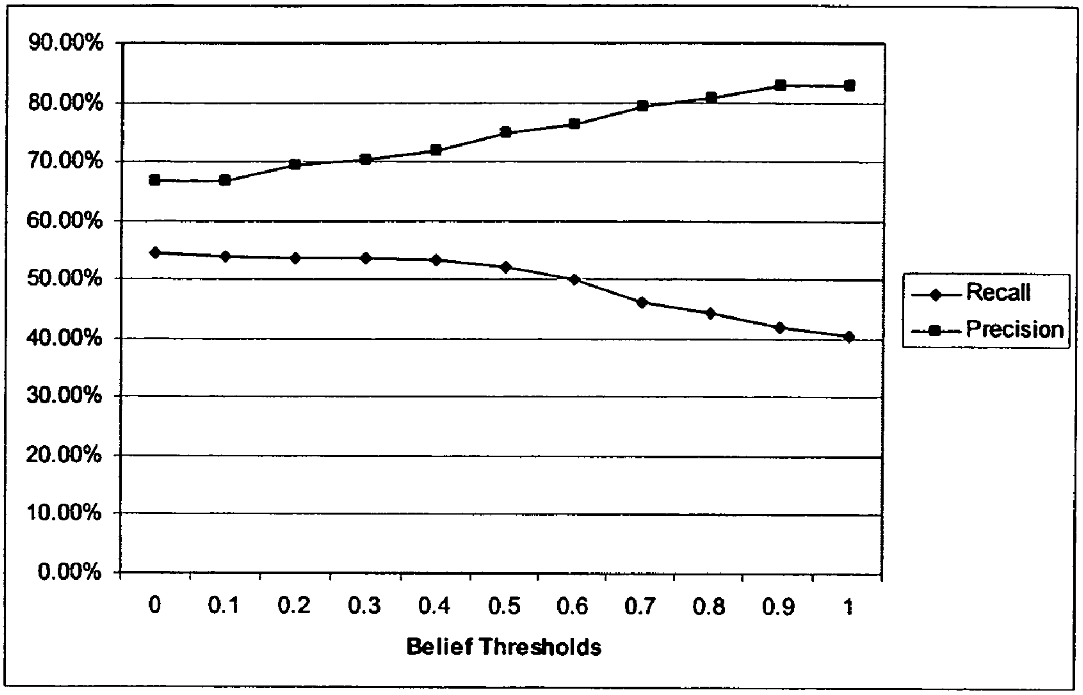
Figure 28 – Belief Thresholds for Terrorism
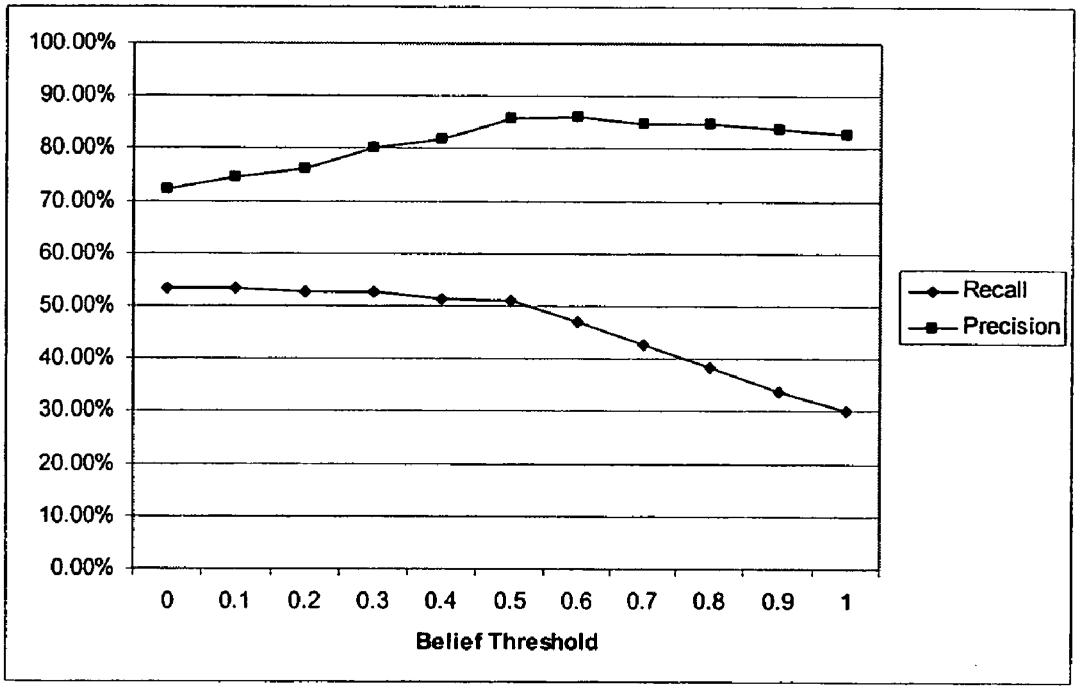
Figure 29 – Belief Thresholds for Natural Disasters

ACQUISITION AND APPLICATION OF CONTEXTUAL ROLE KNOWLEDGE FOR COREFERENCE RESOLUTION

CROSS-REFERENCE TO RELATED APPLICATIONS

Priority is claimed to U.S. Provisional Patent Application Ser. No. 60/523,209 filed on Nov. 18, 2003, which is hereby incorporated by reference.

BACKGROUND

Coreference resolution is a recurring linguistic and technical problem for which there have not been satisfactory solutions in the past. I use the term 'coreference resolution' to reflect the notion that a noun phrase is cohesively linked to a previously occurring item. The noun phrase that refers backward is the anaphor and the previously occurring item is its antecedent.

In information extraction, consider an extraction system that recovered the perpetrators of terrorist acts. It would be much more valuable to have this system generate a list of people names rather than the he's and she's that are often the explicit mentions. In information retrieval, when performing a web search on George Bush, an advanced ranking algorithm would take into account the number of references to George Bush in each web page, including he, him, and the President. In text classification, a user might want news articles classified by what actions Chuck Yeager took, but without resolving he, him, and the pilot with Yeager, the classification algorithm is apt to miss valuable clues.

Note that none of these tasks is impossible without coreference resolution. On the contrary, all of them exist today in some useful form without the resolutions of anaphors. What was becoming clear, however, is that this one linguistic phenomenon impacts a wide range of natural language processing ("NLP") tasks, and developing a computational treatment of coreference could have potentially broad implications. This is particularly true with regard to textual documents such as newspaper articles and radio transcripts, as a large number of anaphor types existed in these documents, including relative pronouns, reflexive pronouns, personal pronouns, and definite noun phrases. This last type, though, presented a unique challenge because definite noun phrases are not always anaphoric. For example, the country, the vehicle, and the organization are quite likely anaphors, but the United States, the UN Secretary General and the CIA do not require a preceding antecedent to be understood. In the terrorism texts, a reader would be expected to recognize the MRTA and the FMLN (the names of two prevalent terrorist organizations) in the same way that an American reader would recognize the FBI. These nonanaphoric definite noun phrases seemed to be topic-specific and often based in real world knowledge.

Earlier research efforts had demonstrated that some nonanaphoric definite NPs could be recognized by their surrounding syntactic context. For example, in the mayor of San Francisco, the attached prepositional phrase (of San Francisco) generates enough context for the reader to understand the referent of the mayor. Using syntactic constraints, however, would not help address syntactically independent cases like the MRTA and the FMLN, which are common in the terrorism texts. So, while the existing approaches were useful, they left a large number of important cases untreated. Consequently, additional work was needed in the area.

BRIEF DESCRIPTION OF DRAWINGS

FIG. 1 depicts an example architectural overview.
FIG. 2 depicts an example noun phrase taxonomy.
FIG. 3 depicts an example architecture.
FIG. 4 depicts an example EHP algorithm.
FIG. 5 depicts an example vaccine algorithm;
FIG. 6 depicts an example existential identification algorithm.
FIG. 7 depicts a sample caseframe with extractions.
FIG. 8 depicts an example contextual role acquisition architecture.
FIG. 9 depicts example caseframes from terrorism.
FIG. 10 depicts example caseframes from natural disasters.
FIG. 11 depicts example caseframe lexical expectations from terrorism.
FIG. 12 depicts example caseframe lexical expectations from natural disasters.
FIG. 13 depicts a repeated existential noun phrase example.
FIG. 14 depicts an example log likelihood.
FIG. 15 depicts example caseframe semantic expectations from terrorism.
FIG. 16 depicts example caseframe semantic expectations from natural disasters.
FIG. 17 depicts example knowledge sources and knowledge bases.
FIG. 18 depicts a walk through example.
FIG. 19 depicts an example coreference resolution architecture.
FIG. 20 depicts a knowledge source example.
FIG. 21 depicts an example recency calculation.
FIG. 22 depicts an example semantic hierarchy.
FIG. 23 depicts a WordNet example.
FIG. 24 depicts example Dempster-Shafer combinations.
FIG. 25 depicts an example of combining evidence.
FIG. 26 depicts an example of Dempster-Shafer Measures.
FIG. 27 depicts examples of semantically weak versus semantically strong metaphors.
FIG. 28 depicts example belief thresholds for terrorism.
FIG. 29 depicts example belief thresholds for natural disasters.

LEXICON

For the purposes of this document, the following terms shall have their respective meanings:

anaphor A noun phrase that makes reference to a discourse element previously mentioned. For example, in "John gave some money to Jack but he didn't count it," there are two anaphors: he and it. Pronouns are most often anaphoric, but other noun phrases can be anaphors as well, e.g. the man (who gave money to Jack).

anaphora The linguistic notion that a noun phrase can make reference to another noun phrase mentioned earlier in text or discourse. Anaphora is the phenomenon, an anaphor is an instance of the phenomenon, and an anaphor is an anaphoric noun phrase.

anaphoric Adjective form, i.e. a noun phrase that is an anaphor is anaphoric.

antecedent The preceding discourse element that an anaphor refers to. For example, in "John gave some money to Jack but he didn't count it," John is the antecedent of he, and some money is the antecedent of it.

cataphora The linguistic notion that a noun phrase can make reference to another noun phrase that is mentioned later in text or discourse, e.g. “If you need one, there’s a towel in the top drawer.”

definite NP A noun phrase started with a definite article, i.e. the, that, this, those. For example: the man, the CIA, those documents.

existential NP Synonymous with non-anaphoric definite NP.

non-anaphoric NP A noun phrase that is not anaphoric, i.e. its referent is understood without prior context, e.g. the CIA, the President of the United States, the document that you are reading right now. (These examples are also definite non-anaphoric NPs because they all begin with the.)

NP Abbreviation for noun phrase.

DETAILED DESCRIPTION

The previous work and problems related to coreference resolution led me to pose a set of questions. Could the texts themselves be used to automatically learn which definite noun phrases are nonanaphoric? Could the learning model identify these NPs without relying solely on syntactic constraints? And, could this acquired knowledge become part of a broad-based coreference resolution process? The answers are yes, and the initial efforts of this work produced a new model for identifying nonanaphoric NPs that supports these propositions and substantiates the first of two major research contributions made by my work.

Contribution 1: Nonanaphoric noun phrases can be automatically identified from a corpus of texts using an unsupervised learning method. Additionally, this acquired knowledge can be incorporated into the process of automated coreference resolution in general, leading to improved precision.

Given a model that addressed the issue of identifying when an NP is anaphoric, I began to concentrate on how to resolve those NPs with their antecedents. In particular, I focused on the observation that some anaphors seemed to be resolvable only when the contextual roles they and their antecedents play are taken into account. Consider the following two examples.

(1) The FBI is sending its best agent, John Delancy, to investigate the kidnapping of the renowned and wealthy author, Jack Spears. He disappeared last Thursday.

(2) The FBI is sending its best agent, John Delancy, to investigate the kidnapping of the renowned and wealthy author, Jack Spears. He previously tracked down six of the agency’s top ten most wanted criminals.

As readers, it is clear that he resolves to Jack Spears in (1) and to John Delancy in (2), but why? The syntax of the text preceding the anaphor is identical in both cases, so that cannot be the reason. Instead, the text that follows the anaphor appears to generate a different set of contextual constraints that we implicitly use to make the distinction. More specifically, we have an understanding that people who disappear are often victims of a kidnapping. And, we recognize that people who conduct investigations are likely to track down criminals. These are examples of contextual roles, i.e., the notion that someone or something plays a specific role in an event or relationship. Using this approach, a pair of contextual roles could help resolve anaphors.

A contextual role gen erates a set of expectations, and these expectations can also be used during resolution as evidence for particular candidate antecedents. This seems to be particularly true when dealing with anaphors like it that have low semantic content on their own. Consider the following example.

(3) The FBI reported yesterday that a plane approaching the Bogota airport was attacked with shoulder-launched missiles fired by rebel soldiers hiding in the surrounding jungle. Witnesses to the tragedy said that it crashed several miles from the airport after bursting into flames.

Here, the pronoun it could be resolved with any singular, inanimate antecedent, and there are four such candidates from the first sentence: the FBI, a plane, the Bogota airport, and the surrounding jungle. The pronoun, though, is playing a contextual role—it is the object that crashed—and this contextual role projects an expectation for things that could crash. Of the candidate antecedents, certainly the plane fits this expectation more than the others. Expectations of contextual roles can operate both on a lexical and semantic level. For example, the contextual role of object that crashed could expect a list of lexical terms (e.g., plane, airplane, 727, Cessna) or a semantic class that encompassed these terms. So, contextual roles appeared to contribute to coreference resolution in two ways. A contextual role could project lexical or semantic expectations that could accept or reject candidate antecedents. A pair of contextual roles could also indicate relatedness between anaphor and candidate antecedent.

The contextual roles of the anaphor and antecedent can be related in a number of ways. First, through synonymy, e.g., the victim of a kidnapping and the victim of an abduction are likely to be the same person. Second, through sequence, e.g., people who are arrested are often the same people who are later tried in court. Third, through a sort of set membership in which a particular person or thing typically engages in a set of related activities. For example, judges typically perform the actions of making rulings, hearing arguments, and handing down decisions. Knowing this, a coreference resolver should be able to distinguish between the judge and Jack Brown as the correct antecedent in (4).

(4) The judge heard arguments today on the case of Jack Brown. He will be handing down his decision tomorrow.

Although the use of contextual role knowledge looked like a valuable addition to coreference resolution, there was a practical problem with the approach. It reeked of the need for very deep, very broad, common sense, world knowledge, and such knowledge has a tendency to require dramatic levels of hand-coding. In the academic world, this translates to large numbers of graduate students, but in the commercial world, it likely dooms the approach completely.

The challenge then became one of acquiring the knowledge necessary to support the implementation of these ideas in an efficient and repeatable manner. Specifically, I wanted to stay away from the need to markup a training corpus with examples. The NLP group had at its disposal large collections of text, so I began to examine ways of automatically learning contextual role-based information from a corpus, and that led to two observations that were to become essential to this work.

The first observation was that some anaphors are easily resolved. They gain this quality due to fortunate circumstances, i.e., they have only one possible antecedent, or they may be so restricted by syntactic law that only one antecedent is valid. The second observation was that a resolved anaphor and antecedent pair could be an example from which to learn contextual roles.

The confluence of the two observations and the recent success of corpus-based NLP set the stage for a new research effort. Is it possible to find the easily resolvable anaphors in a collection of texts and learn contextual role information from them? Given a large enough corpus, with enough contextual role repetition in the resolutions, could valuable lessons be distinguished from spurious ones? And, once the contextual role knowledge had been acquired, could a coreference resolver that incorporated the knowledge perform better? The second major research contribution will answer these questions.

Contribution 2: Automated coreference resolution can be improved by using contextual role knowledge that is learned from a corpus.

To demonstrate such improvement, I constructed a new model of coreference resolution that encompasses both the learning of domain-specific knowledge and the application of that knowledge to the resolution of anaphors. I named the model BABAR, a model for Both Acquisition and application of knowledge Bases for Anaphora Resolution. The not-so-subtle metaphor behind BABAR is that, in the same way elephants are known for having good memories, I hoped that the model might exhibit similar qualities of learning and remembering well.

BABAR makes contributions in a number of ways. First, it supports the claims of the dissertation by illustrating the value of both classifying nonanaphoric definite NPs and using contextual roles when performing coreference resolution. Second, it highlights how simple cases of coreference can be used to help resolve more difficult cases. Third, it proposes a set of learning algorithms for coreference resolution that are fully unsupervised. The value of this unsupervised learning should not be underestimated. In practice, BABAR acquires large quantities of knowledge without requiring any hand-tagged training sets or any human intervention. To collect the same level of knowledge by hand would be a massive undertaking. The first step in understanding how BABAR achieves these goals is to explain its components and processes from an architectural point of view.

Architectural Overview

Referring to FIG. 1, the architecture of BABAR can be viewed in two ways. First, to highlight the major contributions of the work, draw an imaginary horizontal line through FIG. 1 components (a), (d), and (f). The components that occur above that line focus on determining whether or not a definite noun phrase is anaphoric, i.e., Contribution 1. The components below that line address the issue of collecting and applying contextual role knowledge, i.e., Contribution 2.

The reader could also draw a vertical line through the middle of the figure (directly through components (d) and (e)), in which case there are two sets of components that correspond to the acquisition of knowledge from a corpus and the application of that knowledge to the coreference resolution process. I will use this latter viewpoint to illustrate the general approach the model takes.

The model begins by assuming the existence of an unannotated training corpus, which should be a collection of texts that represent the same topic as the texts of the eventual target environment. BABAR also assumes the existence of a syntactic analyzer that can parse sentences to establish major syntactic constituents (e.g., NPs, VPs, PPs) and grammatical roles (e.g., subject, direct object). The training corpus is parsed and sent to an existential NP (existential definite noun phrases are synonymous with nonanaphoric definite noun phrases) learning component that uses a set of heuristics to acquire nonanaphoric definite noun phrases. The result of this process is a collection of lists—lists of noun phrases and lists of noun phrase patterns that collectively can be considered existential noun phrase knowledge. BABAR will later use this knowledge to classify the noun phrases of a previously unseen document as existential or anaphoric.

The parsed training corpus is also sent to a component that identifies unambiguous anaphors—those that can be reliably resolved with a single candidate antecedent. Those anaphors and their antecedents become raw material for a learning component that records contextual role information about the resolved pairs. For example, assume that one of the easily resolvable anaphors was he in the following case:

(5) Jack was kidnapped by armed guerrillas. He was returned unharmed.

The conceptual role learning component would record that an anaphor/antecedent pair was found in which two conceptual roles co-occurred: A) the object of a kidnapping event, and B) the object of a returning event. With each anaphor/antecedent pair, the contextual role knowledge repository is updated, and if enough evidence is collected from the training corpus, the model will decide that there is indeed a connection between the two conceptual roles. Later, this information can be used to find the correct antecedent for he in:

(6) Dan Rather reported that the U.S. ambassador was kidnapped by a masked man. He was returned unharmed the following day.

Once the corpus-based learning process is complete, resolution begins by evaluating every noun phrase in a text to determine which ones are anaphoric and which are not. Those that survive this test are evaluated by the component that makes reliable case resolutions (i.e., the same rules used during training). The anaphors left over are those that require more complex treatment, and BABAR addresses them by collecting evidence from a number of sources, including the contextual role knowledge base as well as more traditional indicators like agreement and recency. Weighing the evidence from multiple sources to determine which candidate antecedent should win, if any, is the responsibility of the final component, a resolution decision model.

General Guide

BABAR's approach to coreference resolution is unique in that it implements a series of unsupervised learning methods to acquire knowledge in the two areas of existential definite NP recognition and contextual roles—areas that have been either treated not as completely (or not at all) by existing models of coreference resolution. This document reviews the existing models and how they compare to BABAR's acquisition and application of coreference knowledge.

This document then will introduce BABAR's methodology for learning existential definite noun phrases in a topic-specific and unsupervised manner. In addition to detailing the methodology's components, I will introduce experimental results that demonstrate the recall and precision performance of the method. Specifically, I will show how to create valuable lists of existential definite noun phrases, and how a specialized error-checking mechanism can help eliminate inappropriate entries.

The next section details the use of contextual role knowledge in the coreference resolution process. I will discuss why contextual role knowledge should be used for coreference resolution, as well as how it can be acquired and methods for applying it to the coreference resolution process. I will define four mechanisms for applying contextual role knowledge and how to incorporate them into a coreference resolver that also uses more generally available knowledge like that of gender and number agreement.

The next section describes how BABAR's coreference resolution system works. There are four major components to the resolver, including an implementation of the existential definite NP recognizer from Chapter 3, incorporation of the contextual role knowledge described in Chapter 4, and a detailed discussion of a probabilistic model used to evaluate anaphors and their candidate antecedent sets. The decision model I implemented in BABAR is based on the Dempster-Shafer method—a method that has been only rarely implemented in prior attempts at coreference resolution, but which I will argue has a number of distinct advantages, including the ability to assign certainty to a set of candidate antecedents.

Experimental results are then covered. Using two distinct training and test corpora, I empirically evaluated a number of components of BABAR. The first corpus consists of 1,700 Latin American terrorism texts previously mentioned, and the second corpus consists of 8,650 Reuters newswire articles classified by Reuters as involving natural disasters, e.g., hurricanes, flooding, fires, avalanches, etc. With experiments conducted against these text collections, I will present evidence to support both major contributions of this work, i.e., that existential definite NP identification improves the precision of resolutions and that using contextual roles gives a coreference resolver a previously unused and beneficial source of coreference knowledge. The experimental results will also detail the strengths of the Dempster-Shafer model.

Finally, this document concludes by exploring a number of observations I made while developing BABAR, and I will identify several opportunities for continued research on topics introduced by the work. The reader should understand that BABAR offers a number of important contributions to the field of NLP. It reinforces and augments earlier efforts on existential definite NP recognition. It presents new ways of using semantic knowledge and weighing evidence from multiple sources during coreference resolution. Perhaps most importantly, BABAR demonstrates an entirely new way of recognizing contextual information—knowledge which is an important element in computational coreference resolution. In the following chapters, I hope to convince you that these efforts represent not just abstract lessons that add to the body of knowledge, but the conceptual framework over which reliable and practical coreference resolution systems can be constructed and deployed in pragmatically valuable ways.

Related Research

A sizeable amount of research has been conducted on computational approaches to coreference resolution. In general, this research can be grouped into two categories—approaches that implement hand-coded logic, and approaches that learn from marked examples. The hand-coded, or non-learning, systems were the first attempts at coreference resolution. Most of these systems concentrated only on pronominal anaphors and relied solely on syntactic evidence to make their resolutions. More recent efforts have expanded both the number of anaphor types addressed and the sources of evidence. In the last half of the 1990s, there has been a general trend toward constructing systems that incorporate semantic evidence and take advantage of anaphorically annotated corpora to learn the relative value of contributing factors through supervised learning techniques. In the following sections, I will detail these efforts.

Nonlearning Systems

The earliest approaches to coreference resolution focused on implementing a set of logical rules that were hand-coded. Standardized collections of texts were not as prevalent as they are today, and annotated corpora for coreference resolution did not exist. Most of these systems implemented their logic around syntactic evidence, with very little involvement of semantic information. Yet, even with what would be considered today as shallow knowledge, these systems resolved anaphors with respectable levels of performance. This demonstrated that coreference resolution is a problem with diminishing returns, i.e., a large number of anaphors are resolvable with a relatively small amount of knowledge, and resolving the remaining anaphors requires deeper knowledge and increasingly complex handling. As such these systems helped establish a starting point for the more complex approaches that were to follow.

The Hobbs Algorithm

One of the first computational approaches to coreference resolution was built by Hobbs in 1978. In what has become known as the Hobbs Algorithm, antecedents for the pronouns he, she, it, and they are determined on the basis of a full syntactic parse tree for each sentence in a text. The algorithm performs a breadth-first search through the tree looking for noun phrases that match the anaphor in number and gender. Then, it implements linguistic government and binding principles to select an antecedent based on syntactic structure. The algorithm performed well on commonly occurring patterns of coreference, achieving 92% accuracy in testing, and this has led other researchers to use it as a starting point in continuing research. The 92% figure is a bit misleading because over half of the test cases presented only a single candidate antecedent. In tests on only those cases with multiple candidates, the algorithm performed at 82% accuracy.

The testing was performed over 100 pronouns drawn from three sources including an Arthur Haley novel and a 1975 Newsweek article. Cases of it that referred to a time or weather construction (i.e., a pleonastic use) were not included in the test.

The Hobbs Algorithm is important because it demonstrated that a computational treatment of syntactic analysis could resolve anaphors. It focused, however, on only a subset of personal pronouns, and it is unclear if the Hobb's algorithm could extend to nonpronominal anaphors.

Lappin and Leass

One particularly influential system that built on Hobbs' work was that of Lappin and Lease. These researchers concentrated on building a computational system to handle personal pronouns by collecting candidate antecedents and assigning to each one a salience value according to a number of subprocesses. After removing candidate antecedents that conflict in agreement with the anaphor, the candidate with the highest salience value is selected as the antecedent. The key issues behind the Lappin and Lease system are how invalid antecedents are filtered from the candidate list, and how salience values are assigned.

One unique aspect to the Lappin and Lease approach is their filter for pleonastic pronouns, which are semantically empty pronouns, e.g., It is necessary that . . . , It is possible that . . . , and It is believed that . . . . They identify a set of modal adjectives (e.g., necessary, good, certain, likely, etc.) and a set of cognitive verbs (e.g., recommend, know, assume, expect, etc.). Whenever one of these modal adjectives or cognitive verbs is found in one of seven syntactic constructions (e.g., It is <modal-adjective> that . . . ), the pronoun is considered pleonastic and discarded from further consideration. Note that this is a case where the anaphor list is being filtered, not the candidate antecedent list.

For each sentence, the Lappin and Lease system constructs a list of candidate antecedents by collecting the sentence's noun phrases. Each noun phrase is given an initial salience value of 100, and, if the NP fits any of six syntactic tests (e.g., is the NP the subject? is the NP the direct object? etc.) an additional value is added to the NP's salience ranging from 50 to 80 points. These NPs are considered discourse referents and are added to a list of already existing discourse referents from prior sentences. Before processing a new sentence, the salience values of existing discourse entities are halved, which has the effect of biasing coreference decisions toward more recent discourse entities. Lappin and Lease argue that this " . . . constitute[s] a dynamic system for computing the relative attentional state of denotational NPs in text."

Once the discourse entity list is updated, the system attempts to resolve any nonpleonastic pronouns within the sentence. Candidate antecedents can be removed from consideration by the successful application of one of six rules based on syntactic structure and agreement. The initial rule checks for the agreement features of number, person, and gender. The remaining rules verify that a pronoun does not try to link with an antecedent within illegally defined syntactic constraints. These constraints are applied to properly constructed syntactic parse trees and rule out such examples as $She_i$ sat near $her_i$ . . . and $She_i$ likes $her_j$ where $NP_i$ cannot be coreferent with $NP_j$. Any remaining candidate antecedents are ranked by their salience values and the one with the highest value is selected. In the case of ties, the more recent candidate wins.

In tests on sentences extracted from computer manuals, the LandL system correctly identified the antecedents of 86% of 360 third-person pronouns. This result is impressive because no semantic knowledge is used by the system, suggesting that much of the coreference resolution problem can be addressed by syntactic processing. The testing, however, applied some artificial simplifications. First, only third-person pronouns were addressed (he, she, it, they, him, her, them). Second, test cases were somewhat simplified. Test cases were collected by randomly identifying sentences that contained at least one targeted pronoun. Then, the preceding sentence was extracted to represent prior context. These two sentences became the textual unit over which the algorithm operated. The researchers discarded any textual units in which the preceding sentence contained a pronoun. Thus, the system never encountered a case in which, for example, it occurred in both the first sentence as a possible antecedent and in the second sentence as the anaphor to be resolved. Third, apparently no textual unit was selected that did not contain a correct antecedent.

Kennedy and Boguraev

While Lappin and Lease argued that their algorithm demonstrated good accuracy without the need for any semantic input, its syntactic-only approach required in-depth, complete parse trees for each sentence. Kennedy and Boguraev focused on adapting the Lappin and Lease approach to shallower linguistic input, specifically, to work on the output from a part-of-speech tagger rather than a deep syntactic parser. This terminology is slightly misleading in that each word in a sentence in not just tagged with a part-of-speech, but also with what they call grammatical function information, e.g., indications that a word occupies the role of subject, direct object, main verb, etc. Such grammatical function information is typically acquired through syntactic parsing, although such parsing can be shallow in nature. Additionally, the system used a set of regular expression patterns to recognize some noun phrase, relative clause, and noun complement structures. Still, the structure of a sentence representation is much more like what a partial parser would produce than the full parse trees required previously.

Kennedy and Boguraev reported an accuracy rate of 75% when tested on 306 third person anaphoric pronouns taken from a random selection of 27 texts. These texts were a mix of press releases, news stories, magazine articles and product announcements. Compared to Lappin and Lease's 86% accuracy rate, they argued that their results were good considering that their system has limited parsing requirements. Their evaluation, however, did not include a set of 30 pleonastic uses of it, which were removed prior to testing.

Both the Lappin and Lease and Kennedy and Boguraev research seem to indicate that syntactic knowledge is largely sufficient for resolving anaphors. These systems, however, only applied to a limited set of anaphor types, third person pronouns, and they imposed a number of restrictions on testing that make it less clear how these systems would behave in unconstrained environments.

Centering Theory

Centering theory is an approach to discourse analysis that suggests that some anaphors are resolvable with an understanding of the discourse structure of text rather than local syntactic knowledge or semantic agreement between noun phrases. More specifically, centering theory proposes that an anaphoric preference exists for NPs that occur in a sentence's main clause over NPs in subordinate clauses or adjunct phrases. For example, consider:

(1) John saw Jane at the party with Jack. He left in a fit of rage.

Most readers will agree that it was John who left in a rage, even though Jack is the more recent singular male NP. Centering theory suggests that this occurs because John is the subject of the first sentence while Jack is the object of a preposition, i.e., John occupies the discourse focus, or center, of the first sentence. The theory suggests that pronouns have an affinity to be resolved with an NP that represents the discourse center, assuming that simple syntactic prerequisites are met including number and gender agreement.

Centering theory has been proposed as a way to resolve anaphors and as a theory of discourse. The work, however, remains largely theoretical, and it has not given rise to a set of centering-based coreference resolvers. Rather, centering theory is commonly approximated in anaphor resolvers by giving preferences to candidates on the basis of their syntactic role.

Mitkov

In 1998, Mitkov developed a system designed to make coreference resolutions with minimal knowledge of deep linguistic elements. He utilized evidence from sources like recency, lexical similarity, definiteness, and collocation pattern reference. This latter source is related to Dagan and Itai in that it attempts to recognize predicate-argument patterns. Specifically, the collocation pattern reference identified when an anaphor occurred in either a subject-verb or verb-object pattern, giving precedence to those candidate antecedents that were known to occupy the same position of a particular verb.

Mitkov's system performed at 90% accuracy on a test set of pronouns in technical manuals. Inputs to the system were manually marked, however, to gauge the performance of the system without outside influences like parsing errors. Identification of nonanaphoric cases of it was part of this manual process. This can have a sizeable effect on testing. For example, in one test set, of the 223 cases of this pronoun, 167 were nonanaphoric, and thus were removed from consideration.

Poesio and Vieira

One common theme found throughout much of the more recent research in coreference resolution is the difficulty of resolving definite noun phrases. Definite NPs are complex in that their definiteness is not a dependable indication that they are anaphoric. Vieira and Poesio quantified how often definite NPs are anaphoric. In 20 Wall Street Journal articles, they found that 50% of all definite NPs were nonanaphoric, 30% were anaphoric with the same head noun, and the remaining 20% were considered associative, i.e., they could be considered anaphoric, but their antecedents were either not the same as the head noun of the anaphor itself, or they represented a type of coreference other than identity. These results demonstrated why the resolution of definite NPs is so difficult—only half of them represent truly anaphoric discourse entities.

Vieira and Poesio designed a relatively simple, six rule system to both identify nonanaphoric definite NPs and resolve anaphoric definite NPs. They measured performance in two ways, first by examining how well the system performed coreference resolution on the anaphoric definite NPs, achieving 72% recall and 82% precision, and then by examining how well the system identified nonanaphoric definite NPs, achieving 74% recall and 85% precision. The only definite noun phrases that were targeted, however, were those that had antecedents with matching head nouns, e.g., the train with The French TGV train. Their system did not attempt to resolve what they called bridging resolutions, e.g., the car and the vehicle.

Learning Approaches

The systems described so far were largely hand-crafted, i.e., establishing the rules and initial values for settings like salience were manually derived through empirical testing. Two recent developments have spurred work on more machine learning solutions—the availability of online corpora, which provide a universally accessible set of data, and the Message Understanding Conferences, a series of U.S. Government-sponsored conferences designed to explore issues in information extraction. These two factors helped motivate the development of a number of coreference resolvers during the 1990's.

Dagan and Itai

Dagan and Itai used predicate-argument patterns to learn lexical expectations for coreference resolution. Specifically, they used three predicate-argument patterns, subject-verb, verb-object, and adjective-noun, to disambiguate among the possible antecedents for the pronoun it. Their system first constructed lists of instantiated patterns from a preparsed corpus, then it used these lists to suggest the appropriate antecedent based on the anaphor's argument structure. For example, consider (2).

(2) The company set aside tax money last year so the government could collect it this year.

In this case, there are several possible antecedents for the anaphor it, including the company, tax money, and the government. The Dagan and Itai system would recognize that tax money was the appropriate antecedent because money had been seen as the object of collect more often than the other NPs.

Testing was conducted by examining 38 cases of disambiguation. In 33 of these cases (87%), the predicate-argument structures correctly resolved the anaphor. The 38 test cases, however, included only cases of it that were anaphoric, had an antecedent in the same sentence, and could be addressed by a learned predicate-argument pattern.

The predicate-argument patterns used in this work are similar to contextual roles in that both approaches take advantage of expectations that are projected from one grammatical element to another. Predicate-argument patterns, however, operate at a grammatical role level, while contextual roles operate at a thematic role level. Additionally, contextual roles cover a broader set of relational patterns, e.g., including prepositional phrases.

Fisher and Riloff

In 1992, Fisher and Riloff demonstrated that statistical, corpus-based methods could be used to address one aspect of coreference resolution, the resolution of relative pronouns. Fisher and Riloff based their system on the observation that relative pronouns occupy the subject position of a relative clause. For example, consider the following sentence.

(3) We remember the murder of the Jesuit priests who were killed . . . .

In (3), who is the subject of were killed. Fisher and Riloff hypothesized that candidate antecedents could be distinguished by recognizing which candidate antecedent is most likely to have appeared as the subject of were killed. Using a corpus for training, Fisher and Riloff developed a system that generated the probabilities that words occur as the subject of particular verbs. The probabilities were then used to perform coreference resolution on new instances of relative pronoun constructions. Each candidate antecedent was paired with the verb following the relative pronoun, and the candidate with the highest probability was considered to be the correct one.

Fisher and Riloff created two versions of their probability tables. While one was indexed to words, the other was indexed by semantic classes. For example, in the latter case, looking up 15 gunmen would become a check for the semantic class, terrorist, because gunmen was considered to be a member of the terrorist semantic class. A hand-coded, predefined semantic dictionary supported this processing.

In evaluation, the semantic-based tables demonstrated far better results than the lexical-based tables. The latter approach properly resolved only 16% of the relative pronouns, although with 98-99% accuracy—the rest were left unresolved because the corresponding probability values fell below a threshold. When using the semantic tables, 45% of the relative pronouns were properly resolved, with 94% accuracy, and 48% were left unresolved.

One drawback to the Fisher and Riloff system is its tendency to leave many of the cases unresolved. In addition, the system targets only relative pronouns, so applying its lessons to coreference resolution in general is difficult. What is valuable, however, is its demonstration of the usefulness of semantic information. Additionally, the work illustrated that a verb phrase could project lexical and semantic expectations, and these expectations could be used to resolve anaphors.

Cardie

Cardie's work focused on using a case-based, conceptual clustering method to establish the antecedent of a relative pronoun. The case-based method works by building up a memory of training cases, and when a previously unseen case is presented, the system identifies the most similar case held in the memory. The system assumes that the new case can be treated in the same manner as the most similar case was treated. A case is characterized by three types of information. First, the constituents in the prior clause are reported as a list, e.g., SUBJ VP PP PP. (Syntactic roles like subject and direct object are reported when applicable.) Second, the semantic type of each constituent is reported, e.g., human, VP, physical-target, proper-name. Finally, the constituent or punctuation mark that immediately precedes the relative pronoun is reported, e.g., COMMA. Additionally, each case encodes which constituent of the clause is the antecedent of the case's relative pronoun, e.g., the SUBJ. A user creates the training cases by manually marking which anaphors NPs resolve with which antecedent NPs in the texts.

After creating the training cases, Cardie's approach uses a conceptual clustering method to group the training cases such that each group's members exhibit similar qualities. This conceptual clustering step is an effort to generalize what clause structures select a particular constituent as the antecedent. Once the clusters have been learned, new anaphors are resolved by matching the structure of a new anaphor's preceding clause to the clusters with a similarity measure. The most closely matching cluster is retrieved, and that cluster's antecedent role (e.g., SUBJ) is projected as the antecedent for the new anaphor.

Cardie tested her system by evaluating resolutions for the relative pronoun who in 150 MUC-3 terrorism texts. The results established an overall accuracy of 82% while the baseline behavior of simply choosing the most recent constituent as the antecedent achieved 75% accuracy. Cardie notes that her system could achieve accuracy of 87% if pronouns that had no syntactically corresponding cases in the case memory were disregarded.

While Cardie's system demonstrated modest success in relative pronoun resolution, it focused on a single relative pronoun, who, and it is a supervised learning model. Like Fisher and Riloff, the approach also relies on a domain-specific semantic lexicon. Still, Cardie's work demonstrated that syntactic structure coupled with semantic tagging can support automated relative pronoun resolution.

McCarthy and Lehnert

RESOLVE was a coreference resolver designed specifically to work within the framework of a larger information extraction system. McCarthy and Lehnert applied another type of machine learning technique, decision trees, to the coreference problem. Using the C4.5 decision tree learner, the researchers trained their decision tree on 472 anaphor/antecedent pairs, resolved by hand using 50 randomly selected texts from the MUC-5 EJV corpus, a collection of English language news articles about joint ventures. In tests, RESOLVE demonstrated 80% recall and 92% precision while hand-coded rules achieved 68% recall and 94% precision.

RESOLVE demonstrated a number of important features. First, a machine learning algorithm can perform better than hand-crafted rules. Second, all eight of the attributes used by RESOLVE were semantic or lexical in nature. Good results were attained without any syntactic knowledge.

However, because RESOLVE was applied after the information extraction process, it limited both the lists of potential anaphors and potential antecedents by targeting only those NPs that were extracted as organization names by the IE system. Also, many of the eight attributes used lexical matching designed to recognize variation in organization names. While this approach helped RESOLVE achieve strong results in the MUC-5 task, it limits its ability to operate in new domains and outside of its associated information extraction system.

Aone and Bennett

Aone and Bennett also used decision trees in their coreference resolution system, but this system was much more complex, using a total of 66 features, including parts-of-speech, grammatical roles, semantic classes, and distance between an anaphor and candidate antecedent. The system targeted definite NPs, reflexive pronouns, proper nouns, and personal pronouns in Japanese text. It was tested, however, only on those pronouns, proper nouns, and definite NPs that represented organizations within Japanese language texts about joint ventures. Their model performed at 70% recall, 87% precision while a corresponding hand-coded rule-based model performed lower, at 66% recall and 73% precision. Like McCarthy and Lehnert, this system demonstrated an increase in performance when the automated decision tree model replaced hand-crafted rules.

MUC-6 and MUC-7

MUC-6 was the first Message Understanding Conference to define coreference resolution as key component for independent evaluation. The MUC-6 organizers prepared training and testing corpora for coreference resolution consisting of news wire articles on upper management changes. Participants were given a training set of 30 documents that were annotated with anaphoric links. Anaphor types included all pronouns, definite NPs, indefinite NPs, and embedded NPs. Testing was performed over another 30 documents. Seven teams participated in the task, scoring recall measures between 36% and 63% with precision between 44% and 72%, as shown in Table 2.1. The best scoring system was produced by SRI. Also participating was an updated version of RESOLVE (University of Massachusetts) which scored 44% recall and 51% precision. This version included an increased number of features—27 domain independent features and 8 features designed for the domain.

MUC-7 continued the evaluation of coreference resolution systems by focusing on texts involving airline crashes and launch events. Twenty texts were provided as a training set, again annotated with anaphoric links. Another 30 texts were used for testing. Four teams participated (who also participated in MUC-6), although two of the teams each tested two different versions of their systems. Recall ranged from 28% to 58% and precision ranged from 21% to 78%, as shown in Table 2.2. The best combined score for MUC-7 was for the LaSIE-II system (University of Sheffield), scoring 56% recall and 69% precision. The LaSIE-II system used a hand-crafted semantic network to both discard incompatible candidate antecedents and to evaluate the semantic distance between a candidate antecedent and an anaphor. Additionally, their coreference resolver was tightly integrated with their information extraction system and a discourse modeler.

TABLE 2.1

MUC-6 Scores

| Participant | Recall | Precision |
|---|---|---|
| SRI (Kamayama) | 59% | 72% |
| University of Sheffield | 51% | 71% |
| University of Manitoba | 63% | 63% |
| University of Pennsylvania | 55% | 63% |
| New York University | 54% | 62% |
| University of Massachusetts | 44% | 51% |
| University of Durham | 36% | 44% |

TABLE 2.2

MUC-7 Scores

| Participant | Recall | Precision |
|---|---|---|
| University of Pennsylvania 2 | 47% | 78% |
| University of Sheffield | 56% | 69% |
| University of Manitoba 2 | 58% | 64% |
| University of Manitoba 1 | 58% | 63% |
| OKI | 28% | 61% |
| University of Durham 1 | 47% | 57% |
| University of Pennsylvania 1 | 53% | 30% |

Kehler et al.

A system related to RESOLVE, both because it was motivated by the Message Understanding Conferences and because it works in conjunction with an information extraction system, was developed by Kehler et al. at SRI. This system also worked in a postextraction fashion, attempting to recognize when extracted entities corefer. A text was first processed by FASTUS, an information extraction system, that extracted entities, e.g., people and places. Each extracted entity was represented by a template structure that encoded the plurality of the entity and its lexical form. Additionally, FASTUS used domain-specific semantic knowledge to tag each template with an extraction type (e.g., human, location), and this was used to recognize when two templates could not be anaphorically linked because their types did not match. All possible combinations of templates that agreed in type were passed to a probabilistic model which determined the likelihood that each pair coreferred based on three kinds of knowledge: lexical repetition, definiteness of the noun phrase, and distance between two templates in raw character count terms.

The Kehler et al. probabilistic model was trained on 132 anaphor/antecedent sets, established by hand coding over 72 texts. This Kehler et al. system demonstrated accuracy results between 70% and 80% depending on variations within the probabilistic model. Like RESOLVE, this system worked not on NPs in general but on extracted entities, reducing the number of candidate anaphors and antecedents handled.

Kameyama

The best scoring system of MUC-6 came from Kameyama [Kam97], colleagues of Kehler et al. While Kehler et al. had argued to perform coreference resolution after information extraction, Kameyama offered an alternative approach, one that practices pre-extraction coreference resolution. She believed that having full access to the linguistic information in a text outweighs the advantage of limiting anaphors and candidate antecedents to those extracted by an IE system.

Her algorithm was loosely based on that of Lappin and Lease in that candidate antecedents are collected, filtered, and then ordered by salience. Candidate antecedents could be discarded on the basis of number disagreement, type inconsistency (which essentially looked for semantic agreement based on a hand-coded semantic hierarchy), and modifier inconsistency (which checked adjective semantic agreement, e.g., French and British are not consistent). Salience was determined by syntactic preferences that favor intrasentential candidates over intersentential candidates. The system also had an alias recognition algorithm that was used when the anaphor is a proper name. When tested as a participant in MUC-6, Kameyama's system performed with 59% recall, and 72% precision. Like other MUC-6 participants, Kameyama's system addressed definite noun phrases and proper names in addition to pronouns. Of the three types, definite NPs proved to be the most difficult—only 46% were properly resolved.

Ge, Hale and Charniak

The Ge, Hale and Charniak system performed coreference resolution on singular third-person pronouns, including their possessive and reflexive forms, by using four knowledge sources. The first was a simple recency measurement. The second was a slightly modified version of the Hobbs algorithm. The third was the probability that a particular word was the antecedent for a particular pronoun, based on cases collected from training data. (This measure was referred to as gender/animaticity.) The fourth was a simple attempt at modeling attentional state by measuring how many times a discourse entity was mentioned in the text. The algorithm used a Bayesian probability model that took input from these four sources and resolved an anaphor with the most probable antecedent.

This system was trained and tested on the Penn Treebank, a corpus which is accompanied by a complete parse tree of each sentence. The authors note that, even with complete parse trees, they were unable to implement the Hobbs algorithm verbatim because the Penn Treebank parse trees were not compatible with those used by the Hobbs algorithm.

The resolver correctly determined antecedents for 83% of the targeted pronouns. (Pleonastic its were removed from consideration prior to calculating accuracy.) They report that their statistical measure of gender/animaticity agreement was responsible for a large portion of that accuracy. This motivated the search for a way to automatically learn such features so that their system could incorporate a better gender agreement check between anaphor and antecedent.

Consequently, they developed a process that resolved cases of male pronouns (he, him, himself), female pronouns (she, her, herself) or inanimate pronouns (it, itself), projected the corresponding gender/animaticity tag to the antecedent, and saved the results to a dictionary. The antecedent NPs were then assigned a salience value based on how often they were resolved with male, female or inanimate anaphors. The result was a dictionary of learned gender/animaticity tags for nouns.

They experimented with two methods for making the resolutions used for training. The first method matches a pronoun with the most recent NP in a sentence, while the second method uses Hobbs algorithm to resolve pronouns. The second method was more accurate than the first. They manually reviewed the gender/animaticity tags assigned to the 43 most salient nouns and found that only 3 were incorrectly identified. Retesting their system with the learned gender/animaticity knowledge improved accuracy from 83% to 84%. Although the increase in precision was only about 1%, the work is novel in that resolved cases of coreference were used to acquire knowledge that could be later applied to the coreference resolution process.

Cardie and Wagstaff

Cardie and Wagstaff suggested a clustering approach to coreference resolution by creating system that builds up chains of anaphors as it processes a document. In this work, they refer to the anaphoric chains as noun phrase clusters. This work is often referred to as an unsupervised learning algorithm because it requires no marked examples from which to learn. Although it does use the resolution of anaphors within a document to contribute to resolution of other anaphors within the same document, it does not acquire knowledge for coreference resolution in general.

Input to the system is a set of eleven features for each noun phrase in a document. The features include lexical, syntactic, and semantic information. The semantic class of a noun phrase is determined by looking it up in WordNet.

Some of these features are used to eliminate candidate antecedents if the features of the anaphor and candidate conflict (e.g., gender and number agreement). The other features are used to generate a score between two noun phrases indicating the likelihood that they belong in the same anaphoric chain, or cluster.

Initially, every noun phrase exists in its own cluster. A cluster can be scored against another cluster by comparing the noun phrases in one cluster against the noun phrases in the other cluster. The system begins by examining the last occurring noun phrase in the document. Its cluster is compared to each previously occurring cluster, and when the score between two clusters exceeds a threshold, it merges the clusters into a single cluster.

The system returns a set of clusters in which each cluster contains a set of noun phrases assumed to corefer. In evaluations against the MUC-6 data sets, Cardie and Wagstaff's system exhibited recall of 53% and precision of 55%. These scores are lower than the best MUC-6 scores of 59% recall and 72% precision from Kameyama's system, but there is an important distinction between the two approaches. Kameyama used a domain-specific, hand-coded semantic dictionary and taxonomy while Cardie and Wagstaff used the broad-based semantic encoding of WordNet.

Soon, Ng, and Lim

Soon, Ng and Lim focused on training decision trees to resolve anaphors using the annotated corpora from MUC-6 and MUC-7. While RESOLVE and Aone and Bennett used both generic and domain-specific features, the attribute set of Soon et al. consisted of 12 generic features, making it applicable across domains. The features include distance between the anaphor and candidate antecedent, lexical similarity, number and gender agreement, semantic class agreement, proper noun aliasing, and appositive recognition. Semantic knowledge came from WordNet. Each WordNet sense was mapped to one of eight semantic classes: person, organization, location, date, time, money, percent, and object.

The researchers trained a separate C5 decision tree for MUC-6 and MUC-7, each using 30 training texts annotated with anaphoric links. The test corpus for MUC-6 consisted of 30 texts and the system generated 59% recall and 67% precision. For MUC-7, the test corpus was 30 texts, and system performance was 56% recall and 66% precision.

Ng and Cardie

Ng and Cardie have conducted a number of investigations of supervised learning models for coreference resolution. This work includes improved methods for learning classification rules, bootstrapped approaches to classification, as well as a decision tree model that included a set of 53 features, more than the feature sets of RESOLVE or Soon et al. Many of their original features capture syntactic rules for agreement, binding constraints, and syntactic role assignment.

Ng and Cardie implemented their feature-based approach using both a decision tree learner (C4.5) and a rule learner (RIPPER).

They trained and evaluated their system over the MUC-6 and MUC-7 corpora. The researchers found that their larger collection of features did not necessarily improve performance. As measured against a baseline, using all the features generated higher levels of recall with decreased levels of precision.

As a result, Ng and Cardie hand-selected which of the 53 features should be used. By removing features that appeared to be overly aggressive, they improved both recall and precision scores. On MUC-6, recall increased from 62.4% to 64.1% and precision moved from 70.7% to 74.9%.

Ng and Cardie followed this work with an exploration of how identification of nonanaphoric NPs would affect coreference resolution. Their effort paralleled elements of this dissertation by including in their coreference resolver the ability to discard nonanaphoric NPs from resolution. (Chapter 3 will explore this process in detail.) Ng and Cardie developed a decision tree model for determining whether an NP was anaphoric or not depending on 37 features. These features looked for syntactic constructions surrounding the NP (e.g., is the NP postmodified by a relative clause?), lexical clues (e.g., is the NP in uppercase?), semantic information (e.g., is the NP a title of a person?) and positional information (e.g., is the NP in the first sentence?). They trained and tested their system on MUC-6 and MUC-7 corpora, and they incorporated it into the coreference resolver from their earlier work [NC02]. To evaluate the effect of their nonanaphoric NP classifier, they examined the results of the test corpora with the nonanaphoric NP classifier and without it. Engaging the classifier improved precision at the expense of recall: in the MUC-6 test set, recall dropped from 70% to 57% while precision improved from 58% to 72%. They later adjusted their feature sets to include two additional methods of identifying lexical repetition, and this led to results with recall of 63% and precision of 66%.

Comparing BABAR to Prior Efforts

BABAR makes several contributions to the existing research on computational coreference resolution. First, it offers the first nonanaphoric NP classifier that identifies existential definite NPs both through the use of syntax and through the unsupervised learning of existential NP lists and NP patterns. For example, while Vieira and Poesio and Ng and Cardie recognize nonanaphoric definite NPs, they do so only by using syntactic clues. BABAR's ability to learn isolated nonanaphoric definite NPs from a corpus expands the reach of the classifier by supporting its ability to resolve definite NPs in addition to the more traditional resolution of pronouns. BABAR's unsupervised learning model for nonanaphoric NPs, and Chapter 6 includes experiments that illustrate its value to the coreference resolution process as a whole.

Second, most coreference resolvers make decisions based on evidence from some combination of syntactic constraints, lexical similarity, semantic agreement, number agreement, gender agreement, recency, and syntactic roles. BABAR introduces a new source of knowledge for anaphora resolution—contextual roles. There is similarity between the predicate-argument approach used by Dagan and Itai and contextual roles in that both techniques recognize the roles projected by verbs. Contextual roles, however, operate at a thematic role level, as opposed to a grammatical role level, and caseframes can also recognize the roles projected by nouns and attached prepositional phrases. Briefly, a contextual role is the notion that someone or something plays a specific role in an event or relationship, e.g., the plaintiff in a lawsuit and the victim of a kidnapping. Material below defines contextual roles in detail, explains how they are represented in BABAR, and discusses how they can be used to resolve anaphors that cannot be resolved otherwise.

Third, BABAR implements a decision algorithm based on the Dempster-Shafer model of evidence. This model gives BABAR an ability to effectively combine knowledge about anaphoric relationships from all of its knowledge sources, even when a knowledge source is unable to distinguish between two potential antecedents. Prior to this work, only Kehler had implemented a Dempster-Shafer decision model.

Finally, most recent coreference resolution systems are based on supervised learning algorithms, requiring annotated examples. BABAR, however, acquires its knowledge through an unsupervised learning process that requires only a large, domain-specific corpus of texts. Previously, only Ge et al. had shown that unsupervised learning could generate knowledge to assist in the resolution of other anaphors. In that work, the authors used a coreference resolver, based on the Hobbs algorithm, to provide cases of resolved anaphors to the learning model. BABAR's approach is different in that it identifies cases of anaphors—both pronouns and definite NPs—that can be resolved reliably, without applying a coreference resolution algorithm. BABAR collects cases of resolved anaphors using a set of heuristics that resolve cases of both pronominal and definite NP anaphors, thus automatically generating a more comprehensive and highly accurate training set. This document presents these heuristics and describes BABAR's unsupervised learning process.

Existential Definite Np Identification

When performing coreference resolution, the step of identifying whether or not a noun phrase is anaphoric is often left unaddressed, i.e., every noun phrase in a document is assumed to be anaphoric by the resolution algorithm. After all, in the case of pronominal anaphors, pronouns are quite likely anaphoric. This is not the case, however, for definite noun phrases—noun phrases that begin with a definite article. In this work, I define definite descriptions (or definite NPs) as those NPs that begin only with the. Specifically, a definite NP like the CIA may not have an antecedent in the document. The noun phrase itself carries enough semantic information that we know what it means without needing to examine the preceding discourse. How should a coreference resolver treat these nonanaphoric NPs?

One approach to handling definite noun phrases would be to simply apply the coreference resolution algorithm to every definite NP. If the algorithm is unable to find an antecedent for an NP, it could assume the NP is nonanaphoric, but this mixes two issues. Does an anaphor/antecedent pair appear to be unlikely because there is little evidence to support it, or because the anaphor NP is not really anaphoric? This is the difference between determining whether there is an antecedent at all and what the best choice of antecedent is. Without a way to make this distinction, the resolver will be less able to make reliable decisions when only small amounts of evidence exist. Alternatively, the resolver may also be misled in cases where strong evidence supports the mistaken resolution of a nonanaphoric noun phrase. If we can separate the two issues, we give the coreference resolver the ability to focus on each one independently. How should we go about solving the first issue of nonanaphoric definite NP identification?

We could manually construct lists of definite noun phrases that do not need antecedents, but this process would be tedious at best and intractable at worst. A better approach would be to establish a model that learns such lists automatically. This chapter describes such a model for classifying definite noun phrases as anaphoric or nonanaphoric based on a corpus of representative documents, and Chapter 5 describes how the model can be incorporated into a comprehensive coreference resolution system.

Motivation

As I looked at cases of anaphors to explore hypotheses around the use of contextual roles, I began to notice a regularly occurring problem. A sizeable number of definite NPs did not have an antecedent in the text. They clearly projected an implicit, mental antecedent, but that antecedent could not be found in the document. Additionally, many of these noun phrases were topic specific. This initial exploration was conducted on texts describing Latin American terrorist and military incidents, so many of these NPs were the names of terrorist groups and paramilitary organizations, e.g., the ELN, the FMLN, and the FARC. The texts were primarily newspaper articles and radio transcripts which were written with a particular audience in mind, an audience that would be familiar with the references. These nonanaphoric definite noun phrases are existential NPs, definite noun phrases that are nonanaphoric because their referent can be described using the existential uniqueness operator from first order logic. Setting aside the logical foundations of the term, existential NPs are the class of definite noun phrases that do not have explicit antecedents preceding them in a text, and therefore, should not be treated as traditional anaphors by a coreference resolver.

Existential NPs like the ELN and the FMLN could be further classified as what I called semantically independent existential NPs because their meaning is understood through the real world knowledge of the reader. They gain their existentialism from their own semantic content, not from the way they were used, i.e., no syntactic construction or deictic reference is necessary to understand their meaning. This was not, however, the only type discovered.

Upon further investigation, I recognized that an additional class of definite noun phrases is not anaphoric because of the way that they are presented to the reader. In these cases, there is enough information in the surrounding sentence or clause to uniquely determine the meaning of the noun phrase, typically through syntactic modification:

(1) Elvis has left the building that I just entered.

(2) Elvis has left the building called the Delta Center.

(3) Elvis has left the new civic center building.

(4) Elvis has left the building on the corner.

In all these examples, "the building" is restrictively modified, i.e., linguistic elements sufficiently constrain the meaning of the noun phrase in the reader's mind that no antecedent in the text is necessary. Such modification can come from relative clauses, prepositional phrases or preceding nouns and adjectives.

These observations led to a two-pronged approach on creating a model for existential NP recognition. First, the model would need to recognize the various ways that existential NPs are restrictively modified so that it could identify when a definite NP was involved in such constructions. I settled on eight types of syntactic constructions that can be recognized through the use of heuristics. Second, the model would need to identify topic-specific semantically independent existential NPs, those NPs that have no structural clues. I derived a set of learning algorithms that acquire lists of these noun phrases, and lists of NP patterns, from a corpus of texts. In the end, the model for existential recognition is successful in that it learns in a fully unsupervised manner, and it performs at high levels of recall and precision.

Definite Noun Phrase Taxonomy

I found it appropriate to categorize definite NPs based on a taxonomy of classes, as shown in FIG. 2. First, a definite noun phrase can refer to an antecedent that precedes it in the text (referential), or it can exist in the reader's frame of reference without the need for an explicit antecedent (existential). An existential noun phrase is one that completely specifies a cognitive representation of an entity to the reader. Note that the representation may not exist in the real world, e.g., Santa Claus.

Second, existential noun phrases can be subdivided into independently existential cases and associative existential cases. An associative existential is a noun phrase that does not have an antecedent in the text, but which refers to something that is implicit in, or can be inferred from, the context. For example, in a sports article that describes a basketball game, we may find the ball, the hoop, and the score. These are associative existential NPs because they do not require explicit antecedents in the text, but readers will understand their meaning in the context of a basketball game. This is different from a reference to the University of Utah basketball team because this noun phrase fully specifies its meaning and can be understood independent of surrounding context. Associative existential NPs are similar to implicatives, but not all implicatives are noun phrases. For example, the basketball game implicates that there are two teams at play and that one will win and one will lose.

Third, the independent existential noun phrases can be subcategorized into syntactically independent and semantically independent existentials. In the first case, the syntax of the noun phrase, or the syntax of the clause surrounding the noun phrase, is enough to make the NP existential. In effect, the syntax restricts the possible meaning of the noun phrase to the point where it becomes unambiguous. Such syntactic effects can be driven by premodification or postmodification on the NP. Examples of restrictive premodification include:

The September 11$^{th}$ hijackings . . . .

The 39$^{th}$ U.S. president . . . .

The 101$^{st}$ Airborne division . . . .

Examples of restrictive postmodification include:

The man who shot Liberty Valance . . . .

The building on the corner of 4$^{th}$ and Main . . . .

The airplane that was intercepted by the Chinese . . . .

Semantically existential noun phrases are those that are existential without the need for any syntactic restriction. Examples include:

The CIA

The United Nations

The White House

The weather

In general, BABAR attempts to identify independent existential NPs by A) looking for a set of syntactic clues that appear to be acting as restrictive pre- or postmodification, B) by learning lists of common semantically independent existential NPs, and C) by learning patterns that give rise to existential NPs. The syntactic clues are predefined as a set of heuristics, and the discovery of the existential NP and pattern lists is the result of a corpus-driven learning process described in the next section. BABAR does not address associative existentials, as they probably require a fundamentally different type of identification process.

Acquiring and Recognizing Existential Noun Phrases

BABAR's implementation of the existential NP learning model consists of five procedural components (see FIG. 3), three of which are tasked with learning lists of existential NPs and existential NP patterns (a, b, c in FIG. 3). These NP lists and pattern lists make up the existential NP knowledge base that will later be incorporated into BABAR's overall coreference resolution architecture. A fourth component (d, in FIG. 3) applies a set of syntactic heuristics to identify existential NPs during runtime, and a final fifth component (e, in FIG. 3) applies an error correction routine referred to as vaccination. In this section, I will describe each component in detail.

Acquiring Existential Noun Phrases

Sentence One Extractions (S1)

BABAR's first existential NP learning component is based on the observation that the structure of a text itself can be used to identify semantically independent existential NPs. Specifically, BABAR assumes that noun phrases that occur very early in a text are likely to be existential because there are few (if any) plausible antecedents for them. The model approximates this observation by collecting all of the definite noun phrases that appear in the first sentence of a text. These NPs are assumed to be existential and placed in the S1 list.

Existential Head Patterns (EHP)

While experimenting with the S1 list, I noted that many of the noun phrases suggested patterns that could identify other existential NPs. For example, if the S1 list contained the Salvadoran government, the Cuban government and the Nicarguan government, a pattern of the form, the <x> government, could identify other instances of similar NPs that would likely also be existential.

BABAR takes as input the S1 list, and using the algorithm in FIG. 3.3, creates a set of patterns focused around the head noun called existential head patterns (EHPs). The EHP algorithm examines each NP in the S1 list, attempting to construct a pattern focused on the head noun of that NP. The head of an NP is not always represented by a single word, however, e.g, in the U.S. armed forces, BABAR should generate a pattern around the phrase armed forces, not the single term forces.

The algorithm is designed to generate patterns around the most specific combination of terms that appear to be acting as head nouns. For example, assume that the S1 list contained the 2$^{nd}$ Infantry Division, while the corpus contained additional similar NPs (in positions other than the first sentence), including the 63$^{rd}$ Infantry Division, and the Cuban 4$^{th}$ Infantry Division. When the EHP algorithm examines the 2$^{nd}$ Infantry Division, it creates the maximally general pattern, the <x+> Division. The algorithm finds that this pattern applies to a number of noun phrases in the corpus, including the 63$^{rd}$ Infantry Division and the Cuban 4$^{th}$ Infantry Division. After recording this frequency, it would try to further specify the pattern to the <x+> Infantry Division. Upon finding that the new, more specific pattern applied to the same number of NPs in the corpus, the more specific pattern would supercede the more general one. One more iteration would demonstrate to the algorithm that further specifying the pattern (e.g., the <x+> 2$^{nd}$ Infantry Division) would only decrease its applicability. Consequently, the algorithm would decide that Infantry Division represented a phrasal head noun, and it would generate the <x+> Infantry Division as part of the EHP list.

Definite-Only List (DO)

The training corpus can also be used to collect statistics on how often a particular noun phrase occurs in definite and indefinite form. BABAR assumes that noun phrases that occur only as definite noun phrases are more likely to be existential. For example, "the FBI" and "the contrary" are rarely, if ever, found as "an FBI" or "a contrary." Consequently, component (c) in FIG. 3 compiles a list of nouns that only appear as definite NPs and assumes that they are existential.

To generate the definite-only (DO) list, BABAR passes over the training corpus in two stages. The first stage collects a list of all definite noun phrases in the corpus and statistics on how often each one occurred. The second stage takes the list as input and reprocesses the corpus looking for cases in which the definite noun phrases occurred in indefinite constructions. The model then sorts the definite NP list first by the definite-only probability and then by frequency of definite occurrence. Noun phrases at the top of the list will be those that occur often and have a high probability of occurring only in definite constructions.

As a final step, the list is filtered against two thresholds. The first threshold selects only those noun phrases that occurred at least five times in the training corpus, and the second threshold selects only those noun phrases with 100% definite-only probability. The filtered list is called the DO list, and all its noun phrases are considered existential.

Applying Existential NP Knowledge

The S1, EHP, and DO components of BABAR are designed to acquire domain-specific knowledge of existential noun phrases given a representative training corpus. These elements, however, only recognize semantically independent existential NPs. To complement these elements, BABAR uses a set of syntactic heuristics to recognize syntactically independent existential NPs at runtime. Additionally, when knowledge acquired by the S1, EHP, and DO methods is applied at runtime, BABAR engages an error correction method to catch cases where incorrect learning has occurred. Both the error correcting vaccine and the syntactic heuristics are described below.

Syntactic Heuristics

BABAR attempts to recognize restrictively pre- and post-modified definite NPs by applying a set of eight heuristics that look for structural clues. For example, when a head noun is premodified by a proper noun, that modification is typically restrictive enough to classify the entire noun phrase as existential (the U.S. president vs. the president). Each heuristic is presented in Table 3.1 with representative examples in which the definite NP in question is shown in boldface.

These syntactic heuristics are not perfect, and they may make mistakes, but they tend to operate correctly far more often than not. BABAR applies the heuristics as the first step in classifying noun phrases as existential or referential. The complete application algorithm will be discussed shortly. Before this can happen, though, a final element to the existential classification model needs to be introduced.

Vaccine

With the syntactic heuristics and results of the knowledge acquisition process, BABAR has the raw materials to perform existential NP classification. When a new text is fed to the existential classifier, its noun phrases are examined by an algorithm that relies on the acquired knowledge base and heuristics.

Occasionally, the assumptions underlying the knowledge base and heuristics can be violated, leading to incorrect classification behavior. There are two common types of errors.

1. An incorrect S1 assumption. The S1 assumption fails when a definite NP in the first sentence of a document is not existential. This failure is problematic for two reasons. First, the NP is added to the S1 list leading to incorrect S1-based classifications. Second, since EHPs are constructed from the S1 list, a spurious EHP may be created as well.
2. Potential existentialism. A definite noun phrase can be existential in one text, but referential in another. In the terrorism training corpus, for example, the guerrillas can be existential when referring to antigovernment rebels in general, or it can be referential when referring to a particular group of insurgents introduced earlier in the text.

BABAR implements a vaccine to guard against these types of errors. The term vaccine seems appropriate because it identifies elements in the S1 list that could have infected the EHP generation.

TABLE 3.1

Existential Heuristics

| Heuristic | Description | Example |
|---|---|---|
| 1. Followed by Relative Clause | Any definite NP followed by a relative clause. | (1) Ayacucho is the base of the military command that controls . . .<br>(2) The major problem now involves the 17 million boxes that arrived . . . |
| 2. Followed by Reduced Relative Clause[1] | Any definite NP followed by a reduced relative clause. | (1) Judicial employees lifted the strike they began on 17 August . . .<br>(2) The artillery attack staged by the rebels last night . . . |
| 3. Followed by PP | Any definite noun phrase followed by any prepositional phrase (PP). | (1) Arena must respect the nationalization of banks, foreign trade, and . . .<br>(2) The authors of the crime were presumably referring to the murder . . . |
| 4. Followed by Simple Infinitive VPs | Any NP that is the subject of a bare infinitive VP. | (1) The opportunity to vote . . .<br>(2) The only means to ensure . . . |
| 5. Capitalized NP | Any of the words in the noun phrase are capitalized. | (1) The American president<br>(2) the United Nations |
| 6. Superlative | Any noun phrase in which one of the premodifiers is a superlative. | (1) The slightest noise<br>(2) The greatest concern |
| 7. Time | A noun phrase that is either premodified by a time-related adjective or noun or is headed by a time-related noun. | (1) the early morning hours<br>(2) the time<br>(3) the afternoon sun<br>(4) the 1996 elections |
| 8. Count NPs (Identifies referential NPs.) | Any NP that is premodified by count terms is considered referential, i.e., not existential. | (1) the two men<br>(2) the five escaped criminals<br>(3) the second juror |

[1]Identification of reduced relative clauses can be a complex issue for a parsing engine. BABAR's parser uses a list of intransitive verbs to identify constructions in which the NP immediately following a VP should be parsed as the subject of a following clause rather than a direct object of the current clause.

For example, in the terrorism corpus, I identified several of incorrect S1 members, including the base, the individuals, the attack, and the banks.[2] These noun phrases, though, also occurred in the definite/indefinite list constructed during the DO training, but at the bottom of the list, indicating that they were often seen in indefinite constructions. BABAR's vaccine algorithm uses the probability of definite-only occurrence to gauge the validity of an S1 member or an EHP derivation. Any S1 or EHP-captured noun phrase with a definite-only probability above an upper threshold is considered existential. Any such noun phrase with its definite-only probability below a lower threshold is considered suspect and is not classified as existential. S1 or EHP-captured noun phrases with definite-only probabilities between the upper and lower thresholds are considered to be potentially existential and treated as follows.

[2] Although these examples would not generate existential head patterns (EHPs are based on NPs with three or more words), because the S1 list is the raw material for EHP generation, other incorrect S1 list members may have led BABAR to create inappropriate EHPs.

Noun phrases that are potentially existential appear to function differently depending on where they occur in a text. Those that occur early in the text are more often existential while those that occur late in the text more likely refer to an explicit antecedent. BABAR implements this observation by enforcing an early occurrence threshold of three sentences. Potentially existential NPs that occur in the first three sentences of a text are classified as existential, all others as referential.

The complete vaccine algorithm, shown in FIG. 5, is applied by BABAR during runtime.

Existential Np Identification Algorithm

BABAR applies existential noun phrase knowledge during runtime according to the algorithm illustrated in FIG. 6. It begins by extracting each noun phrase in the text and applying the five existential identification components in sequence. Four of the components may classify a noun phrase or leave it in play for later components to classify. The fifth component, the vaccine, applies itself as a secondary process behind the S1 and EHP methods. The first step, though, involves applying the syntactic heuristics.

The syntactic heuristics (detailed in Table 3.1) are applied to each NP. When a heuristic fires, it classifies the NP as referential or existential according to its logic. NPs that are not caught by the heuristics are passed on to the DO method as unclassified.

Next, BABAR's DO method performs a list lookup against the list of NPs that have occurred only in definite constructions. The NPs produced by the DO method are almost always existential, so no vaccination is necessary on its decisions. NPs not treated by the DO method are passed on to the S1 method.

The S1 method is also a lookup, this time against the S1 list. If the list contains the NP, it is temporarily classified as existential and sent to the vaccine for further evaluation. The vaccine algorithm will elect to either accept the S1's existential classification or overrule it by changing the classification to referential. Note that the majority of the existential classifications made by the S1 method are accepted by the vaccine. NPs without a match in the S1 list are passed on to the EHP method.

Applying the existential head patterns to the NP is the role of the EHP method, and if it classifies the NP as existential, the vaccine algorithm will evaluate the NP further. Again, it may elect to accept the EHP classification as existential or overrule it as referential.

At the conclusion of the EHP method, any remaining NPs are assumed to be referential.

Evaluation

Training

BABAR's existential recognition model was trained on 1,600 texts from the 4$^{th}$ Message Understanding Conference and evaluated on a blind test set of 50 texts from the same source. These texts primarily consist of newspaper articles and radio transcripts from Latin America and focus mainly on military operations, police actions, and terrorist acts. All texts are written entirely in upper case, so case-sensitive methods (e.g., for proper name recognition) are not applicable. The training corpus was processed initially by Sundance, a partial parser developed at the University of Utah.

Extracting definite noun phrases from the first sentences of each text generated 849 definite NPs for the S1 list. These NPs were fed to the EHP algorithm, generating 297 EHPs. The DO list was implemented in two ways-one for the head nouns only and one for full definite NPs. The DO list was constrained to extract NPs that occurred at least five times in the training corpus with a definite-only probability of 100%. Examples from the S1, DO, and EHP lists can be found in Appendix A.

After training the S1, DO and EHP lists, BABAR processed the test corpus of 50 documents using the algorithm previously shown in FIG. 3.5.

To evaluate the behavior of the existential identification algorithm, each definite noun phrase in the test corpus was hand-tagged according to the taxonomy described in FIG. 2. Table 3.2 shows the distribution of existential and referential NPs in the test set. A total of 1,001 definite noun phrases were hand-tagged, 72% of which were found to be existential.[3] This illustrates the importance of existential NP recognition. An coreference resolution approach that assumes all definite noun phrases to be anaphoric is immediately making the wrong assumption for the majority of the cases.

[3] Note that 9% of the cases represent associated existential NPs which are not treated by BABAR's existential identification approach.

Testing

BABAR's existential NP recognition performance was measured using recall and precision metric. To establish a baseline, I first examined a simplistic classification algorithm—classify all definite NPs as existential. Table 3.3 shows that recall under this approach is guaranteed to be 100%, but precision is only 72.2%, as the NP distribution would suggest. The practical effect of this baseline, though, is more dramatic than its performance numbers suggest. No definite NP would be classified as referential, so no definite NPs would be resolved by an anaphor resolver.

From a design perspective, I typically considered high measures of precision to be preferable to high measures of recall because of the way this model participates in BABAR's larger coreference resolution algorithm (described in Chapter 5). If the existential recognizer incorrectly classifies an NP, the encompassing coreference resolver will take that as fact, potentially leading to either a missed resolution or a misresolved resolution. Alternatively, if the existential recognizer leaves a noun phrase unclassified, the coreference resolver can still apply its own logic in determining how to treat the noun phrase.

TABLE 3.2

| NP Distribution in the Test Corpus | | |
|---|---|---|
| NP Type | Count | Percentage |
| Independent existential, syntactic | 478 | 48% |
| Independent existential, semantic | 153 | 15% |
| Associative existential | 92 | 9% |
| Referential | 270 | 28% |
| Total | 1001 | 100% |

TABLE 3.3

| Evaluation Results | | |
|---|---|---|
| Method Tested | Recall | Precision |
| 0. Baseline | 100% | 72.2% |
| 1. Syntactic Heuristics | 43.0% | 93.1% |
| 2. Syntactic Heuristics + S1 | 66.3% | 84.3% |
| 3. Syntactic Heuristics + EHP | 60.7% | 87% |
| 4. Syntactic Heuristics + DO | 69.2% | 83.9% |
| 5. Syntactic Heuristics + S1 + EHP + DO | 81.7% | 82.2% |
| 6. Syntactic Heuristics + S1 + EHP + DO + Va | 77.7% | 86.6% |
| 7. Syntactic Heuristics + S1 + EHP + DO + Vb | 79.1% | 84.5% |

Va = upper threshold of 70%, lower threshold of 25%
Vb = upper threshold of 50%, lower threshold of 25%

Moving up from the baseline, BABAR's existential recognition performance was examined using only the syntactic heuristics. The heuristics generated high precision (93.1%) results, but they address only a small number of cases (43.0% recall). Each of the S1, EHP, and DO methods were added to the syntactic heuristics as independent trials. Although each method exhibited a drop in precision, gains on the recall side were generally twice the precision loss. Combining the syntactic heuristics with all three methods again generated strong increases in recall while inviting minor reductions in precision. At this point, BABAR was behaving in balanced way—81.7% recall and 82.2% precision.

Finally, I incorporated the vaccine method, applying it to the S1 and EHP lists. The vaccine's behavior is dictated by two thresholds—the upper definite-only probability and the lower definite-only probability. I conducted two experiments, setting these thresholds at (70%, 25%) and (50%, 25%). By lowering the upper threshold, BABAR becomes more aggressive, increasing the number of S1 and EHP list members that classify NPs as existential. Not surprisingly, the tighter restrictions of (70%, 25%) generated the highest precision numbers of the two final trials. The vaccine is an attempt to increase precision without sacrificing recall, and comparing trial 5 with trial 7 illustrates this was largely accomplished.

When comparing the behavior of this approach to existing methods, the most appropriate comparison is with the work of Vieira and Poesio [VP97], whose approach achieved 74% recall and 85% precision when identifying "larger situation and unfamiliar use" NPs. Their classification of definite NPs is not entirely congruent with this work because my classification scheme considers associative NPs to be existential while theirs does not. A more equitable comparison measures our existential identification algorithm only on independent existential NPs. Using the vaccine thresholds of (70%, 25%), the algorithm performs at 82% recall and 86% precision, while the vaccine thresholds of (50%, 25%) generate 83% recall and 84% precision. While it is difficult to directly compare both approaches, since they are based on different corpora, BABAR seems to achieve roughly the same levels of precision as Vieira and Poesio, but at considerably higher levels of recall. The key difference between the two approaches is that while both recognize restrictive modification, BABAR acquires and applies topic-specific knowledge through its S1, EHP, and DO methods. The advantage is that this knowledge addresses a class of existential NPs that cannot be treated by restrictive modification methods. The disadvantage is that BABAR requires training over a topic-specific corpus, while the Vieira and Poesio model does not.

Advantages and Disadvantages

BABAR's model for existential NP recognition contributes to the field in a number of ways. It offers independent validation of earlier work that used restrictive modification to identify existential NPs, and it offers three unique methods (S1, EHP, and DO) for expanding the reach of automated existential NP classification. Furthermore, it demonstrates that independent existential NPs can be learned automatically from a corpus of topic-specific texts. The learning process, however, is not without drawbacks.

To train BABAR's existential NP recognizer, you must first have a relatively large training corpus of texts. These texts must be topic-related so that repetition of topic-specific terms will be statistically recognized by the learning methods. Note that although large corpora of texts are becoming increasingly common, they are not always available. In certain commercial environments, for example, it may not be possible to acquire large quantities of topic-specific texts due to proprietary data concerns or other security reasons.

Although the existential NP learning model requires a large corpus, it is important to note that its learning algorithms are fully unsupervised, i.e., the training corpus does not require labeled examples from which to learn. This feature should not be underestimated. Given a topic-specific collection of texts, the training of this model requires no human involvement. BABAR's existential NP recognition model, then, offers a powerful combination—a model that tunes itself to the vocabulary of a specific topic while requiring no human intervention, assuming nothing other than a raw text collection for training.

Existential NP identification was not the original goal of this dissertation. It was always meant to be a stepping stone on the path to a broad-based computational treatment of coreference.

After having established the performance characteristics of the existential NP learning methods, I was optimistic that the model would incorporate well with a larger coreference resolution system, but it was unclear exactly what the benefit to the complete system would be. Thus, any complete understanding of the value of BABAR's existential NP identification must take into account both the results of the model in isolation and the effect of the model to coreference resolution in general. While this chapter has focused strictly on the existential NP identification model, later material herein details a comprehensive system of coreference resolution that includes existential NP recognition. This document also evaluates the behavior of that system, including measuring the value of taking existential NP identification into account. I had hypothesized that classifying definite NPs prior to coreference resolution would increase the precision of resolutions, and this document offers empirical evidence in support of this hypothesis.

Contextual Role Knowledge

Introduction

Motivation

As mentioned above, this work began with the observation that many NLP tasks could be improved if coreference resolution were performed. Information extraction, text classification, and information retrieval could benefit if the underlying NLP technology resolved anaphors with their antecedents. I observed anaphors falling into two major categories, based on their behavior. The first category included anaphors that found their antecedents on the basis of sentence structure. The majority of these cases were reflexive pronouns and relative pronouns:[4]

[4] These observations were based on examples from U.S. government-supplied texts [Pro92], primarily newspaper articles and radio transcripts from Latin America terrorist acts and other incidents often related to terrorism. The terrorism corpus is a case-insensitive, all-caps corpus. The case sensitivity of the examples is my own, added for readability.

(1) This is the time when we must show our solidarity with those mothers who have lost their sons.

(2) . . . there was also a group of 11 British mercenaries, who gave lessons to 50 students.

(3) Colonel Rivas himself was the one who discovered who committed the crime.

In many of these cases, prior linguistic theory and NLP research efforts offered a starting point for coreference resolution. For example, linguistic binding theory dictates how syntactic structure restricts the possible antecedents for reflexive pronouns. Also, it was generally understood that relative pronouns make reference to an antecedent that occurs in the preceding clause, but only after that clause's verb phrase. Not all such anaphors could be resolved using syntactic structure, but there was a body of work that could be applied as a starting point.

The second category of anaphors required some level of contextual understanding:

(4) A spokesman for the Brazilian embassy in Colombia has confirmed the release of Ede Globo journalist Carlos Marcelo who was kidnapped by Colombian Army of National Liberation Guerrillas. Marcelo was writing an article on the kidnapping of the three Braspetro [Petrobras International, Inc.] Engineers when he was abducted by the guerrillas.

(5) When the "Miss Patsy" ran aground, the crew members of the other ships came to help, and during this time, apparently, the ship called "Davis Jr" managed to escape. We have been unable to find it . . . .

Often, context helps define which discourse entity represents the center of discourse, and this appears to help define the most likely candidate antecedent for an anaphor. Note how (4) centers on Carlos Marcelo, which appears to lead the reader to the resolution of he with Marcelo. While centering theory holds promise for automated coreference resolution, it is not the only way that context can generate anaphoric evidence. For example, (4) contains two expressions that are semantically similar:

" . . . Carlos Marcelo who was kidnapped . . . ."

" . . . he was abducted . . . ."

Assuming that the relative pronoun who in the first mention is resolved with Carlos Marcelo, both the anaphor and the candidate antecedent share similar contextual roles. I define a contextual role as the combination of an event and a manner of participation in that event. More specifically, a contextual role is defined by two possible constructions. First, a contextual role may be the combination of an event and a thematic role, e.g., <agent> kidnapping. Second, a contextual role may be the combination of a predicate and argument relation, e.g., <NP> has green eyes. This latter type typically identifies roles of possession, property, or condition.

In (4), who was kidnapped generates the contextual role of victim of a kidnapping, and he was abducted generates the contextual role of victim of an abduction, as shown in Table 4.1. In this case, the relationship between the contextual roles is synonymy. One hypothesis of this dissertation is that recognizing synonymous relationships between contextual roles can help resolve anaphors.

Contextual roles can also be related by sequence. In (5), it is plausible that it is resolved with the ship called "Davis Jr" because often those things that manage to escape are later the same things that cannot be found. Other sequentially related contextual roles include a person hit in a car accident followed by a person going to the hospital, a hurricane moving onshore followed by a hurricane losing strength, and an aircraft being fired upon followed by an aircraft crashing.

TABLE 4.1

Contextual Role Example

| | Contextual Role | |
|---|---|---|
| Example | Event | Participation |
| . . . Carlos Marcelo was kidnapped. . . | kidnapping | victim |
| . . . he was abducted . . . | abduction | Victim |

In addition to synonymy and sequence, I found that contextual roles could be related through a sort of set membership, i.e., the roles were associated with each other because someone or something typically engages in many of these actions. For example, the actions of a university basketball coach may include the contextual roles of teaching his players, setting game strategy, consulting with his assistant coaches, and enforcing NCAA rules. These contextual roles are not synonymous, nor must they occur in a particular order. Instead, they are associated as members of a set—the set of contextual roles typically performed by a coach.

This dissertation also asserts that a contextual role generates expectations that can be used to select the most appropriate antecedent for an anaphor. Consider the following examples.

(6) The plane departed Bogota toward Cali, at 1213 GMT, but two powerful explosions brought it down after only 5 minutes in the air.

(7) We hit the helicopter near Saquiro in ARCE street and it crashed.

(8) Although the bomb exploded under the bridge, it was not seriously damaged and suspension of traffic was unnecessary.

(6), (7), and (8) illustrate cases of the anaphor it. This anaphor is particularly difficult to resolve computationally because it carries very little semantic information on its own—it can resolve with virtually any inanimate entity. In all three examples, however, it occupies a contextual role, and this role suggests semantic expectations that help resolve the anaphor. Specifically, the semantic expectations can eliminate incompatible candidate antecedents and support compatible ones. In (6), it plays the role of the thing that is brought down, and planes can be brought down. In (7), it is the thing that crashed, and helicopters can crash. In (8), it is something that is not seriously damaged, and bridges are things that can sustain damage in a terrorist incident like a bombing (in contrast, bombs are not likely to sustain damage[5]). Note that bombs may inflict damage, and the distinction between inflicting and sustaining damage is why a contextual role requires both the manner of participation in an event as well as the event itself.

[5] More precisely, bombs are not likely to be mentioned as sustaining damage.

These phenomena led me to theorize that contextual roles could augment syntactic evidence for coreference resolution, but two issues needed to be addressed. First, contextual roles made sense conceptually, but an implementation required a mechanism to represent them. Second, manually building a knowledge base of contextual roles, along with associated relationships of sequence, synonymy, associations, and expectations, would be a tedious, if not intractable, process.

The good news was that Utah's NLP group had previously conducted research using caseframes, constructs largely designed to extract information based on the combination of a syntactic role and a set of trigger terms. Caseframes offered a way to model contextual roles. Furthermore, the AutoSlog system, provided a way to learn caseframes automatically. This chapter explains how caseframes can approximate contextual roles, how evidence for contextual role relationships and expectations is learned, how such evidence is stored in BABAR, and how the contextual roles can be applied to the coreference resolution process.

The caseframes[6] developed by Utah's NLP group were originally designed Caseframes as Approximations of Contextual Roles to extract information from free form text by using the combination of a triggering expression (often a verb), an activating condition and a syntactic role. For example, caseframes could be built to extract the victims of kidnappings:

[6] The term caseframe is generally considered to include the thematic role of the extracted term as well as the syntactic structure, e.g., <victim> was kidnapped, not just <subj> was kidnapped. BABAR does not require thematic roles, but because the extraction mechanism is the same, I found it convenient to continue to use the caseframe term. This usage is less specific than how other researchers may use the term.

(9)<subj>passive-verb:kidnap

(10) active_verb:kidnap <dobj>

The caseframe in (9) extracts the subject of a clause in which the verb phrase is in the passive voice and headed by a form of to kidnap. The caseframe in (10) looks for the active voice version of the same verb. These caseframes would extract John from the following sentences.

John had been kidnapped by ELN guerillas . . . .

According to authorities, John was kidnapped yesterday by twelve men.

The ELN guerillas kidnapped John.

The twelve men have kidnapped John . . . .

The caseframes that Autoslog builds are based on the predefined set of fourteen syntactic templates shown in Table 4.2.

The caseframe mechanism does not match the notion of a contextual role exactly because a contextual role operates at a more semantic (or thematic) level than a syntactic level. Specifically, the contextual role that (9) and (10) approximate is the patient of the kidnapping event, which could be the subject of the passive voice or the direct object of the active voice.

TABLE 4.2

Caseframe Patterns

| | |
|---|---|
| <subj> active_verb | active_verb <dobj> |
| <subj> active verb dobj | infinitive <dobj> |
| <subj> passive_verb | verb infinitive <dobj> |
| <subj> verb infinitive | noun prep <pp_obj> |
| <subj> aux to_be noun | active verb prep <pp_obj> |
| <subj> aux to_have noun | passive verb prep <pp_obj> |
| noun aux_tobe <dobj> | noun aux_tohave <dobj> |

To help elevate the syntactic nature of the caseframes to the semantic nature of a contextual role, BABAR maps some caseframes into a smaller set of abstracted caseframes according to Table 4.3. The algorithm that performs this mapping addresses how verbs commonly project their roles when in the active vs. passive voice. For example, the direct objects of active voice verbs and the subjects of passive voice verbs are both mapped to patient roles. Additionally, when a passive voice verb phrase is followed by a by prepositional phrase, the object of that PP is mapped to the agent role, e.g., "was abducted by <x>." This process of elevating a caseframe to an abstracted caseframe is not always accurate, but I found that the benefit of aggregating caseframes toward a contextual role representation outweighed the risk posed by the occasional abstracted caseframe error.

TABLE 4.3

Abstracted Caseframes

| Original Caseframe | Abstracted Caseframe |
|---|---|
| <subj> active_verb | <agent> verb |
| active_verb <dobj> | <patient> verb |
| <subj> active_verb dobj | <agent> verb dobj |
| <subj> infinitive_verb | <agent> infinitive_verb |
| infinitive_verb <dobj> | <patient> infinitive_verb |
| <subj> passive_verb | <patient> verb |
| passive_verb pp(by) <prep-obj> | <agent> verb |
| <subj> infinitive_verb | <agent> infinitive_verb |
| infinitive_verb <dobj> | <patient> infinitive_verb |
| All other caseframes | No modification made |

Using Contextual Roles for Coreference Resolution

This work claims that contextual roles can be used for coreference resolution in two ways. First, a relationship may exist between the contextual role an anaphor plays and the contextual role of its antecedent. Second, a contextual role may project a set of expectations and these expectations can be used to filter or support candidate antecedents.

Contextual Role Relationships

BABAR identifies caseframe relationships by measuring how often two caseframes co-occur in known anaphor/antecedent pairs. The co-occurrence through an anaphoric link is a method of recognizing contextual role relationships including the three types of contextual role relationships I had observed—synonymy, sequence, and association although it will not distinguish among them.

First, synonymous contextual roles are those that describe similar event and participant pairs. For example, Elvis is the actor of the departing events in the following three sentences.

(11) Elvis has left the building.

(12) Elvis has exited the building.

(13) Elvis vacated the building.

Once BABAR has knowledge that contextual roles have co-occurred, it can recognize when a candidate antecedent appears in a role similar to the anaphor. For example:

(14) Elton heard that Elvis had left the building, but he didn't believe it. He kept searching until it became clear that he had vacated the building.

In (14), the last occurrence of he resolves with Elvis, due to the relationship between contextual roles. Specifically, resolution of he begins by collecting all possible candidate antecedents. Restricting the collection to preceding singular male humans (to stay in agreement with the singular male human pronoun) produces the candidates Elton, Elvis, he, and He. Only Elvis, however, shares a synonymous contextual role with the anaphor.

Second, sequentially related contextual roles have an association in which the occurrence of one contextual role suggests the subsequent occurrence of another. For example:

(15) Dan Rather reported that Elvis was kidnapped by Elton John. He was later released on a road leading to Area 51.

Here, the anaphor He again resolves to Elvis, but not because the anaphor and antecedent share a synonymous contextual role. Instead, Elvis plays a contextual role that is often followed in the discourse by the contextual role of the anaphor, i.e., people who are kidnapped are often later released.

Third, associated contextual roles are collections of contextual roles that are often performed together. Consider the contextual roles that hurricanes might play. They can make landfall, be measured, have barometric pressure, be moving in a particular direction, etc. These roles are not synonymous, nor do they occur in any particular sequence, but they clearly all relate to ways that hurricanes behave.

BABAR does not explicitly distinguish between synonymous, sequential, or association relationships shared by contextual roles, and it is unclear whether such a distinction would benefit the coreference resolution process. Instead, BABAR recognizes that all the relationships can be modeled by collecting co-occurrence data.

4.1.3.2 Contextual Role Expectations

Another way that BABAR uses contextual roles for coreference resolution is by leveraging the expectations of a caseframe. It was a generally understood concept in the Utah NLP group that some caseframes have very strong semantic expectations. For example, in the terrorism texts, the caseframe kidnapped by <x> would almost certainly extract terrorists or terrorist organizations. Similarly, traveled to <x> typically extracts locations. BABAR uses knowledge of typical extractions to build lexical and semantic expectations for contextual roles.

Assume that BABAR has access to a set of contextual roles for a particular domain of texts, recorded as a collection of caseframes. By building a knowledge base of all the extractions made by the caseframes, BABAR establishes lexical expectations for each caseframe. For example, consider FIG. 7.

In this example, the caseframe is looking for the perpetrator of a kidnapping. Based on what it found in the training corpus, five unique extractions have been recorded along with their frequency of extraction. BABAR can now consider these NPs as lexical expectations for the caseframe, i.e., specific NPs that it commonly extracts. It can now apply these lexical expectations during coreference resolution.

(16) The ELN has been operating in this region for the last several years. It has kidnapped a number of government officials and their family members.

When processing (16), the caseframe <agent> kidnap will extract the anaphor it. One of the candidate antecedents, The ELN, matches a lexical expectation of the caseframe, i.e., it has been previously seen as the agent of a kidnapping action three times. This lets BABAR prefer the candidate antecedent over the other candidate antecedent, this region.

By adding a semantic dictionary, lexical expectations can be turned into semantic expectations which have the ability to add generalization. For example, if a semantic dictionary has ELN and FMLN tagged as terrorist groups, BABAR will establish that the caseframe in FIG. 7 has a semantic expectation for terrorist groups. The generalization allows BABAR to match cases that were not explicitly seen in the training texts.

(17) The FARC has been operating in this region for the last several years. It has kidnapped a number of government officials and their family members.

For example, in (17), if FARC is tagged in the semantic dictionary as a terrorist group, BABAR will be able to suggest it as the appropriate antecedent for It because of the semantic expectation derived for <agent> kidnap—even if this particular organization has not performed kidnappings in the past.

In summary, contextual roles, approximated by abstracted caseframes, can support coreference resolution in two ways. First, they can identify when an anaphor and antecedent appear in related contextual roles that are recognized through co-occurrence. Second, the lexical and semantic expectations can help resolve coreference by comparing expectations of the anaphor to the antecedent NP (and vice-versa). These methods, however, assume the existence of a knowledge base that can support them. The following section illustrates how BABAR creates knowledge bases of both contextual role co-occurrence and their lexical and semantic expectations.

Acquiring Contextual Role Knowledge

Acquiring contextual role knowledge, in the form of related caseframes and their semantic and lexical expectations, has five distinct stages, as shown in FIG. 7. Once complete, BABAR stores this knowledge in three knowledge bases: a caseframe lexical expectations KB, a caseframe semantic expectations KB, and a caseframe network KB for caseframe co-occurrence relationships.

To acquire the knowledge bases, BABAR requires a domain-specific training corpus. A corpus is domain-specific if its content has a homogenous quality, i.e., its texts discuss the same subject or topic. Without the topic-constrained language that a domain-specific corpus provides, BABAR may not be able to acquire enough examples of each caseframe and their extractions to generate reliable expectations. The corpus must also be large enough to produce substantial quantities of repeated caseframes. BABAR is designed to perform coreference resolution in domain-specific environments that can provide large training corpora representing the same type of language expected in the target texts. These constraints are balanced by the unsupervised nature of BABAR's learning and its ability to generate domain-specific knowledge.

To acquire the knowledge bases, BABAR requires a domain-specific training corpus. A corpus is domain-specific if its content has a homogenous quality, i.e., its texts discuss the same subject or topic. Without the topic-constrained language that a domain-specific corpus provides, BABAR may not be able to acquire enough examples of each caseframe and their extractions to generate reliable expectations. The corpus must also be large enough to produce substantial quantities of repeated caseframes. BABAR is designed to perform coreference resolution in domain-specific environments that can provide large training corpora representing the same type of language expected in the target texts. These constraints are balanced by the unsupervised nature of BABAR's learning and its ability to generate domain-specific knowledge.

Generating Caseframes and Extractions

BABAR'S acquisition of contextual role knowledge begins by generating a collection of domain-specific caseframes. Caseframes consist of a trigger term, an activation condition, and a syntactic role. The syntactic roles and activation conditions are predefined, and the trigger terms are acquired by applying syntactic templates to the parsed output of a training corpus. Learning caseframes automatically can produce mistakes (i.e., incorrect expressions can be learned), so BABAR keeps track of the frequency of caseframe occurrence. Later, low frequency caseframes may be discarded in an attempt to remove spurious caseframes from the mix.

BABAR implements its caseframe creation process by using AutoSlog in an exhaustive fashion, i.e., to generate a caseframe to extract every NP in the corpus.

For example, consider the domain-specific caseframes from the terrorism corpus in FIG. 9. The first column illustrates the syntactic role that information will be extracted from, the second column is the activation function that describes the syntactic construction of the caseframe, and the third column shows the trigger term(s) that specify the expression. For example, the first caseframe in FIG. 9 extracts the subjects of sentences in which an active-voiced VP is followed by a direct object NP, and in which the VP has the head overpowered and the direct object has the head residents. In this case more than one trigger term exists because the activation function requires more than one element. FIG. 10 illustrates examples of caseframes learned from the natural disasters domain. Note how the syntactic roles and activation functions are the same between the two domains, but the different trigger terms generate caseframes that are clearly topic-specific. In terrorism, caseframes are automatically learned to recognize kidnappings and attacks, while the natural disasters caseframes recognize drownings and the making of payments (i.e., insurance payments).

Once the caseframes have been generated, BABAR reprocesses the training corpus to apply the caseframes. When a caseframe is applied, it looks for a matching trigger term, activation function, and syntactic role, and it extracts the noun phrase that occupies that syntactic role. BABAR stores extracted noun phrases, their extracting caseframes, and frequency information in the Caseframe Extractions Knowledge Base (CEKB).

To most closely approximate contextual roles, the knowledge stored in the CEKB is represented by abstracted caseframes. FIG. 115 illustrates examples of lexical expectations drawn from the CEKB in the terrorism domain. FIG. 12 illustrates examples in the natural disasters domain. In both figures, the abstracted caseframes are written as a triple conforming to <role> <activation function> <trigger term(s)>. Not every word extracted by a caseframe becomes part of the lexical expectations for that caseframe. The term should survive a statistical evaluation process.

Reliable Case Resolutions

BABAR's first step toward learning the relatedness of contextual roles is to identify anaphors that can be easily resolved with their antecedents. These reliable case resolutions become training examples for a set of learning mechanisms that populate BABAR's knowledge bases. It uses three methods to recognize reliable cases—a set of syntactic heuristics that identify structurally constrained cases, the repetition existential definite NPs, and the repetition of proper names.

Syntactic Heuristics

A number of anaphors can be reliably resolved because they have a single, unambiguous candidate antecedent NP. This happens when the syntactic constraints around the anaphor and antecedent intersect to produce a case that is relatively simple to resolve. For example, relative pronouns have strong binding constraints on where their antecedents may appear. Specifically, their antecedent NPs typically occur in the prior clause, after that clause's verb phrase. I identified a number of such syntactically-motivated cases, and I created seven heuristics to recognize them at runtime, detailed in Table 4.4.

TABLE 4.4

| Syntactic Seeding Heuristics | | |
|---|---|---|
| Syntactic Heuristic | Description | Example |
| 1. Reflexive pronoun | Reflexive pronouns typically have very constrained scope boundaries for their antecedents. This heuristic looks for cases in which only one candidate antecedent exists within those boundaries. | The regime gives itself the right . . . Mr. Christiani has declared himself . . . |
| 2. Relative pronoun | Relative pronouns also have tight scope boundaries for their antecedents. When only one possible antecedent exists, this heuristic makes the resolution. | The brigade, which attacked . . . Police arrested the kidnappers who were members . . . |
| 3. Simple predicate | Some cases of <subj> to_be <dobj> usually define the subject and direct object as having the same referent. This heuristic treats such occurrences as anaphor/antecedent. | Mr. Christiani is the president . . . These men are the perpetrators of . . . |
| 4. XSaid | Looks for cases of <subj> said (that) <it/they> and resolves it or they with the subject NP. Note that certain sanity checks are necessary here, including pleonastic it constructions, e.g., He said that it is necessary . . . | The men said that they had committed the crime . . . The government said it does not know . . . |
| 5. Where | Identifies anaphoric locations in two constructions: 1. Locative_prep NP [,] where 2. NP, where . . . (must start sentence) The heuristic assigns the NP as the antecedent for the anaphor where. | He was found in San Jose, where . . . Santa Rosa, where the action occurred . . . |
| 6. Appositive | Maps the two NPs of an appositive construction to an anaphor/antecedent pair. | Mr. Christiani, the president of the country, said . . . |
| 7. Adverbial Prep | Looks for cases where a PP is functioning as an adverbial phrase with an internal it. Collects the direct object as the antecedent with it as the anaphor. | Mr. Bush disclosed the policy by reading it . . . |

Existential Definite NP Repetition

The existential definite noun phrases detailed above are used by BABAR to identify NPs that should be disregarded by the coreference resolver. In addition, BABAR uses them to identify reliable cases resolutions. When more than one mention of an existential definite NP occurs in a text, BABAR assumes that any later mentions are anaphoric with the initial mention. For example, if BABAR knows that the White House is an existential definite NP, it implicitly understands that this NP refers to an object or concept not directly represented in the text. A second mention of the White House in the same text, however, is likely referring to the same object or concept as the first mention. BABAR looks for lexical repetition only on existential definite NPs because other NPs are not necessarily anaphoric with prior mentions. For example, consider the text in FIG. 13. The second occurrence of the existential NP the White House is anaphoric with the first mention, but the two cases of the company have different antecedents. When BABAR encounters a repeated existential definite NP, it resolves the later mention with the first as an anaphor/antecedent pair.

Proper Noun Repetition

The third way that BABAR recognizes reliable case resolutions involves looking for the repetition of proper names, process (d) in FIG. 8. BABAR uses the named entity recognizer of the underlying parsing engine to identify human names from their format or from name lists, e.g., Mr. Bush, George Bush, and Professor Hamilton. For each document, as each new name is discovered, BABAR populates a list of names. Each new NP is evaluated against this list, looking for variations in the previously seen names. For example, if Mr. George Bush was in the proper name list, later references to Mr. Bush, Bush, George, and George Bush would be resolved with the initial mention. BABAR implements four name variation heuristics, detailed in Table 4.5.

BABAR also recognizes repeated company names. Again, if the underlying named entity recognizer identifies a company name, BABAR will look for repetition of that name or variations, as detailed in Table 4.6.

TABLE 4.5

Person Name Matching Algorithms

| Heuristic | Example |
|---|---|
| Last name repeated | George Bush followed by Bush |
| First name repeated with no last name | George Bush followed by George |
| Last name repeated with title | President George Bush followed by President Bush |
| Complete lexical repetition | George Bush followed by George Bush |

TABLE 4.6

Company Name Matching Algorithms

| Heuristic | Example |
|---|---|
| First word in name repeated | American Airlines Inc., followed by American |
| Company name without suffix | American Airlines Inc., followed by American Airlines |
| Complete lexical repetition | IBM Inc., followed by IBM Inc. |

Contributions to lexical expectation knowledge from proper name resolutions can be smaller than what is generated by the syntactic heuristics for two reasons. First, as with repeated existential definite NPs, in cases where the proper name shares the same head noun in both anaphor and antecedent NPs (e.g., George Bush, and Mr. Bush), no additional lexical expectation knowledge can be learned. These account for the majority of the proper noun resolutions. Second, these lexical expectations are for proper nouns, i.e., nouns that can have very specific referents and occur at low frequencies. It is less likely that they will appear in later cases of coreference, as compared to other nouns, so the expectations for them will not apply as often.

To address these issues, BABAR records proper name extractions on a semantic level as well. For example, if BABAR found that <agent> declare war extracted a human name 14 times during proper name repetition, it would record the human semantic tag and a frequency of 14 for this caseframe. Later, when the semantic expectations for the caseframes are calculated, the 14 human semantic type extractions will be incorporated along with the other semantic extractions. BABAR does this because it is unlikely that human names will be tagged in the semantic dictionary, but the proper name recognizer has recovered this information during the proper name recognition process. Recording it now sets the stage for BABAR to take advantage of the semantic information at a later point.

Learning from Reliable Case Resolutions

BABAR learns from anaphor/antecedent pairs generated by the reliable case resolutions in two ways. It will be helpful to assume that the anaphor is $NP_A$ and is extracted by Caseframe$_A$, and that the antecedent is $NP_B$ and is extracted by Caseframe$_B$.

The first stage of learning focuses on the notion of related caseframes. Because the model has now seen Caseframe$_A$ and Caseframe$_B$ co-occurring in an anaphoric relationship, it adds the two caseframes to the caseframe network knowledge base. BABAR does not clarify the nature of relationship, it just records that the two caseframes extract NPs that are coreferent with each other.

The second stage of learning expands the lexical expectation knowledge base populated initially by component (a) in FIG. 8. During that prior process, BABAR should have already noted that Caseframe$_A$ extracted $NP_A$ and that CaseframedB extracted $NP_B$. Now that the syntactic seeding has determined that $NP_A$ and $NP_B$ are anaphorically linked, the reversed combination of caseframe and extraction can add two more cases to the lexical expectation knowledge base.[7] Specifically, BABAR registers that Caseframe$_A$ can extract $NP_B$ and that Caseframe$_B$ can extract $NP_A$.

[7] BABAR makes the assumption that if $NP_A$ and $NP_B$ are anaphorically linked, they are substitutable, i.e., each NP could be extracted by either caseframe.

Repeated existential NPs contribute to the caseframe network knowledge base, but not to the lexical expectations knowledge base. Because both anaphor and antecedent NP are the same noun phrase, any caseframes that extract the anaphor, by definition, also extract the antecedent. Nothing new can be learned about the lexical expectations of the caseframes that has not already been learned during caseframe generation and extraction, process (a) in FIG. 4.2.

Resolutions made by the proper name repetition method contribute to the caseframe network knowledge base as well as the caseframe lexical expectations knowledge base.

Certainty of Learned Knowledge

Once learning from reliable case resolutions is complete, BABAR has two repositories of acquired knowledge that can be used to provide evidence of lexical expectations and caseframe relatedness. These repositories, however, need to be evaluated in some fashion to establish the certainty of that knowledge. For example, how often must a caseframe extract a noun phrase before the model determines that the lexical expectation is real? BABAR uses a statistical calculation to determine certainty of lexical expectations, semantic expectations, and caseframe relatedness, as described in the following three sections.

Generating Lexical Expectations

The lexical expectation of a caseframe can be statistically evaluated by measuring how often it extracts a noun and normalizing it against how often that noun occurs in the training corpus in general. A number of methods exist to measure the statistical evidence of acquired knowledge. BABAR implements a log likelihood measure that is known to perform well in a number of NLP-related tasks where sparse data may be a problem.

The log likelihood measure is an approach to hypothesis testing, i.e., determining how likely one hypothesis compared to another. BABAR uses the log likelihood measure shown in FIG. 14 to gauge the likelihood that a given caseframe extracts a given noun as compared to any caseframe extracting the noun. The measure will take into account the frequency of the caseframe, the frequency of the noun, and the frequency of the caseframe extracting the noun. Put another way, given how often the noun is extracted in general, and how often the caseframe occurs in general, should BABAR determine that the caseframe's extraction of the noun is due to chance alone? Intuitively, it gives BABAR a way of understanding how strongly its acquired knowledge supports the lexical expectation.

Input to the log likelihood measure can be thought of as a 2×2 contingency table that describes the co-occurrence of two items. Table 4.7 illustrates an example of the contingency table used to calculate the lexical expectation of <agent> hit for the extracted term hurricane. In this example, hurricane was extracted by the caseframe eight times, the caseframe extracted 353 other terms, and hurricane was extracted 1,316 times by other caseframes. The total number of terms extracted by other caseframes was 836,653. BABAR passes the contents of the contingency table to a log likelihood calculation [MS00][Dun93], resulting in a number that is compared to a Chi Squared distribution table to generate a final probability value. For this example, the log likelihood calculation returns a value of 27.57, which is statistically significant at the 99% level. This probability value becomes the final certainty value of the lexical expectation. (Values of 0.99 are rounded to 1.0.)

TABLE 4.7

Lexical Expectation Contingency Table

| | Caseframe = <agent> hit | Caseframe ≠ <agent> hit |
|---|---|---|
| Head noun = hurricane | 8 | 1,316 |
| Head noun ≠ hurricane | 353 | 836,653 |

Generating Caseframe Relatedness

BABAR implements the same log likelihood metric for caseframe relatedness. For CFNet, the co-occurrence calculation is based on how often two caseframes have been linked by an anaphoric relationship. Specifically, the contingency table is filled with the frequency of the Caseframe$_A$, the frequency of Caseframe$_B$, and how often they have been linked. For example, Table 4.8 shows the contingency table for the CFNet calculation between the caseframes died in <pp-obj> and <agent> hit in the natural disasters texts. The two caseframes were involved in three reliable case resolutions, while died in <pp-obj> occurred 1,043 times independently, and <agent> hit occurred 898 times independently. The log likelihood measure produces a value of 0.73, which is considered significant by the Chi Squared distribution table to 50%, so the CFNet score for these two caseframes is 0.50.

Generating Semantic Expectations

To calculate the semantic expectation of a caseframe BABAR requires two types of information. First, it must have a record of what noun phrases a caseframe has extracted. This information is already stored in the caseframe lexical expectations KB. Second, BABAR must have a semantic dictionary. This dictionary must encode the semantic classes for each entry. For example, the term plant might be encoded semantically both as a building and as an organism. The exact number of semantic classes is not dictated by BABAR's design, although in the empirical evaluations presented in Chapter 6, BABAR used a generic set of 26 semantic classes that were applicable in both the terrorism and natural disasters domains. The model described here assumes that such a dictionary already exists.

TABLE 4.8

CFNet Contingency Table

| | Caseframe = <agent> hit | Caseframe ≠ <agent> hit |
|---|---|---|
| Caseframe = died in <pp-obj> | 3 | 895 |
| Caseframe ≠ died in <pp-obj> | 1,040 | 532,190 |

Note that BABAR's calculation of semantic expectations is normally based on the head noun of the extracted NP. The exception to this rule is when an extracted NP is known to be a human through named entity recognition. For example, as mentioned in the previous section, during proper name repetition, BABAR knows that the extracted terms are semantically human, but their specific head nouns are often not likely to appear with human tags in the semantic lexicon. Additionally, the head nouns of some proper names will appear in the semantic lexicon with a tag that is incongruent with their proper name usage, e.g., Mr. Bush and Mrs. Doe would generate semantic expectations around the head nouns bush and doe, leading to improper expectations for plant and animal. Thus, the semantic expectations of a caseframe are based on the semantic classes of its extracted head nouns, either by virtue of semantic dictionary lookup or by previous encoding during proper noun recognition.

There is an additional step to calculating semantic expectations. Prior to calculating the log likelihood measure of each semantic class for the caseframe, BABAR discards any semantic classes that are not found in at least 33% of the caseframe's extracted nouns. For example, assume a caseframe has extracted two semantic classes, human and location. The caseframe extracted human nouns 8 times, and it extracted location nouns two times. Because the location class represents only 20% of the extractions, it will not be considered by BABAR for a semantic expectation. BABAR uses this approach for two reasons. First, caseframe extractions are occasionally inaccurate due to misparses and this is an attempt to weed out low frequency semantic taggings and extractions. Second, BABAR's WordNet-based semantic lexicon contains semantic tags for every word sense assigned to a word in WordNet. Because WordNet is designed to be a generic semantic lexicon, it often produces entries with large numbers of word senses. Implementing the 33% threshold helps assure that BABAR has assigned a semantic expectation based on a range of distinct terms instead of many extractions of a single term with multiple semantic tags. Semantic classes that survive this test are examined for co-occurrence with the caseframe by the log likelihood ratio.

FIG. 15 illustrates a sample of caseframe semantic expectations from the terrorism corpus. In the first case, the caseframe will extract things that carried out an action, <pp-obj> carried out:by. BABAR has determined that groups typically play this contextual role. Note that small variations in a caseframe can generate different semantic expectations.[8] The caseframe <pp-obj> carried out:in has an expectation for locations while <pp-obj> carried out:on has an expectation for times.

[8] FIG. 15 provides samples of variations in caseframes that generate different semantic expectations.

FIG. 16 illustrates examples of caseframe semantic expectations in the natural disasters texts. In this domain, a number of caseframes have strong expectations for the natphenom (natural phenomena) class which includes hurricanes, typhoons, rain, floods, etc.

Applying Contextual Role Knowledge

Now that BABAR has acquired contextual role knowledge, applying that knowledge is a function of four knowledge sources, as shown in FIG. 17. Knowledge sources can be thought of as independent sources of evidence that a coreference resolver uses to evaluate the candidate antecedents of an anaphor. The inputs to a knowledge source consist of the anaphor and a candidate antecedent that is being considered. The knowledge source returns a score, indicating the certainty with which it believes that the candidate antecedent is a correct antecedent for the anaphor. A knowledge source may return a positive value (0.0 to 1.0), indicating supportive evidence, or it may return a negative value (−1.0 to 0.0), indicating contradictory evidence. Typically, a knowledge source will be applied to a collection of candidate antecedents, and the coreference resolver must weigh the resulting scores to determine a winning antecedent, if any. This document will describe how knowledge source scores are accumulated and analyzed with additional detail.

CFLex

The CFLex knowledge source uses the lexical expectations of a caseframe to provide supportive evidence for a candidate antecedent. Intuitively, if the anaphor's caseframe has extracted a particular term often, and that term is one of the candidate antecedents, CFLex will suggest that the anaphor be resolved with it. This knowledge source is reciprocal, i.e., it will apply this logic both from the anaphor's caseframe to the candidate NPs, and from each candidate NP's caseframe to the anaphor. For example, consider the case of an anaphor represented by $NP_A$, extracted by $Caseframe_A$. Assume that one of the candidate antecedents is represented by $NP_B$, extracted by $Caseframe_B$. CFLex first checks $NP_B$ against the lexical expectations of $Caseframe_A$. If an expectation is found, CFLex records the certainty of that expectation as the evidence score of the candidate antecedent. The certainty value is the statistical significance value generated by the log likelihood measure. It also evaluates the expectation of the antecedent's $Caseframe_B$ against the anaphor's $NP_A$. Should both directions generate expectations, the higher value is assigned to the candidate antecedent.

The absence of an expectation in one direction does not invalidate an expectation found in the other direction. The training corpus almost certainly will not contain all possible caseframe extractions. For example, imagine a caseframe that extracts the victims of kidnappings. While many of the extractions may appear repetitively (e.g., the man, the woman, the ambassador, proper name extractions will vary over time. The acquisition process captures the most commonly occurring extractions for a caseframe, so while membership in those extractions can be rewarded, penalizing NPs for non-membership would be overly aggressive. CFLex generates only positive evidence scores.

CFNet

BABAR recognizes caseframe relatedness with the CFNet knowledge source. CFNet begins by examining the caseframe that extracts the anaphor NP and the caseframe that extracts the candidate antecedent NP. In the case where either or both of the NPs is not extracted by a caseframe, CFNet will not apply.

CFNet looks up the two caseframes in the caseframe network KB. If the two caseframes have previously participated in an anaphoric relationship, CFNet will return a certainty score retrieved from the CF Network knowledge base. These scores are the result of the log likelihood calculations. In addition, CFNet can look for indirect relatedness through transitivity. For example, if $Caseframe_A$ and $Caseframe_B$ have not co-occurred, but each has been linked to $Caseframe_C$, then there is a transitive relationship between them. The certainty of the $Caseframe_A$-$Caseframe_B$ relationship becomes the least certain score of either the $Caseframe_A$-$Caseframe_C$ or $Caseframe_B$-$Caseframe_C$ relationships. Also, because a transitive relationship is not as certain as one that was explicitly discovered during training, CFNet reduces the certainty score by 10% for each degree of separation. As with CFLex, this knowledge will generate only positive scores.

CFSem-CFSem

BABAR implements the notion of caseframe semantic expectations with two knowledge sources. The first, CFSem-CFSem, identifies when the two caseframes that extract the candidate antecedent NP and the anaphor NP have different semantic expectations. For example, assume that the training process has found that $Caseframe_A$ commonly extracts organizations while $Caseframe_B$ extracts humans and animals. This knowledge source considers the nonintersection of semantic class expectations to be negative evidence. If an intersection of semantic expectations occurs, it generates a value of zero. Consider the following example.

(18) The A320 crashed near Bogota. It was carrying 56 passengers.

The anaphor is It, and there are two candidate antecedents, the A320 and Bogota. Assume that during training, BABAR has learned that the anaphor's caseframe (<agent> was carrying) has a semantic expectation for vehicles, while the candidate antecedent caseframes (<patient> crashed, and crashed near <pp-obj>) have semantic expectations for vehicles and locations, respectively. CFSem-CFSem will penalize the second candidate antecedent (Bogota) because the semantic expectations of the anaphor's caseframe and the candidate's caseframe do not intersect. In such cases, it assigns a value of −1.0 to the candidate antecedent.

How BABAR uses that negative score is the responsibility of the decision model, which will be discussed below. In the meantime, however, it is important to recognize that a negative score from this knowledge source does not remove the candidate antecedent from contention. BABAR takes this approach because these knowledge sources operate over automatically acquired knowledge bases, and the data in the knowledge bases may not always be accurate.

CFSem-ExtSem

Like CFSem-CFSem, the CFSem-ExtSem knowledge source looks for non-intersections between two sets of semantic classes. This knowledge source, however, compares the semantic expectations of a caseframe to the semantic class of a word. For example, consider the following sentence.

(19) A mechanic had been working on the plane the week before it crashed into the jungle.

The anaphor being addressed is it and the candidate antecedent under consideration is mechanic. Assume that BABAR has learned that the caseframe <agent> crashed has a semantic expectation for vehicles. Given the semantic dictionary, BABAR knows that mechanics are human, so CFSem-ExtSem will penalize the candidate because its semantic tag does not intersect with the anaphor caseframe's semantic expectation. The knowledge source will return a value of −1.0 for this candidate. Alternatively, if the anaphor being addressed is it, BABAR knows that planes are vehicles and therefore the anaphor caseframe's semantic expectation is being met. For this candidate, CFSem-ExtSem will return a value of 0.0. Should semantic tags or caseframes be unavailable, this knowledge source will also return 0.0.[9]

[9] There is a good reason why both semantic class matches and unknown semantic classes generate the same value of 0.0. In general, the semantic classes used by BABAR are too broad to provide supporting evidence, but they can be used to provide contradictory evidence. Chapter 5 offers additional details around this point.

A Comprehensive Walk Through Example

To illustrate how the four caseframe-based knowledge sources operate, this section will walk through the three examples described in FIG. 18. In this figure, the three example anaphors[10] are in boldface, and candidate antecedent NPs are underlined.

[10] There are other anaphors in this text, but I will focus on these three cases for the example.

This example focuses on the anaphor it, extracted by the caseframe <agent> destroyed. The candidate antecedent NPs are all the preceding NPs, as shown in Table 4.9. BABAR first makes note of the caseframe that extracted the anaphor NP and the caseframes that extracted the candidate NPs, as shown below.

Anaphor: it (sentence 2)

Extracted by: <agent> destroyed

TABLE 4.9

Walk Through Example, Candidate Antecedents
Candidate Antecedents

| | | |
|---|---|---|
| 1 | The hurricane | <agent> struck |
| 2 | Bermuda | struck <patient> |
| 3 | Monday afternoon | struck on <pp-obj> |
| 4 | flooding | braced for <pp-obj> |
| 5 | the week | n/a |
| 6 | Friday morning | n/a |

The CFLex knowledge source begins by examining the known extractions of <agent> destroyed, and it contributes positive evidence for candidate NP 1, the hurricane, because it matches a lexical expectation for <x> destroyed11. A partial listing of the lexical expectations for this caseframe is shown in Table 4.10, including the certainty score for each expectation.

[11] For the sake of simplicity, I will only describe the expectations of caseframes from the point of view of the anaphor.

The semantic expectations of the each candidate antecedent's caseframe and the anaphor's caseframe are used by both CFSem-CFSem and CFSem-ExtSem, and they are shown in Table 4.11. A single semantic expectation for natphenom is generated by the anaphor's caseframe, so any candidate antecedent caseframe that does not also have an expectation for natphenom is penalized by CFSem-CFSem. The CFSem-ExtSem knowledge source will penalize any candidate antecedent NP that does not have a natphenom tag in the semantic dictionary. In this example, only hurricane and flooding do not receive negative certainty values from these knowledge sources.

BABAR has learned that the anaphor's caseframe <agent> destroyed shares relationships with other caseframes. Table 4.12 shows the caseframe network knowledge base for the caseframe and its associations with eight other caseframes and the certainty of those associations. In particular, CFLex finds that the caseframe of candidate antecedent 1, <agent> struck, is linked with the anaphor's caseframe with a certainty of 0.95. The final knowledge source contributions are shown in Table 4.13.

Next Steps

This chapter described how contextual roles could be used during coreference resolution, how caseframes approximate contextual roles, and how BABAR acquires and applies knowledge bases of contextual role data. What follows is a detailed description of how the caseframe-based knowledge sources can be combined with more traditional sources of evidence including gender agreement, number agreement, semantic agreement, syntactic role, and regency to construct a comprehensive model for coreference resolution.

TABLE 4.10

Walk Through Example, Lexical Expectations
Lexical Expectations (anaphor only)

(partial listing . . . )
Caseframe: <agent> destroyed

| | |
|---|---|
| . . . | |
| fire | 1.0 |
| flame | 1.0 |
| flood | 1.0 |
| flooding | 1.0 |
| floodwaters | 0.95 |
| flow | 1.0 |
| gretelle | 1.0 |
| hectares | 0.95 |
| home | 1.0 |
| house | 0.80 |
| hugo | 1.0 |
| hull | 1.0 |
| hundred | 1.0 |
| hurricane | 1.0 |
| investigator | 1.0 |
| landslide | 1.0 |
| landslides | 1.0 |
| level | 0.8 |
| lili | 1.0 |
| missile | 1.0 |
| . . . | |

TABLE 4.11

Walk Through Example, Semantic Expectations
Semantic Expectations

| | | |
|---|---|---|
| Anaphor | <agent> destroyed | natphenom 1.0 |
| Candidate 1 | <agent> struck | natphenom 1.0 |
| Candidate 2 | struck <patient> | location 1.0 |
| Candidate 3 | struck on <pp-obj> | quantity 1.0<br>time 1.0 |
| Candidate 4 | braced for <pp-obj> | activity 1.0<br>natphenom 1.0 |
| Candidate 5 | n/a | |
| Candidate 6 | n/a | |

TABLE 4.12

Walk Through Example, Caseframe Network
Caseframe Network

| CaseframeA | CaseframeB | Certainty |
|---|---|---|
| <agent> destroyed | hit by <pp-obj> | 0.9 |
| <agent> destroyed | killed in <pp-obj> | 0.7 |
| <agent> destroyed | <agent> measured | 0.95 |
| <agent> destroyed | <agent> occurred | 0.95 |
| <agent> destroyed | <agent> struck | 0.95 |
| <agent> destroyed | battled <patient> | 1.0 |
| <agent> destroyed | caused <patient> | 0.95 |
| <agent> destroyed | triggered <patient> | 1.0 |

TABLE 4.13

Walk Through Example, Final Values
Evidence from Caseframe-based Knowledge Sources

| | | CfLex | CFNet | CfSemCfSem | CfSemExtSem |
|---|---|---|---|---|---|
| 1 | The hurricane | +1.0 | +0.95 | 0.0 | 0.0 |
| 2 | Bermuda | 0.0 | 0.0 | −1.0 | −1.0 |
| 3 | Monday afternoon | 0.0 | 0.0 | −1.0 | −1.0 |
| 4 | Flooding | 0.0 | 0.0 | 0.0 | 0.0 |
| 5 | the week | 0.0 | 0.0 | −1.0 | −1.0 |
| 6 | Friday morning | 0.0 | 0.0 | −1.0 | −1.0 |

Coreference Resolution Architecture

Introduction

Material above detailed the acquisition of two types of knowledge, that of existential definite NPs and contextual roles. This chapter moves on to the application of these knowledge bases to resolve previously unseen cases of coreference. It will describe the architecture of BABAR's coreference resolution system, including how the acquired knowledge is applied to the coreference resolution problem, and how the evidence from multiple knowledge sources is weighed to decide when a resolution should occur.

BABAR's coreference resolution model consists of four main components, as shown in FIG. 19. The first step in treating the noun phrases of a document is to determine which NPs are anaphoric. The Nonanaphoric NP Classifier is responsible for identifying two types of nonanaphoric NPs—existential definite NPs (see Chapter 3) and pleonastic its.[12] Those NPs that are classified as nonanaphoric are discarded from further treatment by BABAR.

[12] A pleonastic it is the use of this pronoun in an abstract manner, e.g., "it is raining outside," "it is a shame that . . . ," "it is reasonable to assume that . . . ."

The next step is to recognize cases of unambiguous coreference, i.e., those that can be easily and reliably resolved. These reliable case resolutions use exactly same methods that were applied during learning (proper noun repetition, existential definite NP repetition, and syntactic seeding heuristics).

At this point, BABAR is working with a collection of anaphoric noun phrases that require more sophisticated handling because they appear to have more than one plausible antecedent. I will refer to these possible antecedents as candidate antecedents, which are a set of noun phrases and verb phrases from sentences that precede the anaphor. BABAR examines each candidate antecedent in turn, collecting evidence from a number of knowledge sources indicating the likelihood that the candidate antecedent should be resolved with the anaphor. BABAR implements eleven knowledge sources: seven general knowledge sources (such as recency and lexical similarity) and the four contextual role knowledge sources introduced above. The evidence from a knowledge source comes in three forms. It may provide positive evidence, negative evidence, or it may filter the candidate antecedent out of contention entirely.

BABAR must weigh the contributions from distinct knowledge sources regarding the surviving candidate antecedents. When BABAR decides that enough evidence exists to support a particular candidate, it resolves the anaphor with the antecedent. Alternatively, BABAR may decide not to make a resolution when the evidence is not strong. A resolution decision model evaluates evidence from multiple sources and determines when a resolution is appropriate. BABAR implements a decision model based on the Dempster-Shafer algorithm. The Dempster-Shafer algorithm provides the ability to assign certainty to a set of propositions instead of dividing a particular certainty value among the propositions individually. This characteristic is valuable to coreference resolution because it provides an appropriate way to represent both negative evidence and evidence values that are the same for more than one candidate antecedent.

The rest of this chapter provides more details on how the coreference resolution process works.

Collecting Candidate Antecedents

Given a document to process, BABAR sends it to the underlying parsing engine for analysis and then examines each noun phrase in the document. BABAR attempts to resolve personal pronouns, relative pronouns, reflexive pronouns, and definite NPs that begin with any of the definite articles the, that, those, and these[13].

[13] The existential definite NP identifier described in Chapter 3 targets only definite NPs beginning with the.

In conjunction with each anaphor, a set of preceding noun phrases is collected as the pool of candidate antecedents for each anaphor. BABAR considers any NP occurring in a window of previous sentences to be a candidate antecedent. A scoping knowledge source, described later in this chapter, determines the size of the window based on the type of anaphor.

Once the NPs and their candidate antecedent sets have been collected, they are handed to BABAR's Nonanaphoric NP Classifier to establish which NPs should be pushed through the complete resolution process.

Occasionally, a candidate antecedent will have been previously resolved with another NP. BABAR recognizes the link between these NPs with an anaphoric chain. An anaphoric chain is the linking of more than one anaphor and antecedent. For example, if noun phrase A is the antecedent of noun phrase B, and noun phrase B is the antecedent of noun phrase C, then A-B-C is an anaphoric chain. During the resolution of anaphor C, if noun phrase A and noun phrase B are both members of the candidate antecedent set, BABAR will "collapse" them into a set that is treated as a single candidate. Each knowledge source still evaluates the set members individually, but the final value from the knowledge source is the maximum score from any member of the chain.

Nonanaphoric Noun Phrase Classifier

Prior to coreference resolution, BABAR classifies all definite noun phrases and it pronouns as either anaphoric or nonanaphoric. As discussed in above, noun phrases beginning with the are often nonanaphoric (or existential, e.g., the CIA, the United Nations, and the U.S. president BABAR's existential definite NP classification algorithm discards nonanaphoric definite NPs from further processing.

BABAR also retains a list of the existential definite NPs found in a document so that repetitions of these NPs can be recognized. The first occurrence of an existential definite NP is nonanaphoric, but later occurrences of the same NP are considered anaphoric with respect to the first mention. This behavior is important to BABAR because it maintains its representation of a document's anaphors and antecedents as a collection of anaphoric chains, not a set of anaphor/antecedent pairs, and this leads to more accurate evidence collection. For example, consider a definite NP, the organization, that has four candidate antecedents. Of the four candidates, assume that two are the CIA, which is the correct antecedent. If BABAR did not collapse these two candidate antecedents into a single candidate, evidence from the knowledge sources could be spread between the two instances of the CIA, resulting in a statistical dilution that leaves neither instance looking like the appropriate choice.

In addition to definite NP classification, BABAR implements heuristics to identify the use of pleonastic its. A pleonastic it is the use of the pronoun in an abstract manner. Typical uses include the weather (e.g., it is raining, it will be snowy), cognitive verbs (e.g., it is known that, it is believed that), and modal adjectives (e.g., it is unfortunate that). BABAR's pleonastic it identification heuristics are based on those of Lappin and Lease [LL94].

Reliable Case Resolution

BABAR's next step is to identify anaphors that are straightforward to resolve. Because reliable case resolutions are part of BABAR's seeding process for learning contextual role knowledge, the material above has already explained this process in detail. Briefly though, BABAR recognizes the lexical repetition of existential definite NPs by assuming that later mentions of an existential definite NP are anaphoric with the first mention, e.g., the UN Secretary General in sentence 10 is the same entity as the UN Secretary General in sentence 2. It also recognizes the repetition of proper names, e.g., General Dwight D. Eisenhower followed by Eisenhower and General Eisenhower. Finally, BABAR identifies anaphors in which their surrounding syntactic structure restricts the number of candidate antecedents to one. Relative pronouns, for example, have strict boundaries in which their antecedents may occur—in the prior clause, but not before the preceding verb phrase. BABAR implements seven heuristics that identify syntactically constrained anaphors.

Anaphors that can be reliably resolved are assigned antecedents and removed from further processing. The remaining anaphors are more complex because they have more than one plausible antecedent. Determining which of these candidates is the true antecedent begins by evaluating each candidate antecedent independently, which is the subject of the following sections.

The Complete Set of Knowledge Sources

BABAR begins evaluating an anaphor by establishing the likelihood that it resolves with each of its candidate antecedents independently. As mentioned previously, noun phrases become candidate antecedents if they precede the anaphor within a given distance. For example, consider the text in FIG. 20. The candidate antecedents for the anaphor he are all the preceding NPs: John, Jane, a restaurant, they, state secrets, and The CIA. BABAR examines each of these candidate antecedents by consulting 11 knowledge sources (KSs) that contribute evidence, as shown in FIG. 19. The knowledge sources operate on one candidate at a time, i.e., they examine the possible combination of candidate antecedent and anaphor, measuring the likelihood that the candidate NP is an appropriate antecedent for the anaphor. In this way, they make localized evaluations. It is the decision model that must understand more global issues such as how many candidate antecedents are in contention, and how much evidence has accumulated for each candidate.

Knowledge Source Evidence Values

Knowledge sources can provide evidence in three ways. They may offer positive evidence, suggesting that the NP is an appropriate antecedent for the anaphor. They may offer negative evidence, suggesting that the noun phrase is not an appropriate antecedent. Or, they may filter the NP from the candidate list entirely. This latter behavior can be thought of as absolute negative evidence. BABAR's knowledge sources do not generate absolute positive evidence.

Although it is the responsibility of the decision model (which will be described later) to register KS evidence in an appropriate form, e.g., as votes, integer scores, or certainty factors, it is appropriate to talk about evidence as a numerical value from 0.0 to +1.0 for positive evidence and −1.0 to 0.0 for negative evidence. A value of 1.0 means the KS has complete certainty that the candidate is a valid one. A value of −1.0 means KS has complete certainty that the candidate is invalid.[14] A value of 0.0 means the KS has no evidence for or against the candidate. Each knowledge source generates values in either (but not both) of these ranges. The CFSem-CFSem and CFSem-ExtSem knowledge sources generate values from −1.0 to 0.0, and all other knowledge sources generate values from 0.0 to 1.0.

[14] Note that a difference between a negative vote and a filtering action is that the latter action removes the candidate immediately from further consideration while the former action allows the possibility that other knowledge sources may override the negative evidence.

None of the caseframe-based knowledge sources are given the power to filter a candidate because their evidence has been acquired through the unsupervised learning process, meaning that it may be incorrect or incomplete. Filtering a candidate antecedent is such a dramatically strong action that it is reserved for knowledge sources that can be more certain of their evidence.

General Knowledge Sources

Of the seven general knowledge sources, four have the power to filter candidate antecedents from contention. The gender agreement KS applies when the gender of both the anaphor and the candidate antecedent are known, and they do not agree with each other. In Example 5.1, this KS knows that the anaphor he requires a male antecedent, so it will filter Jane from the candidate antecedent set.[15] The number agreement KS works in a similar fashion, using either dictionary look-up or morphology to identify whether the anaphor is singular or plural and filtering out any candidates that do not agree in number. In FIG. 20, dictionary lookup tells BABAR that he is singular, and morphology indicates that state secrets is plural, so this KS will filter the candidate.

[15] BABAR is able to determine gender of an NP through the semantic lexicon and proper name recognizer.

The semantic agreement KS is a slightly more complex knowledge source that may filter and provide positive evidence. The semantic agreement knowledge source assumes the existence of a lexicon that encodes semantic tags for its entries. BABAR does not require a complex semantic network or other semantic knowledge representation, only a list of which semantic classes a word belongs to. Although BABAR will take advantage of a hierarchy of semantic classes (it understands ISA relationships), that hierarchy need not be overly complex. In the experiments presented below, BABAR referenced a semantic lexicon created from two sources: 1) hand-tagging of the 100 most frequently occurring words in the training corpus, and 2) a list created automatically by extracting the semantic tags of each training corpus's terms from WordNet. For now, assume that BABAR's semantic agreement knowledge source has access to this type of lexicon.

When the semantic tags of a candidate antecedent have no intersection with those of the anaphor, the semantic agreement KS will filter the candidate NP. In FIG. 20, BABAR will determine that the human semantic tag associated with he is not compatible with the semantic tags of restaurant, or state secrets, so both of these candidate NPs will be filtered. (Depending on the order of application, state secrets may have already been filtered by the number agreement KS.) Most other semantic classes are simply too broad to be used in this way, e.g., artifact. Table and chair are both tagged as artifact, but that does not mean that an anaphor resolver should resolve the table with the chair. Even with a more granular classification, e.g., furniture, membership in the same semantic class does not necessarily suggest an identity relationship. These classes, though, are good for discarding candidates that are not members of the class. If the anaphor is the table, we may not be able to support the chair as the antecedent, but we should be able to discard any non-furniture candidates.

There is one exception to this rule. The semantic agreement KS rewards candidate antecedents that match four specific semantic classes (human, company, date, location) and that gain their semantic tags from the hand coded semantic lexicon, i.e., not from WordNet. When these four semantic classes are identified by the hand-coded lexicon or the named entity recognizer, I found that these classes were both certain enough and narrow enough to provide supporting evidence of an identity relationship. That is not to say, however, that no other semantic classes could offer supporting evidence. In the natural disasters corpus, the semantic class of natural phenomenon very tightly describes a set of terms around fires, storms, earthquakes, etc. The four classes of human, company, date, and location, however are not specific to any topic area, and therefore, the semantic agreement KS requires no modification when moving from one application domain to another. Returning to FIG. 20, this KS will generate positive evidence for John in addition to its filtering actions because it matches the human class assigned to the pronoun he.

The scoping knowledge source is responsible for reducing the candidate pool on the basis of anaphor type. For reflexive pronouns, the candidate antecedents must appear in the same clause.[16] For relative pronouns, only NPs that exist in the prior clause, but after that clause's verb phrase survive filtering. For personal pronouns, candidate antecedents must come from the anaphor's sentence or the prior two sentences. The scoping KS does not restrict definite NP candidate antecedents. In Example 5.1, all candidate antecedents fall within scoping restrictions, so none is filtered out.

[16] Although linguistic binding theory offers very specific methods for reflexive pronoun resolution, BABAR is only able to approximate such binding constraints due to the nature of the parse structure provided by the parsing engine.

The syntactic role knowledge source is designed to suggest that certain syntactic roles, e.g., subject, direct object, object of a preposition, etc., are more likely to be antecedents than others. BABAR implements an approach similar to that of Lappin and Lease, which hand-codes relative weights of the syntactic roles. BABAR learns its weights by calculating how often each syntactic role is seen as the antecedent of anaphors resolved during reliable case resolution. For example, if BABAR has found that 30% of the reliable case antecedents were subjects, this knowledge source will generate a score of 0.30 for any subject candidate antecedent. BABAR learns values for five syntactic roles: subject, direct object, indirect object, object of a PP started with the preposition by, and the object of a PP started with any other preposition. If the number of resolutions for a particular syntactic role is less than 1% of the reliable case resolutions, BABAR does not include it in the syntactic role knowledge source. Table 5.1 shows the values BABAR learned for three syntactic roles in both the terrorism and natural disasters domain. Any candidate antecedent not matching one of these three syntactic roles receives a score of 0.0 from the syntactic role knowledge source.

In FIG. 20, based on the learned weights from the terrorism texts, the syntactic role KS will offer positive evidence (0.31) most strongly for John, they and The CIA because these NPs are subjects. It will offer less positive evidence (0.15) for Jane and state secrets because these NPs are direct objects. Finally, it will generate evidence (0.33) in favor of a restaurant since this NP is the object of a preposition.

Lexical similarity between an anaphor and a candidate antecedent can be evidence of an anaphoric relationship, and BABAR's lexical similarity KS rewards two levels of similarity. First, if an anaphor and a candidate antecedent are exact repetitions of each other, or they are indefinite/definite repetitions (e.g., evidence followed by the evidence), this KS will generate strong positive evidence in support of the pair (a value of +1.0). Second, if the head noun of the anaphor is shared with the candidate antecedent (e.g., the 12 men followed by the men), the KS will generate weak positive evidence (a value of +0.5). In the example of FIG. 20, no lexically similar candidate antecedents exist with the anaphor he, so this KS is silent.

TABLE 5.1

Syntactic Role Values

| Syntactic Role | Terrorism | Natural Disasters |
|---|---|---|
| Subject | 31% | 30% |
| Direct Object | 15% | 11% |
| Object of PP (other than by) | 33% | 30% |

Finally, the recency KS measures the distance between the anaphor and candidate antecedent as a function of the candidate collection window size. BABAR calculates the number of words between the most distant candidate antecedent and the anaphor, and each candidate is assigned evidence that equals one minus their word distance divided by the total distance, as shown in FIG. 21. NPs that occur immediately prior to the anaphor will get values close to +1.0, while those at the beginning of the collection window will get values close to 0.0. The recency knowledge source is the only KS that is guaranteed to produce evidence for every candidate antecedent.

Semantic Lexicon and Semantic Hierarchy

As mentioned in the prior section, the semantic agreement knowledge source, CFSem-CFSem, and CFSem-ExtSem knowledge sources require a semantic lexicon. I used two methods to create semantic lexicons for BABAR. First, I manually tagged the most frequently occurring 100 head nouns in the training corpora. The second method involved using WordNet, a lexical database that encodes over 150,000 terms, their senses, and relationships among them. A wide range of semantic classes exist within WordNet, but all of them can be traced back through a hierarchy of ISA relationships to a small set of primitive classes which are shown in FIG. 22.

To populate the semantic lexicon, BABAR collects every head noun in the training corpus, looks up the nouns in WordNet, and for each word sense, records its primitive semantic class. Identifying the primitive semantic class for a word sense often requires working upward though a series of ISA relationships until the primitive class is found. For example, WordNet defines the term airline both as an organization that operates flights of aircraft and as a hose through which air passes, as shown in FIG. 23.

In this example, I have used WordNet's hypernym search to illustrate the derivation of the word senses back to their most basic semantic type. BABAR climbs this derivation chain until it encounters one of the primitive semantic classes. For the air hose sense, the final class is artifact, and for the airline business sense, the final class is group. Thus, the entry in BABAR's semantic lexicon for airline includes semantic class tags for both artifact and group.

When BABAR consults the semantic lexicon, it first looks for hand-coded semantic definitions, and when those are not available for a term, it resorts to the WordNet-generated semantic definitions. Nouns that do not occur in the training corpus will not appear in the semantic lexicon.

As mentioned earlier, BABAR's knowledge sources examine each candidate antecedent independently. They make their judgments strictly on how well or how poorly a particular candidate antecedent is likely to be valid for the anaphor in question. With all the evidence collected, BABAR must now weigh the surviving candidate NPs against each other to determine which one is the appropriate choice.

Resolution Decision Model

BABAR uses a Dempster-Shafer probability model to make resolution decisions. In this section, I offer a description on what the Dempster-Shafer approach is, how it works, and why it is appropriate for coreference resolution.

The Dempster-Shafer Model

The Dempster-Shafer Model is a probabilistic model for combining evidence. Among its strengths is the ability to focus on an increasingly narrow set of propositions as evidence is collected. Additionally, the model provides for explicit, and intuitive, grouping of evidence in support of more than one proposition.

The Dempster-Shafer Model takes as input a set of propositions under the assumption that those propositions are mutually exclusive and exhaustive. Additionally, the model assumes that one member of the set is truthful, and the others are false. The complete set of propositions is called the frame of discernment and is written as θ. The model allows for any number of propositions to be grouped as a subset of θ. For example, if evidence suggests with 100% certainty that either proposition A or proposition B is true, the 100% certainty value is assigned to the set {A,B}. Note that this is very different from assigning half of the certainty to A and B individually. The latter case indicates that A is likely to be true with 50% certainty and that B is likely to be true with 50% certainty, which has a different meaning. The evidence indicates only that one of the members of {A,B} is the true proposition. It says nothing about the individual truth of the set's members.

This ability to assign certainty to sets of propositions is one reason why the Dempster-Shafer Model is an appropriate decision model for BABAR. Often, an coreference knowledge source will not be able to distinguish among several candidate antecedents. For example, the syntactic role knowledge source increases the probability of candidate antecedents that are the subjects of clauses. When more than one subject noun phrase is in the candidate list, the knowledge source raises the probability on the set of subjects rather than spreading the probability among them individually. Again, the reason for this approach is that the knowledge source has no capacity to distinguish among the different subject NPs.

The model represents certainty about the truthfulness of a proposition, or set of propositions, with two values: Belief and Plausibility. Belief represents the amount of evidence in support of a proposition, or set of propositions. Plausibility indicates the support of a proposition in terms of the evidence that supports alternative propositions. These measures are commonly written as pairs, in the form [Belief, Plausibility]. Conceptually, Belief is a measure of how much evidence directly supports a proposition. Plausibility measures how much evidence has yet to be assigned to competing propositions, and therefore, could possibly support the proposition given additional input.

Initially, the frame of discernment, or θ, has a belief of 1.0 and a plausibility of 1.0. Intuitively, the belief value of 1.0 means that it is certain that the true proposition is a member of θ. Second, the plausibility value of 1.0 means that no evidence exists for alternative propositions, i.e., those outside of θ. (The model assumes that one, and only one, of the known propositions is true, so it would be a violation of the model's premises for the θ set to begin with belief or plausibility values other than 1.0.)

One way to think about the Dempster-Shafer Model is to visually represent the combinatorial space as a graph, as shown in FIG. 23. The top of the graph is the θ set. The second level contains all possible combinations of propositions of size three. The next level contains combinations of size two, and the leaf nodes are singleton sets representing the individual propositions. The total belief within the graph is always 1.0, although it may be distributed among any number of nodes in the graph. Initially, without any evidence, all the belief resides at the top node. As evidence is collected, belief values move downward in the graph. The distribution of belief values is an indication of the amount of ignorance in the model.

When the degree of ignorance is high, the belief in the top level θ set will be high. When the degree of ignorance is low, the belief values will be distributed below the θ set. The level of ignorance can also be gauged by the spread between the [belief, plausibility] values for a given proposition set. As the plausibility and belief values approach each other, the degree of ignorance in a proposition set decreases.

As an example case, assume that a physician wants to use the model to help diagnose a patient's symptoms, and the simplified set of possible diagnoses contains allergy, flu, cold, and pneumonia, abbreviated as A, F, C, and PN. θ, therefore, is the set {A,F,C,PN}. Dempster-Shafer defines a probability density function, called m. This function is defined over θ and all subsets[17] of θ. For any given subset of θ, p, m(p) returns the belief in p.

[17] Note that for a θ set of size n, there are $2^n$ possible subsets. In theory, calculating belief and plausibilities for all permutations of θs could lead to exponential growth in complexity, but in practice only a subset of these combinations must be explored.

In our example, m(θ) represents the belief in a patient having any one of the four diagnoses. Since the model assumes that the propositions in the θ set are exhaustive, we can say with complete certainty that our example patient has one of the four ailments; we just do not know which one. m(θ), then, is 1.0, indicating that we believe the patient's correct diagnosis is within the θ set. As the physician finds evidence in support of individual diagnoses, the model should reflect a refinement of belief toward particular subsets of θ.

Suppose that the physician finds that the patient presents a mild fever. Because fevers are often found in patients with the flu, colds or pneumonia, the physician decides, with 0.6 certainty, that the correct diagnosis is one of {F,C,PN} with a belief of 0.6. This evidence is used to update m( ) so that the state of the model is:

| | |
|---|---|
| {F, C, PN} | (0.6) |
| θ | (0.4) |

A portion of belief (0.6) has been shifted to the {F,C,PN} set indicating the new evidence. The remaining belief (0.4) has not been assigned to the complement of {F,C,P}, but has been left in the θ set, which represents that the remaining belief value has not been further refined. If it had assigned 0.4 to {A}, it would have implicitly stated that there was evidence directly in support of A, which is not the case.

Now suppose that the physician finds the patient has a running nose which is indicative of allergies, the flu, or a cold. It is also a stronger piece of evidence than the fever, so the physician assigns it a confidence of 0.8. This results in a separate frame of discernment and m( ) function, representing the runny nose evidence.

| | |
|---|---|
| {A, F, C} | (0.8) |
| θ | (0.2) |

The Dempster-Shafer Model defines a method for combining sources of evidence, and it is this rule of combination that allows us to reflect a new set of beliefs based on both of the physician's observations. Assume we have two probability density functions, $m_1$ and $m_2$. X is the set of subsets of θ to which $m_1$ assigns nonzero values, and Y is the corresponding set for $m_2$. A new probability density function that reflects the combined evidence, $m_3$, is calculated by the formula in FIG. 25. The set Z is the collection of sets found by intersecting X and Y. The best way to describe how this formula works is by returning to the example.

If we consider the physician's recognition of fever as m1 and a running nose as m2, applying the numerator portion of equation in FIG. 23 results in Table 5.2. The rule of combination looks for all possible intersections between the sets X and Y. These intersections form the sets in the body of the table. When an intersection is found, the value of m3 for that subset is calculated by multiplying the belief values corresponding to the original X and Y subsets. For example, when the first subset of X ({F,C,PN}) is intersected with the first subset of Y ({A,F,C}), the resulting intersection ({F,C}) is assigned 0.8*0.6 (0.48).

It may be the case that a particular subset of propositions appears more than once in the body of the table. (This is not the case for this current example.) When this happens, the m( ) values for each instance are summed. This process represents the numerator in FIG. 224. In our example, the new representation of diagnosis becomes:

| | |
|---|---|
| {F, C} | (0.48) |
| {A, F, C} | (0.32) |
| {F, C, PN} | (0.12) |
| θ | (0.08) |

TABLE 5.2

Dempster-Shafer Example 1

| X | | Y: {A, F, C} | (0.8) | θ | (0.2) |
|---|---|---|---|---|---|
| {F, C, PN} | (0.6) | {F, C} | (0.48) | {F, C, PN} | (0.12) |
| θ | (0.4) | {A, F, C} | (0.32) | θ | (0.08) |

Note how the combination of evidence has increased the belief in flu and cold while the amount of belief assigned to θ has decreased. This behavior is typical of the Dempster-Shafer model—as new evidence is added, the belief in particular propositions becomes more refined.

Calculating the rule of combination can become more complex when the process of intersection X and Y yields empty sets. To illustrate, assume that the physician uncovers a third piece of evidence: when the patient goes on vacation, his or her ailment disappears. This leads the physician to believe that the problem is almost certainly due to allergies caused by local plant life. The new evidence is described in the Dempster-Shafer model as follows.

| | |
|---|---|
| {A} | (0.9) |
| θ | (0.1) |

Incorporating this new evidence with the previously calculated values is a matter of again applying the formula for evidence combination, with the results detailed in Table 5.3.

TABLE 5.3

Dempster-Shafer Example 2

| X | | Y: {A} | (0.9) | θ | (0.1) |
|---|---|---|---|---|---|
| {F, C} | (0.48) | { } | (0.432) | {F, C} | (0.048) |
| {A, F, C} | (0.32) | {A} | (0.288) | {A, F, C} | (0.032) |
| {F, C, PN} | (0.12) | { } | (0.108) | {F, C, PN} | (0.012) |
| Θ | (0.08) | {A} | (0.072) | θ | (0.008) |

This combination illustrates two new steps that must be taken when combining evidence. First, because {A} appears more than once in the body of the table, these sets must be summed to produce the belief in {A}. (This process corresponds to the summation symbol in the evidence combination equation.) Second, some measure of belief has been assigned to the null set (0.432+0.108, or 0.54). The Dempster-Shafer model, however, assumes that the θ set is exhaustive, i.e., the answer must be one of its members, so allowing belief to be assigned to the null set would violate this tenet. To adjust for these cases, all non-null set values are normalized by dividing by 1.0 minus the null set's value, in this example, by 1.0-0.54. This is the function of the denominator in evidence combination equation. Normalizing has the effect of redistributing the unattributed evidence evenly to all sets of propositions. The resulting distribution of belief is the following.

| | |
|---|---|
| {A} | (0.157) |
| {F, C} | (0.104) |
| {A, F, C} | (0.696) |
| {F, C, PN} | (0.026) |
| θ | (0.017) |

Finally, the Dempster-Shafer model defines three measures based on the probability density function, as shown in FIG. 26. These measures, Belief, Doubt, and Plausibility, allow us to assess the amount of certainty and ignorance in a set of propositions, p. Belief is a measure of how much evidence supports a set of propositions.

For example, to establish the Belief in set {A,F,C}, we would sum the Belief in all of its subsets, 0.696 for {A,F,C}, 0.104 for {F,C}, and 0.157 for {A}. The resulting Belief value of 0.957 is very high, indicating that the vast majority of evidence says that one of the members of {A,F,C} is the true proposition. The Belief for {A} alone, however, is only 0.157 while the belief in (F) or (C) is zero. Even though there is strong evidence for the {A,F,C} set, its Belief cannot be attributed to any particular member. Doubt and Plausibility give us a way to measure how much Belief could be attributed to a proposition if more evidence is collected. Consider the [Belief, Plausibility] values for the individual propositions in our example case.

| | |
|---|---|
| {A} | [0.157, 0.87] |
| {C} | [0.0, 0.843] |
| {F} | [0.0, 0.843] |
| {PN} | [0.0, 0.043] |

The Plausibility values of {A}, {C}, and {F} are quite high, indicating that the evidence may support them, but it is unclear yet whether it will.

Note the 0.0 belief values for propositions C, F, and PN. This indicates that we have no evidence for any of these propositions individually. We have seen, however, evidence directly in support of proposition A which is reflected in its 0.157 belief value. The plausibility values for A, C, and Fare large because there is so little evidence assigned to the alternative PN. Moreover, because we have much less confident evidence for non-A propositions, the plausibility for proposition A is also high. Evidence for non-A propositions exists, but it is held in the non-singleton sets {F,C}, {A,F,C}, and {F,C,PN}. This accounts for the spread between Belief and Plausibility of A.

The Dempster-Shafter model, however, still lacks one feature which BABAR requires, the ability to give evidence sources relative weighting. For example, when evaluating an anaphor, syntactic role identification contributes to the overall decision, but its evidence is less reliable than that of lexical repetition or semantic agreement. The decision model needs to take this notion into account, and adding this ability to Dempster-Shafer is described in the following section.

Adding Relative Weighting to the Dempster-Shafer Model

In dealing with coreference, some sources of knowledge are more valuable than others. Recency, for example, may make a contribution to the overall decision-making process, but it does not affect the outcome as much as lexical similarity does. Consider definite NP anaphors. Lexically similar candidate antecedents are more often the true antecedents than the most recent candidate.

The need to manage knowledge source input differently arises from the recognition that some knowledge sources are characteristically different from others. Knowledge sources like gender and number agreement are discrete—they effectively vote for or against a candidate antecedent. In the latter case, the candidate antecedent can be filtered completely from continued consideration. Knowledge sources like recency and syntactic roles, on the other hand, are merely suggestive. Between these two extremes fall knowledge sources like semantic agreement which can filter out improper candidate antecedents and provide suggestive input on the remaining candidates.

Recognizing how credible one knowledge source is compared to another, however, is an important issue. During the course of developing BABAR, it became clear that semantic knowledge sources (e.g., semantic agreement and the caseframe semantic expectations) should be given more weight than the purely suggestive knowledge sources like recency and syntactic roles. In its standard form, though, the Dempster-Shafer Model assumes that each source of knowledge participates equally in the belief assignment process.

To address this issue, less weighty knowledge sources must be limited in their ability to affect the combination of probabilities within the Dempster-Shafer model. One way to do this would be to restrict the maximum belief value that a knowledge source could assign to a candidate antecedent. The drawback to this approach is that the knowledge source is no longer able to act independently. Rather, it must have an understanding of its relative weight and apply a corresponding "belief reduction factor" to its calculations.

An alternative method is to apply a belief reduction factor to the output of a knowledge source. The belief reduction factor has the effect of moving belief from non-θ sets to the θ set. For example, if a knowledge source were considered to only have 60% relative weight, the belief assigned to each non-θ set would be reduced by 60% with the remaining belief transferred to the θs et. In Table 5.4, the earlier example of medical diagnosis has been mitigated by how reliable we believe the physician is. The first column of belief values represents the physician's assignment, and the second column represents the final belief values after reducing the physician's assignment by 60%. Belief has been transferred from the set {A,F,C} to the overall θ set.

TABLE 5.4

Relative Weighting Example

| | Before Relative Weighting | After Relative Weighting |
|---|---|---|
| {A, F, C} | (0.8) | (0.48) |
| Θ | (0.2) | (0.52) |

By applying the weighting factor after the knowledge source has made its initial belief assignments, the knowledge source is able to make decisions independently of its relationships with other knowledge sources. This simplification makes tuning of the knowledge sources more manageable because it abstracts the issue of relative weighting to a higher level.

In BABAR, each knowledge source is assigned a relative weight. Exactly what those weights should be is an open question. In the experiments to be discussed shortly, the relative weights were chosen empirically. The Dempster-Shafer model does not address the weighting of evidence from different sources, so I will refer to BABAR's implementation of the Dempster-Shafer model, which includes an extra mechanism for weighted evidence received from different knowledge sources, as Weighted Dempster-Shafer.

Using Weighted Dempster-Shafer for Coreference Resolution

Weighted Dempster-Shafer is a relatively complex, probabilistic model. Why not use a simpler method for assessing evidence? The underlying ability of the Dempster-Shafer model to assign evidence to a set of candidate antecedents gives it two advantages that are relevant to coreference resolution.

First, many of the knowledge sources generate evidence values that may be shared by a number of candidate antecedents, and these are well handled by the Dempster-Shafer model. For example, in the terrorism environment, BABAR learns that the syntactic role knowledge source should generate probabilities of 0.33 (for subject), 0.31 (for direct object), 0.15 (for object of a preposition), or 0.0 (for any other syntactic role). It is quite likely that more than one candidate antecedent will have the same syntactic role, but this knowledge source has no ability to distinguish among them. If two subject role candidate antecedents existed, the knowledge source could only offer evidence of 33% probability for both them. If BABAR distributed the 33% probability evenly across them, it would be implicitly offering 16.5% evidence for each candidate antecedent independently, but there is no basis for this distribution of the evidence. The Dempster-Shafer model gives BABAR the ability to group these candidate antecedents together, holding the evidence at the level that is appropriate for each knowledge source. Only after all available evidence has been gathered the model generate Belief values at an individual candidate antecedent level.

BABAR normalizes evidence across knowledge source scores prior to sending evidence values to the Weighted Dempster-Shafer decision model. For example, consider the case in which five candidate antecedents (A, B, C, D, and E) exist, and CFLex generates scores for them of 1.0 for {A, B}, 0.5 for {C, D}, and 0.1 for {E}. These scores sum to 1.6, so they are first normalized to sum to 1.0. Dempster-Shafer will now assign 0.63 to the set {A, B}, 0.31 to the set {C, D} and 0.06 to {E}.

This notion of assigning evidence to groups of candidate antecedents is important for a second reason. The two case-frame-based knowledge sources that act on contextual role semantic expectations generate negative evidence, i.e., rather than support a particular candidate antecedent, they identify those that do not appear to be valid. BABAR translates the negative evidence against a particular candidate antecedent to positive evidence for the alternative candidates. For example, if four candidate antecedents were in contention, {A,B,C,D}, and the CfSem-CfSem knowledge source generated a negative probability of 100% for candidate C, BABAR will assign a positive 100% probability measure to {A,B,D}. This move from negative evidence against a proposition to positive evidence for the complement of the proposition is managed by Weighted Dempster-Shafer due to its ability to consider the complement collectively—as a single set of propositions instead of a number of individuals that need their own probability scores.

Additionally, the Dempster-Shafer model defines a method for combining evidence from multiple sources. While other models exist that address uncertainty, such as fuzzy set logic and Bayesian networks, they do not provide a mechanism for assigning evidence to a set of propositions collectively. Similarly, when individual assessments of propositions are not available, they do not provide a method for mathematically combining the evidence assigned to one collection of propositions with that of another set.

One of the important characteristics of the underlying Dempster-Shafer model is that it can be shown to be mathematically sound given that its data meet the assumptions made by the model.

Specifically, the set of propositions must be exhaustive, mutually exclusive, and exactly one of them must be true. BABAR may violate these assumptions in two ways.

First, an anaphor may have more than one antecedent within the candidate collection window. BABAR mitigates this model violation by collapsing known anaphoric chains into a single candidate "proposition." BABAR applies its knowledge sources to each member of the anaphoric chain independently, assigning the maximal score from each knowledge source to the candidate proposition. For example, if candidate NPs A, B, and C are known to be anaphorically linked, they will be collapsed into a single candidate, ABC, for Dempster-Shafer calculations. Illustrating two knowledge sources: If A is a lexical match with the anaphor while C is the more recent of the three, the composite candidate ABC will receive A's lexical match score and C s recency score.

Second, either due to overly aggressive candidate filtering or a long distance antecedent, the true antecedent may not exist in the candidate window. In practice, this is a relatively rare problem.

In all the experimental results to be presented in the following chapter, BABAR implemented its Weighted Dempster-Shafer method by reducing the relative contribution of two knowledge sources, recency and syntactic role. Recency is a knowledge source that will always apply to a candidate antecedent, i.e., just because we can measure the distance between an anaphor and a candidate antecedent does not truly generate supportive evidence of an anaphoric relationship. This is less the case with more discerning knowledge sources like semantic agreement, lexical similarity and the case-frame-based knowledge sources. Syntactic role is similar to recency in that it also applies to most candidate antecedents. For this reason, BABAR reduces the evidence from these two knowledge sources by 50%, e.g., if recency suggests that a particular candidate antecedent receive 80% certainty, the Weighted Dempster-Shafer model will reduce that evidence value to 40% prior to any normalization or other calculations.

In the following section, I will present experimental results showing that the Weighted Dempster-Shafer approach gives BABAR the ability to resolve anaphors with good precision.

EXPERIMENTAL RESULTS

Domains and Corpora

To evaluate BABAR, I performed experiments on two distinct corpora. Both corpora are domain specific. The first corpus consists of 1,700 texts from MUC-4. 1,600 texts were used to train BABAR, and 40 texts were set aside as a blind test set, reserving the remainder for tuning. The MUC-4 texts are largely news articles and radio transcripts of Latin American terrorist acts, military operations, and police actions. The corpus is all capitalized.

The second corpus consists of 8,295 Reuters newswire articles involving natural disasters, e.g., hurricanes and wildfires. Reuters tags its content with subject codes, so the domain-specific corpus was created by selecting all texts with the natural disaster subject code from Reuter's August 1996-July 1997 research corpus.[18] Forty texts were randomly selected as a blind test set, 10 were selected for tuning, leaving the other 8,245 for training.

[18] Reuters Corpus, Volume 1, English language, 1996-08-20 to 1997-08-19 (Release date 2000-11-03, Format version 1, correction level 0)

To evaluate BABAR's performance, I manually created an answer key for each test corpus. The answer key defines the anaphoric chains in each document. One of the challenges in evaluating a coreference resolver is how to compare the resolution of an anaphor/antecedent pair against a collection of anaphoric chains. As part of the MUC-6 evaluation, a standardized method for coreference resolver evaluation was offered, and I used this method to evaluate BABAR. This approach compares the equivalence classes defined by a gold-standard key with the equivalence classes generated by an coreference resolution system, rather than comparing the individual links themselves.

6.2 Evaluating the Use of Contextual Role Knowledge 6.2.1 Baselines

I began by establishing a set of baseline measurements, against which I could assess the difficulty of coreference resolution in our corpora. The baselines consist of four resolution algorithms (shown in Table 6.1) that do not involve any of BABAR's learned knowledge sources or the Weighted Dempster-Shafer decision model. Instead, they implement resolution algorithms based on combinations of recency, lexical similarity, and agreement in number and gender. The Most Recent NP algorithm resolves an anaphor with its closest preceding NP. Most Recent NP with Filtering will discard those NPs that do not pass gender and number agreement tests prior to selecting the most recent NP. Most Recent NP with Lexical Match will first resolve an anaphor with a lexically matched candidate NP, and will fall back to the most recent NP when no lexical match exists. The fourth algorithm includes both filtering and lexical match behavior.

TABLE 6.1

Baseline Performance

| | Terrorism | | Natural Disasters | |
|---|---|---|---|---|
| Baseline Algorithm | Recall | Precision | Recall | Precision |
| Most Recent NP | 28.9 | 12.1 | 20.1 | 10.4 |
| Most Recent NP with Filtering | 35.5 | 15.1 | 28.2 | 14.6 |
| Most Recent NP with Lexical Match | 46.1 | 19.3 | 37.8 | 19.5 |
| Most Recent NP with Filtering and Lexical Match | 50.2 | 21.3 | 40.0 | 20.7 |

These baseline algorithms are relatively simple, but the best one produces respectable recall of 50% in terrorism and 40% in natural disasters. Precision values, however, are very low. These baselines always produce a resolution, often defaulting to the most recent NP, and this aggressive element leads to the low precision levels. This is particularly true of definite NPs, some of which are nonanaphoric. Table 6.2 and Table 6.3 illustrate recall and precision values broken down by pronoun vs. definite NP. Compared to definite NP anaphors, pronominal anaphors more often have nearby antecedents, so the default behavior of the baselines is more likely to produce a correct resolution in their case. In both terrorism and natural disasters, precision of pronominal anaphors is much greater than that of definite NP anaphors.

These algorithms demonstrate several things. First, a sizeable number of anaphors in both domains can be resolved on the basis of recency, gender and number agreement, and lexical similarity. This is particularly true of pronouns. Second, identifying lexical similarity helps resolve an initial set of definite NP anaphors, but many cases are not simply repetitive mentions (e.g., the vehicle, the car). Third, forcing every anaphor to be resolved leads to lower precision levels, particularly with respect to definite NP anaphors. Other than lexical matches, these baseline algorithms always resolve to the more recent NP compatible in number and gender. To improve precision, a decision algorithm must be more discerning.

TABLE 6.2

Baselines in Terrorism by Anaphor Type

| | Terrorism | | | |
|---|---|---|---|---|
| | Definite NPs | | Pronouns | |
| Baseline Algorithm | Recall | Precision | Recall | Precision |
| Most Recent NP | 10.6 | 3.2 | 45.9 | 41.8 |
| Most Recent NP with Filtering | 18.1 | 5.6 | 53.4 | 49.3 |
| Most Recent NP with Lexical Match | 40.4 | 12.3 | 49.6 | 45.2 |
| Most Recent NP with Filtering and Lexical Match | 44.7 | 13.8 | 53.4 | 48.9 |

TABLE 6.3

Baselines in Natural Disasters by Anaphor Type

| | Natural Disasters | | | |
|---|---|---|---|---|
| | Definite NPs | | Pronouns | |
| Baseline Algorithm | Recall | Precision | Recall | Precision |
| Most Recent NP | 3.8 | 1.4 | 31.4 | 28.5 |
| Most Recent NP with Filtering | 8.4 | 3.2 | 44.8 | 41.4 |
| Most Recent NP with Lexical Match | 32.9 | 12.2 | 37.8 | 33.6 |
| Most Recent NP with Filtering and Lexical Match | 35.4 | 13.3 | 40.9 | 37.6 |

Evaluating BABAR

BABAR implements a decision algorithm that does not necessarily produce a resolution for every anaphor. The Weighted Dempster-Shafer decision model of BABAR measures evidence, and it only resolves an anaphor when the known evidence surpasses a threshold.[19] Tables 6.4 and 6.5 illustrate the behavior of $\text{BABAR}_{SIMPLE}$, a version of BABAR that implements the Weighted Dempster-Shafer decision model, along with the nonanaphoric NP classifier, and reliable case resolutions. The knowledge sources that participate are the general knowledge sources: lexical similarity, gender agreement, number agreement, recency, syntactic role and scoping. The semantic agreement knowledge source and all four caseframe-based knowledge sources were not active.

[19] Unless otherwise noted, BABAR enforced that the amount of Dempster-Shafer belief in candidate antecedent equaled or exceeded 0.5 before it would be selected for resolution. Section 6.5 addresses this threshold in detail.

In both Tables 6.4 and 6.5, definite noun phrase resolutions and pronouns resolutions are reported separately. Pronouns are further divided into relative pronouns, reflexive pronouns, and first, second, and third person pronouns.[20]

[20] Since BABAR does not implement any sort of conversational model, it elects to treat first and second person pronouns very simply. Each first person pronoun is resolved with the nearest preceding first person pronoun, if one is available. Second person pronouns are handled in the same way.

In the terrorism domain, $\text{BABAR}_{SIMPLE}$ generates 33% recall and 79% precision for all targeted anaphors. This is an increase of 58% in precision over the best baseline algorithm. Because $\text{BABAR}_{SIMPLE}$ is more cautious in its resolutions, it fails to resolve a number of anaphors that the simple baselines resolve, leading to a 17% drop in recall. The results are similar in natural disasters. In that domain, $\text{BABAR}_{SIMPLE}$ generates 23% recall and 84% precision, also a 17% recall drop over the best baseline, but showing an increase in precision of 63%.

BABAR$_{SIMPLE}$ is a clear win in terms of precision, but it offers reduced recall. Adding additional sources of evidence is one way to help BABAR increase its recall.[21]

[21] Occasionally, the number of definite descriptions and pronouns will not sum to the number of all targeted anaphors. This occurs due to an implementation detail. For example, consider a case in which BABAR resolves:

NP_A (a definite NP) with NP_B, and
NP_B (a relative pronoun) with NP_C.
The answer key dictates that:
NP_A resolves with NP_C, and that
NP_B resolves with NP_D.

When considered together, NP_A has been correctly resolved with NP_C, even if it was via an incorrect resolution in the middle. When the evaluation of definite NPs alone is performed, only those anaphoric pairs in the key that contain a definite NP anaphor are included. So, the key's link between NP_B and NP_C is not included. Without this link, the resolution of NP_A to NP_C looks like an incorrect resolution. The All Targeted performance is a complete representation because it encodes all members of the anaphoric chains.

One knowledge source that BABAR$_{SIMPLE}$ does not include is the semantic agreement knowledge source, along with its associated semantic dictionary and proper noun identification. The semantic agreement KS will both filter semantically incompatible candidate NPs and offer supporting evidence for candidate NPs that match anaphors of the type human, company, location, or date. To evaluate the impact of semantic agreement, I create a version of BABAR, BABAR$_{SEMANTIC}$, that included the general knowledge sources as well as the semantic agreement KS. Tables 6.6 and 6.7 show the results of BABAR$_{SEMANTIC}$ in both domains.

Adding semantic knowledge to the system increases recall on both domains at sizeable levels over BABAR$_{SIMPLE}$ as shown in Table.6.6 and 6.7. For terrorism, recall moves from 33% to 46% while precision drops by roughly 3%. For natural disasters, recall improves more dramatically, from 23% to 42%, while precision moves up by more than 3%. The increase in recall is primarily driven by increased resolutions of definite noun phrases and the pronouns he and she. In the case of he and she, candidate antecedents that are not tagged as human are filtered out of the candidate antecedent set. Those that are known to be human also gain positive evidence. In the case of definite noun phrases, any candidate antecedent whose semantic tags do not intersect those of the anaphor is removed from contention. This has the result of often greatly reducing the number of candidate antecedents. This in turn allows the probabilities of some of the likely candidates to rise above selection thresholds, leading to additional resolved anaphors.

When comparing BABAR$_{SEMANTIC}$ to the simple baselines, we find that its recall performance approaches that of the simple baselines. In terrorism, recall is 6% lower than the best baseline, and in natural disasters, recall is 8% lower. At the same time, however, precision scores are much higher for BABAR$_{SEMANTIC}$-55% higher in terrorism and 66% higher in recall. In general, adding semantic knowledge to the system appears to be a clear winning strategy.

TABLE 6.4

Terrorism Results for BABAR$_{SIMPLE}$

| | Correct Resolved | Total Cases | Recall % | Correct Resolved | Total Resolved | Precision % | F Measure |
|---|---|---|---|---|---|---|---|
| DefiniteDesc | 49 | 188 | 26.1% | 49 | 58 | 84.5% | 0.40 |
| AllPronouns | 55 | 133 | 41.4% | 55 | 75 | 73.3% | 0.53 |
| Reflexive | 1 | 1 | 100.0% | 1 | 1 | 100.0% | 1.00 |
| Relative | 43 | 63 | 68.3% | 43 | 61 | 70.5% | 0.69 |
| 1st & 2nd Person | 0 | 5 | 0.0% | 0 | 1 | 0.0% | 0.00 |
| 3rd Person | 11 | 64 | 17.2% | 11 | 12 | 91.7% | 0.29 |
| AllTargeted | 105 | 321 | 32.7% | 105 | 133 | 78.9% | 0.46 |

TABLE 6.5

Natural Disasters Results for BABAR$_{SIMPLE}$

| | Correct Resolved | Total Cases | Recall % | Correct Resolved | Total Resolved | Precision % | F Measure |
|---|---|---|---|---|---|---|---|
| DefiniteDesc | 34 | 237 | 14.3% | 34 | 39 | 87.2% | 0.25 |
| AllPronouns | 70 | 210 | 33.3% | 70 | 85 | 82.4% | 0.47 |
| Reflexive | 1 | 2 | 50.0% | 1 | 1 | 100.0% | 0.67 |
| Relative | 37 | 51 | 72.5% | 37 | 43 | 86.0% | 0.79 |
| 1st & 2nd Person | 15 | 25 | 60.0% | 15 | 17 | 88.2% | 0.71 |
| 3rd Person | 16 | 131 | 12.2% | 16 | 23 | 69.6% | 0.21 |
| AllTargeted | 104 | 447 | 23.3% | 104 | 124 | 83.9% | 0.36 |

TABLE 6.6

Terrorism Results for BABAR$_{SEMANTIC}$

| | Correct Resolved | Total Cases | Recall % | Correct Resolved | Total Resolved | Precision % | F Measure |
|---|---|---|---|---|---|---|---|
| DefiniteDesc | 80 | 188 | 42.6% | 80 | 101 | 79.2% | 0.55 |
| AllPronouns | 67 | 133 | 50.4% | 67 | 93 | 72.0% | 0.59 |
| Reflexive | 1 | 1 | 100.0% | 1 | 1 | 100.0% | 1.00 |

TABLE 6.6-continued

Terrorism Results for $BABAR_{SEMANTIC}$

| | Correct Resolved | Total Cases | Recall % | Correct Resolved | Total Resolved | Precision % | F Measure |
|---|---|---|---|---|---|---|---|
| Relative | 45 | 63 | 71.4% | 45 | 64 | 70.3% | 0.71 |
| 1st & 2nd Person | 0 | 5 | 0.0% | 0 | 1 | 0.0% | 0.00 |
| 3rd Person | 21 | 64 | 32.8% | 21 | 27 | 77.8% | 0.46 |
| AllTargeted | 148 | 321 | 46.1% | 148 | 194 | 76.3% | 0.57 |

TABLE 6.7

Natural Disasters Results for $BABAR_{SEMANTIC}$

| | Correct Resolved | Total Cases | Recall % | Correct Resolved | Total Resolved | Precision % | F Measure |
|---|---|---|---|---|---|---|---|
| DefiniteDesc | 100 | 237 | 42.2% | 100 | 110 | 90.9% | 0.58 |
| AllPronouns | 88 | 210 | 41.9% | 88 | 107 | 82.2% | 0.56 |
| Reflexive | 2 | 2 | 100.0% | 2 | 2 | 100.0% | 1.00 |
| Relative | 37 | 51 | 72.5% | 37 | 43 | 86.0% | 0.79 |
| 1st & 2nd Person | 16 | 26 | 61.5% | 16 | 18 | 88.9% | 0.73 |
| 3rd Person | 33 | 131 | 25.2% | 33 | 44 | 75.0% | 0.38 |
| AllTargeted | 189 | 447 | 42.3% | 189 | 217 | 87.1% | 0.57 |

Adding contextual role knowledge sources to $BABAR_{SEMANTIC}$ gives us the complete BABAR system. In this form, BABAR applies the general knowledge sources, the semantic agreement knowledge source, and the four case-frame-based knowledge sources that support contextual roles. Tables 6.8 and 6.9 illustrate the performance of BABAR as a complete system.

BABAR shows improved recall over $BABAR_{SEMANTIC}$ in both domains. For terrorism, the addition of contextual role knowledge sources boosts recall by 6%, while recall in natural disasters improves by 9%. Both domains exhibit a drop in precision—for terrorism, precision moves from 76% to 73%, and for natural disasters the drop is from 87% to 82%.

TABLE 6.8

Terrorism Results for BABAR

| | Correct Resolved | Total Cases | Recall % | Correct Resolved | Total Resolved | Precision % | F Measure |
|---|---|---|---|---|---|---|---|
| DefiniteDesc | 84 | 188 | 44.7% | 84 | 118 | 71.2% | 0.55 |
| AllPronouns | 84 | 133 | 63.2% | 84 | 115 | 73.0% | 0.68 |
| Reflexive | 1 | 1 | 100.0% | 1 | 1 | 100.0% | 1.00 |
| Relative | 46 | 63 | 73.0% | 46 | 64 | 71.9% | 0.72 |
| 1st & 2nd Person | 0 | 5 | 0.0% | 0 | 1 | 0.0% | 0.00 |
| 3rd Person | 37 | 64 | 57.8% | 37 | 49 | 75.5% | 0.65 |
| AllTargeted | 169 | 321 | 52.6% | 169 | 233 | 72.5% | 0.61 |

TABLE 6.9

Natural Disaster Results for BABAR

| | Correct Resolved | Total Cases | Recall % | Correct Resolved | Total Resolved | Precision % | F Measure |
|---|---|---|---|---|---|---|---|
| DefiniteDesc | 108 | 237 | 45.6% | 108 | 129 | 83.7% | 0.59 |
| AllPronouns | 119 | 210 | 56.7% | 119 | 150 | 79.3% | 0.66 |
| Reflexive | 2 | 2 | 100.0% | 2 | 2 | 100.0% | 1.00 |
| Relative | 41 | 51 | 80.4% | 41 | 46 | 89.1% | 0.85 |
| 1st & 2nd Person | 16 | 26 | 61.5% | 16 | 18 | 88.9% | 0.73 |
| 3rd Person | 60 | 131 | 45.8% | 60 | 84 | 71.4% | 0.56 |
| AllTargeted | 229 | 447 | 51.2% | 229 | 279 | 82.1% | 0.63 |

In the same way that semantic agreement contributed to the resolution of pronominal anaphors more than definite NP anaphors, contextual roles should also more greatly impact pronouns. This happens because pronouns are semantically weaker than most definite NPs. Consider FIG. 27.

Semantically weak anaphors are those anaphors that can accept (or semantically agree with) an antecedent from a wide range of semantic classes. For example, it can agree with any inanimate class (a broad set of things), and they and them can agree with any class, including inanimate or animate classes (e.g., Jack owns six cars but never drives them. and Jack has six friends but never calls them).

Semantic weakness can be thought of as occupying a spectrum of values. On the weak end of the spectrum are the pronouns they and them, followed closely by it, that, and which. Although the latter two are semantically weak in that they typically take any inanimate antecedent, because they are relative pronouns, their more constrained antecedent scope makes them somewhat less problematic. Other pronouns like he and she are less semantically weak because they typically select antecedents of the human class, and they project a gender role.[22]

[22] Although gender agreement is handled by BABAR distinctly from semantic agreement, for the discussion of semantically weak pronouns, I include gender as a semantic quality.

On the strong end of the spectrum are definite NPs that possess very specific meaning, e.g., the Iraqi ambassador. Some definite NPs, however, are semantically weaker, e.g., the person or the man. In fact, the person is semantically weaker than the pronouns he or she because it does not possess a gender feature.

Because semantically weak anaphors have little ability to project semantic constraints on their antecedents, it should be the case that other factors play a role in resolving them. BABAR's performance demonstrates that contextual roles influence pronoun resolutions more than definite NP resolutions. In examining the resolution of pronominal anaphors between $\text{BABAR}_{SEMANTIC}$ (Tables 6.6, 6.7) and BABAR (Tables 6.8., 6.9), recall increases in the terrorism domain from 50% to 63% and precision moves up by 1%. In natural disasters, the increase in recall is from 42% to 57% with a 3% loss in precision.

The increase in recall of pronouns is primarily driven by resolutions of he and she, as shown in Tables 6.10 and 6.11. In both domains, adding contextual role knowledge increases recall as well as precision for these pronouns. Relative pronouns in natural disasters are also boosted both in recall and precision. Precision loss comes exclusively from the most semantically weak pronouns, it, they, and them. These are the most difficult anaphors to resolve, and while precision does drop by applying contextual roles, recall increases dramatically. When the resolutions of it, they, and them are aggregated, recall doubled from 23% to 54% in terrorism, while recall increased from 20% to 37% in natural disasters. Overall, the F-Measure for each pronoun type increased greatly with the addition of contextual role knowledge sources, indicating that the drops in precision were offset by a substantial increase in recall.

Recall increases were tested for statistical significance by applying the Chi-Squared test. In terrorism, the recall boost from 50% to 63% for pronouns was not statistically significant, but an increase in recall for third person pronouns (from 33% to 58%) was significant at the 0.95 level. In natural disasters, the increase in pronominal recall from 42% to 57% was also significant at the 0.95 level.

Comparing to Previous Work

Comparing these results to the coreference resolvers detailed in Chapter 2 can be challenging for a number of reasons. Prior to the MUC-6 efforts, most researchers reported only accuracy rates, not recall and precision. Many of the systems targeted a reduced set of anaphors, and the researchers commonly removed problematic cases prior to analysis. Hobbs, for example, reports an accuracy rate of 82% for the pronouns he, she, it, and they. The accusative forms of these pronouns were not treated, and the pleonastic uses of it were identified by hand and discarded. The Lappin and Lease system targeted all third person pronouns, but the test cases were filtered such that the anaphors were assured of having antecedents in the current or prior sentence, and no cases involved pronouns as candidate antecedents. Kennedy and Boguraev report an accuracy rate of 75%, although they also removed pleonastic cases of it, which would have otherwise resulted in an accuracy rate of 69%. None of these systems attempted the resolution of definite NPs.

TABLE 6.10

Pronoun Resolutions for Terrorism

| Anaphor Type | Correct Resolved | Total Cases | Recall % | Correct Resolved | Total Resolved | Precision % | F Measure |
|---|---|---|---|---|---|---|---|
| BABAR (Semantic) | | | | | | | |
| relative pro. | 45 | 63 | 71.4% | 45 | 64 | 70.3% | 0.71 |
| he, she | 13 | 29 | 44.8% | 13 | 18 | 72.2% | 0.55 |
| it | 3 | 13 | 23.1% | 3 | 3 | 100.0% | 0.38 |
| they, them | 5 | 22 | 22.7% | 5 | 6 | 83.3% | 0.36 |
| BABAR | | | | | | | |
| relative pro. | 46 | 63 | 73.0% | 46 | 64 | 71.9% | 0.72 |
| he, she | 18 | 29 | 62.1% | 18 | 24 | 75.0% | 0.68 |
| it | 6 | 13 | 46.2% | 6 | 7 | 85.7% | 0.60 |
| they, them | 13 | 22 | 59.1% | 13 | 18 | 72.2% | 0.65 |

TABLE 6.11

| Pronoun Resolutions for Natural Disasters | | | | | | | |
|---|---|---|---|---|---|---|---|
| Anaphor Type | Correct Resolved | Total Cases | Recall % | Correct Resolved | Total Resolved | Precision % | F Measure |
| BABAR (Semantic) | | | | | | | |
| relative pro. | 37 | 51 | 72.5% | 37 | 43 | 86.0% | 0.79 |
| he, she | 17 | 49 | 34.7% | 17 | 21 | 81.0% | 0.49 |
| it | 6 | 53 | 11.3% | 6 | 7 | 85.7% | 0.20 |
| they, them | 10 | 29 | 34.5% | 10 | 16 | 62.5% | 0.44 |
| BABAR | | | | | | | |
| relative pro. | 41 | 51 | 80.4% | 41 | 46 | 89.1% | 0.85 |
| he, she | 30 | 49 | 61.2% | 30 | 36 | 83.3% | 0.71 |
| it | 16 | 53 | 30.2% | 16 | 24 | 66.7% | 0.42 |
| they, them | 14 | 29 | 48.3% | 14 | 24 | 58.3% | 0.53 |

Systems that were evaluated on MUC-6 or MUC-7 data typically address a larger set of anaphor types that corresponds more closely to BABAR. Some systems, however, operate not on the text itself, but on output from an information extraction system, including McCarthy et al. and Kehler et al. The highest scoring system from MUC-6 was Kameyama (59% recall and 72% precision), and the best MUC-7 system was LaSIE-II (56% recall and 69% precision). They both used hand-coded, domain-specific semantic knowledge. Both systems outperform BABAR on recall, but BABAR generated higher precision values. The supervised learning system of Soon et al. used no hand-coded semantic knowledge, and it performed at 59% recall and 67% precision, again producing lower precision that BABAR. Similarly, Ng and Cardie's supervised decision tree model achieved 64% and 75% precision on MUC-6 data, surpassing BABAR's recall but not matching its precision. In making any comparisons from these systems to BABAR, it must be recognized that BABAR's test texts are not the same as any of the other systems. BABAR's behavior appears to be in line with other approaches. Drawing comparative conclusions beyond this becomes difficult.

An alternative to comparing BABAR against published performance rates is to apply a different resolver to our terrorism and natural disasters test sets. A number of technical issues make this difficult. Approaches like that of Hobbs or Lappin and Lease require parse tree complexity that is not supported by BABAR's underlying partial parsing engine. Those systems that require hand-coded semantic knowledge would require porting to both domains. The majority of the MUC-6 and MUC-7 approaches implemented supervised learning algorithms, requiring annotated training corpora. In theory, BABAR could be retrained on the MUC-6 or MUC-7 corpora and then tested on the corresponding test sets. BABAR's knowledge acquisition process, however, requires large quantities of texts, and the MUC-6 and MUC-7 training corpora (30 texts and 20 texts, respectively) are not large enough to support BABAR's unsupervised learning algorithms.

In general, a number of conclusions can be drawn. First, BABAR attempts resolution of both definite NPs and pronouns, it identifies pleonastic its and existential definite NPs on its own, and is acquires its knowledge via an unsupervised learning method. Even with these elements in place, BABAR performs comparably to most comprehensive coreference resolvers. Second, BABAR often performs with greater precision that alternative approaches, including those trained by supervised learning algorithms. Third, BABAR offers a new source of knowledge to the coreference resolution problem. Adding contextual role knowledge gives BABAR the ability to resolve a greater number of anaphors, particularly semantically weak anaphors like pronouns.

As described above, there are four contextual role-based knowledge sources that account for the increase in BABAR's performance. Establishing the contribution of each of these four KSs will be detailed in the following section.

Analysis of the Contextual Role Knowledge Sources

I also showed that contextual role knowledge allowed BABAR to improve recall, particularly on semantically weak anaphors. There are four distinct caseframe-based knowledge sources that represent contextual role knowledge. As a reminder, these knowledge sources are:

CFLex: Identifies when the lexical expectations of a caseframe match an NP.

CFNet: Identifies when a pair of caseframes have co-occurred in anaphoric relationships.

CFSem-CFSem: Identifies when the semantic class expectations of caseframes intersect.

CFSem-ExtSem: Identifies when the semantic class expectation of a caseframe matches the semantic class of the noun.

To assess the contribution of each knowledge source individually, I conducted four experiments in which BABAR allowed only one of the knowledge sources to actively participate in resolutions. Tables 6.12 and 6.13 show the performance of each knowledge source over the two domains. The knowledge sources that apply semantic expectations make the largest contribution to recall.

Furthermore, the combination of the four knowledge sources generates a higher recall score than any of them individually. All four knowledge sources contributed, but their combined effect on recall is greater than the best single contribution. There are two possible explanations for the synergistic effect. One, the knowledge sources are applying to different anaphors, and their resolutions reduce the number of candidate antecedents, leading to new resolutions. Two, the combined contributions push evidence values above the selection threshold. This behavior is more obvious when examining how the knowledge sources apply to pronouns vs. definite NPs, as shown in Tables 6.14 and 6.15.

These results continue to illustrate that the contextual role knowledge sources impact the semantically weak pronouns more than definite NPs. CFNet usually makes the smallest contribution because the caseframe network knowledge base is the least populated of the acquired knowledge bases. To gain entry, two caseframes must have appeared in a reliable case resolution. Then, they must have been seen with enough frequency to pass the log likelihood significance calculation. In contrast, a knowledge source like CFLex has access to a much greater number of training examples because it is not dependent on reliable case resolutions. The lexical expectation knowledge base is constructed by recording the extractions of all caseframes over the training set individually.

CFSem-CFSem and CFSem-ExtSem are most active, particularly on the pronouns in the natural disasters corpus. These semantic-based knowledge sources apply more often because semantic classes typically match many nouns. For example, a typical caseframe in natural disasters might have a lexical expectation for 20 or 30 nouns, but caseframes that have a semantic expectation for the natphenom class could be satisfied by any of the 803 terms marked by WordNet as a natural phenomenon. This ability to generalize at a semantic class level makes it more likely that CFSem-CFSem or CFSem-ExtSem will apply than CFlex and CFNet.

TABLE 6.12

Individual CF-based Knowledge Sources for Terrorism

| | All Targeted Anaphors | | |
|---|---|---|---|
| | Recall % | Precision % | F Measure |
| No CF KSs | 46.1% | 76.3% | 0.57 |
| CFLex only | 48.0% | 74.0% | 0.58 |
| CFNet only | 48.6% | 74.6% | 0.59 |
| CFSem-CFSem only | 50.2% | 75.9% | 0.60 |
| CFSem-ExtSem only | 51.7% | 75.5% | 0.61 |
| All KSs | 52.7% | 72.5% | 0.61 |

TABLE 6.13

Individual CF-based Knowledge Sources for Natural Disasters

| | All Targeted Anaphors | | |
|---|---|---|---|
| | Recall % | Precision % | F Measure |
| No CF KSs | 42.3% | 87.1% | 0.57 |
| CFLex only | 46.1% | 85.8% | 0.60 |
| CFNet only | 44.1% | 85.3% | 0.58 |
| CFSem-CFSem only | 47.2% | 84.4% | 0.61 |
| CFSem-ExtSem only | 47.7% | 82.2% | 0.60 |
| All KSs | 51.2% | 82.1% | 0.63 |

TABLE 6.14

Individual CF-based Knowledge Sources for Terrorism

| | Pronouns Only | | | Definite NPs Only | | |
|---|---|---|---|---|---|---|
| | Recall % | Precision % | F Measure | Recall % | Precision % | F Measure |
| No CF KSs | 50.4% | 72.0% | 0.59 | 42.6% | 79.2% | 0.55 |
| CFLex only | 56.4% | 74.3% | 0.64 | 41.5% | 72.9% | 0.53 |
| CFNet only | 56.4% | 74.3% | 0.64 | 42.6% | 74.1% | 0.54 |
| CFSem-CFSem only | 57.9% | 75.5% | 0.66 | 44.2% | 75.5% | 0.56 |
| CFSem-ExtSem only | 60.9% | 74.3% | 0.67 | 44.7% | 75.7% | 0.56 |
| All KSs | 63.2% | 73.0% | 0.68 | 44.7% | 71.2% | 0.55 |

TABLE 6.15

Individual CF-based Knowledge Sources for Natural Disasters

| | Pronouns Only | | | Definite NPs Only | | |
|---|---|---|---|---|---|---|
| | Recall % | Precision % | F Measure | Recall % | Precision % | F Measure |
| No CF KSs | 41.9% | 82.2% | 0.56 | 42.2% | 90.9% | 0.58 |
| CFLex only | 47.6% | 83.3% | 0.61 | 44.3% | 87.5% | 0.59 |
| CFNet only | 45.3% | 81.9% | 0.58 | 42.6% | 87.8% | 0.57 |
| CFSem-CFSem only | 50.5% | 80.9% | 0.62 | 43.5% | 86.6% | 0.58 |
| CFSem-ExtSem only | 52.4% | 78.6% | 0.63 | 43.0% | 85.7% | 0.57 |
| All KSs | 56.7% | 79.3% | 0.66 | 45.6% | 83.7% | 0.59 |

In both domains, CFSem-ExtSem improves the recall of pronouns by more than 10%. It clearly contributes more than any other caseframe-based knowledge source. Pronominal recall, however, improves the most when all four knowledge sources are combined.

In both domains, for pronominal anaphors, the combination of the four knowledge sources improves both recall and the balanced F-Measure more than any one individually.

Evaluation of Existential NP Filtering

One of the contributions of this dissertation is an unsupervised learning technique that allows existential definite noun phrases to be acquired automatically from a collection of domain-specific texts. Chapter 3 offered evidence that classification of existential definite NPs was possible through this unsupervised learning process, but it did not address how recognizing existential NPs might affect the overall performance of a coreference resolver. Tables 6.16 and 6.17 show the results of experiments on BABAR when existential definite NP filtering is turned on and off.[23] When existential filtering is turned on, definite NPs are classified prior to any coreference resolution. Only those NPs determined to be anaphoric are passed to the knowledge sources and the Weighted Dempster-Shafer decision model for resolution. When existential recognition is turned off, every definite NP is assumed to be anaphoric.

[23] In these experiments, the existential NP recognizer has been turned off for the purposes of nonanaphoric NP classification, however, it was active during training when BABAR uses it as part of the reliable case resolution process.

TABLE 6.16

BABAR with Existential NP Filtering in Terrorism

| | Definites Only | | | All Anaphors | | |
|---|---|---|---|---|---|---|
| | Recall | Precision | F | Recall | Precision | F |
| No Existential Filtering | 58.0% | 52.2% | 0.55 | 60.4% | 60.1% | 0.60 |
| Syntactic Heuristics Only | 41.5% | 65.6% | 0.51 | 50.8% | 70.0% | 0.59 |
| Full Existential Filtering | 44.7% | 71.2% | 0.55 | 52.7% | 72.5% | 0.61 |

TABLE 6.17

BABAR with Existential NP Filtering in Natural Disasters

| | Definites Only | | | All Anaphors | | |
|---|---|---|---|---|---|---|
| | Recall | Precision | F | Recall | Precision | F |
| No Existential Filtering | 61.6% | 59.1% | 0.60 | 60.2% | 67.6% | 0.64 |
| Syntactic Heuristics Only | 45.6% | 83.7% | 0.59 | 51.2% | 82.1% | 0.63 |
| Full Existential Filtering | 45.6% | 83.7% | 0.59 | 51.2% | 82.1% | 0.63 |

The tables illustrate three variations of existential NP identification during coreference resolution. The first experiment (No Existential Filtering) applies no existential definite NP identification. In this trial, all definite NPs are assumed to be anaphoric. The second experiment (Syntactic Heuristics Only) engaged the existential definite NP classifier, but it only allowed the syntactic heuristics to participate. None of the learned existential NP lists or patterns was active. The third experiment (Full Existential Filtering) includes both syntactic heuristics and the learned lists and patterns to determine if a definite NP was anaphoric.

These results show that filtering nonanaphoric definite NPs prior to coreference resolution improved precision at the cost of recall. With existential recognition, BABAR's recall on definite NPs in terrorism decreases from 58% to 45% but precision increases from 52% to 71%. In natural disasters, recall decreases from 62% to 46%, but precision increases from 59% to 84%.

Ng and Cardie showed similar results with an existential NP classifier that relied only on syntactic constructions to identify nonanaphoric definite NPs. In contrast, BABAR learns lists of existential definite NPs and existential NP patterns that capture cases not accessible through syntactic heuristics. When BABAR uses its acquired existential knowledge with its syntactic heuristics, both recall and precision in the terrorism domain improve over using syntactic heuristics alone. Definite NP recall improves by 4% and precision improves by 6%. In natural disasters, however, syntactic heuristics alone perform as well as the complete existential recognition system. Investigation showed that some existential definite NPs were not recognized by the learned lists and patterns. However when existential NP filtering was turned off, BABAR did not find an appropriate antecedent for them, and it correctly left them unresolved. Consequently, the addition of learned existential NP lists and patterns to existential NP filtering had no impact on recall or precision scores.

Clearly, there is a substantial cost in recall to BABAR's existential definite NP recognition. As mentioned in Chapter 3, the maximum precision of the existential identification algorithm was 87%. When this algorithm misclassifies a definite NP as existential, it removes that NP from treatment by the larger coreference resolver, thus reducing overall recall. Assuming that all definite NPs are anaphoric, however, leads to resolution of definite NPs that should not be resolved. Overall, the balanced F-Measures of BABAR with and without existential NP recognition are nearly identical, so the choice becomes a question of which is more important, recall or precision?

The design behind BABAR argues that most practical applications will benefit from increased precision over greater recall. Coreference resolution is typically used as one component of a larger NLP application. Errors during resolution can, therefore, affect downline processing. For example, a hypothetical search engine that performed coreference resolution would likely trigger the resolution process prior to indexing documents. Incorrectly resolved anaphors would trickle down to the index, potentially leading to poor retrieval results. In such cases, identifying existential NPs would bias the coreference resolver toward making fewer, but more precise resolutions.

Evaluation of the Weighted Dempster-Shafer Decision Model

Previously I argued that the Weighted Dempster-Shafer model was an appropriate model for assessing evidence about antecedents and anaphors. To evaluate this hypothesis, I experimented with a number of other decision models, focusing on voting mechanisms of varying complexity.

To understand how Weighted Dempster-Shafer compared to these alternatives, I turned off the reliable case resolution handler so the easy-to-resolve cases were not participating in any of these experiments. The recall and precision numbers presented in this section reflect only those coreference cases in which the decision model had to weigh evidence from the knowledge sources to make a resolution. The experiments included several decision models:

Voting1. This decision model sums the positive evidence values from each knowledge source. The candidate with the highest sum wins, and recency breaks ties. Negative evidence from CFSem-CFSem and CFSem-ExtSem is not used.

Voting2. Same as Voting1, except the sum of the evidence values for the winning candidate antecedent must be greater than or equal to 0.5. This decision model attempts to stop the resolver from making a resolution when only a small amount of evidence has been collected.

Voting3. Same as Voting2, with the following exception. In each of the prior voting models, the knowledge sources of syntactic role and recency would often force a resolution even when no other evidence was available. The Dempster-Shafer model compensates for this by reducing the evidence values from these knowledge sources by 50%. This version of the voting mechanism implements the same approach, and it enforces a rule in which evidence from these two knowledge sources alone is not enough to warrant a resolution.

Voting4. This decision model gives each knowledge source a single vote to apply to the candidate NP it has the most evidence for. The candidate with the most votes wins, and recency breaks ties. The syntactic role and recency knowledge sources have only a half vote, and the combination of the two alone is not sufficient to generate a winner.

DS-NoThreshold—BABAR's Weighted Dempster-Shafer model but without any thresholding applied to the belief values.

DS-Threshold—BABAR's Weighted Dempster-Shafer model with a belief threshold of 0.5.

Tables 6.18 and 6.19 show that voting-based decision algorithms perform at lower precision rates than the Weighted Dempster-Shafer algorithms. This happens because the voting mechanisms typically make resolutions even when not much evidence exists for a resolution. Voting1, in particular, is always forced to make a decision. Voting2 attempts to implement a threshold to back away from low evidence cases, but the combination of syntactic role and recency continue to force some resolutions, leading to low precision. Voting3 and Voting4 downplay the syntactic role and recency knowledge sources much like BABAR's Weighted Dempster-Shafer model, but they are still less accurate than BABAR. Even without any thresholding applied to the Weighted Dempser-Shafer model, the DS-NoThreshold algorithm produces higher precision values than either Voting1 or Voting2, and it produces a comparable or better balanced F-Measure than either Voting3 or Voting4. Adding a threshold to the belief values generates a much higher precision rate than any other method and the highest F-Measure.

BABAR enforces a belief threshold of 0.5 in all experiments. Intuitively, this means that BABAR requires that the majority of belief be assigned to a single candidate antecedent before it will resolve to that candidate. FIGS. 6.2 and 6.3 show Weighted Dempster-Shafer's performance with variations of belief from 0.0 to 1.0. The threshold of 0.5 generated the best mix of both recall and precision. Note that increasing this threshold would increase precision in terrorism but not in natural disasters.

TABLE 6.18

Decision Models for Terrorism

| Decision Model | Recall | Precision | F-Measure (1.0) | Recency & SynRole Enough? |
|---|---|---|---|---|
| Voting1 | 56.4% | 47.5% | 0.52 | Yes |
| Voting2 | 56.4% | 47.9% | 0.52 | Yes |
| Voting3 | 51.1% | 64.3% | 0.57 | No |
| Voting4 | 44.6% | 65.6% | 0.53 | No |
| DS-No Threshold | 54.8% | 59.9% | 0.57 | No |
| DS-Threshold | 48.6% | 71.9% | 0.58 | No |

TABLE 6.19

Decision Models for Natural Disasters

| Decision Model | Recall | Precision | F-Measure (1.0) | Recency & SynRole Enough? |
|---|---|---|---|---|
| Voting1 | 57.5% | 53.2% | 0.55 | Yes |
| Voting2 | 57.3% | 53.3% | 0.55 | Yes |
| Voting3 | 51.2% | 65.4% | 0.57 | No |
| Voting4 | 44.1% | 67.5% | 0.53 | No |
| DS-No Threshold | 57.7% | 64.0% | 0.61 | No |
| DS-Threshold | 50.1% | 79.7% | 0.62 | No |

In general, the Weighted Dempster-Shafer model delivers a more elegant way to gauge the amount of evidence in the system, including how much evidence supports a particular candidate vs. how much evidence supports a set of candidates jointly. In addition, Weighted Dempster-Shafer offers a simple way to handle the negative evidence from CFSem-CFSem and CFSem-ExtSem. Together, these characteristics let the Weighted Dempster-Shafer drive BABAR's decision model to levels of precision unreachable through voting models.

Evaluation Summary

Based on the results presented in this chapter, a number of conclusions can be drawn.

Using contextual role knowledge improves BABAR's performance. It gives BABAR the ability to resolve a set of anaphors that would otherwise be left unresolved, in particular, semantically weak anaphors. Among the most difficult anaphors to resolve (it, they, and them), BABAR's contextual role knowledge shows promise in that it strongly increase recall rates, but additional efforts are necessary to overcome a decrease in precision.

The four contextual role knowledge sources each make individual contributions to anaphor resolutions. Furthermore, combining them improves performance more than any one of them independently.

Using existential definite NP recognition to filter nonanaphoric NPs prior to resolution improves precision.

The Dempster-Shafer decision model used by BABAR is able to detect when high levels of uncertainty exist or when evidence is distributed away from a particular candidate antecedent and back away from these cases, which leads to improved rates of precision.

CONCLUSION

Contributions

As mentioned at the beginning of this dissertation, I was motivated to work on coreference resolution because it represents a ubiquitous challenge in natural language processing. Almost any sophisticated NLP application would benefit from the resolution of anaphors, so developing a comprehensive model for coreference resolution would have broad implications. Creating a broad-based model suitable for incorporation in larger applications presented several challenges.

To be broad-based, the model must be able to target both pronominal and definite noun phrase anaphors. Both anaphor types have characteristics that challenge the model. Definite NPs, for example, are not always anaphoric. BABAR addresses definite NPs by presenting an unsupervised learning technique that acquires lists of nonanaphoric definite NPs and patterns that recognize them. This is the first major contribution of this work.

Contribution 1: Nonanaphoric noun phrases can be automatically identified from a corpus of texts using an unsupervised learning method. Additionally, this acquired knowledge can be incorporated into the process of automated coreference resolution in general, leading to improved precision.

Above I illustrated both how BABAR acquires its collections of nonanaphoric definite NPs and NP patterns, and how BABAR applies those collections to classify definite NPs. The chapter showed that nonanaphoric definite NPs were classified with 78% recall and 87% precision. I also validated the second portion of the contribution by showing that filtering nonanaphoric definite NPs prior to coreference resolution increased precision of definite NP resolutions by roughly 20% in each of the two testing domains (19% in terrorism, 25% in natural disasters).

Although there are clear cases in which pronouns are nonanaphoric (e.g., pleonastic its), pronominal anaphors can be difficult to resolve for a different reason. These anaphors are often semantically weaker than definite NPs. This is particularly true of it, they, and them. Taken in isolation, these pronouns can resolve with members of virtually any semantic class. Even he and she, with their gender constraints, can potentially resolve with a wide number of candidate antecedents.

BABAR demonstrates that using contextual roles is an effective way to improve the performance of pronominal resolutions, and this is the second major contribution of the work.

Contribution 2: Automated coreference resolution can be improved by using contextual knowledge.

Previous knowledge used for coreference resolution largely focused on the semantics of the anaphor, syntactic constraints, agreement, recency and lexical repetition. Contextual roles represent a new source of knowledge for coreference resolution because they capture how the anaphor (and antecedent) participate in an event or relationship. Chapter 4 defined contextual roles in detail, described how they are acquired, and detailed four distinct ways to apply them. I demonstrated that contextual roles do improve coreference resolution by showing that adding contextual role knowledge to BABAR improved its performance over a version that used only general knowledge sources and semantic information. In terrorism, contextual role knowledge boosted recall on all anaphors from 46% to 53%, while pronominal resolutions increased from 50% recall to 63% recall. In natural disasters, recall improved on all anaphors from 42% to 51%, while the recall of pronouns increased from 42% to 57%. In some of these cases, precision was reduced, but the F-Measure of all tests was comparable or increased with the inclusion of contextual roles, showing that any loss in precision was compensated for by an increase in recall.

BABAR also presents a model for acquiring contextual role knowledge in an unsupervised manner. Most modern coreference resolvers acquire their rules or initial parameter values by learning from anaphors that are marked with their antecedents in an annotated corpus. Retraining these resolvers on new domains requires annotating a new training set. BABAR's acquisition of knowledge is driven by a set of reliable case resolutions—cases of anaphors and their antecedents that are identified in a corpus of texts without human intervention. This increases BABAR's portability and reduces the cost of implementation.

Finally, this document also demonstrates that the Weighted Dempster-Shafer model of evidence improves BABAR's precision. With the four contextual role knowledge sources and seven general knowledge sources, the model needs a mechanism to weigh the evidence contributions from each knowledge source appropriately. Some of these knowledge sources contribute negative evidence while others generate values that may be shared among a set of candidate antecedents. Dempster-Shafer provides an elegant way to represent both types of evidence. Above I detailed the Weighted Dempster-Shafer method, and I showed that it increased BABAR's precision over a collection of alternative voting-based decision algorithms. Increasing precision scores is important when considering BABAR as an element of a larger NLP system. In these environments, incorrect resolutions can cause errors in the larger system, invalidating decisions that are based on the resolutions.

Limitations

Although BABAR demonstrated performance improvements in two distinct text corpora, I found that the domain-specificity of those corpora had a non-trivial impact on BABAR's behavior. In addition to experiments with the terrorism and natural disasters domain, I applied BABAR to a third corpus which generated more modest results, showing only minimal improvement in resolution performance.

The third corpus consisted of a relatively large collection of general newswire texts, a combination of 16,000 Reuters news articles and 2,400 Wall Street Journal articles. No subject restriction was applied to the articles, so the corpus contained a broad range of subjects. Although the size of the training corpus was larger than either terrorism or natural disasters, I found that the contextual role knowledge learned in the general news corpus was thinly spread among a large number of contextual roles. Hand evaluation of the contextual role knowledge bases showed that valuable relationships had been learned, but the frequencies of individual relationships were so low compared to the total, that it was impossible to distinguish the meaningful relationships from noise.

Consequently, this experience suggests that BABAR is likely to work best on domain-specific corpora. There are several factors at play in choosing an appropriate domain and corpus:

The event-oriented nature of the text. BABAR's caseframes are typically driven by relationships based on actions or events. Language that is less action-oriented is often not captured by caseframes, so BABAR's ability to learn is limited.

The repetition of events. Even when caseframes apply to particular language usage, if individual caseframes do not occur with enough frequency, the log likelihood calculations will be unable to distinguish them from noise.

The repetition of vocabulary. If the training corpus has little or no repetition of vocabulary, the lexical and semantic expectations of caseframes will be difficult to acquire.

Future Work

While BABAR answers the questions I initially posed regarding nonanaphoric definite NPs and contextual roles, its development has led to a number of new research questions.

Above I defined several types of nonanaphoric, or existential, definite NPs. BABAR directly addresses independent existential NPs, but it has no ability to specifically identify associative existential NPs. An associative existential NP is one that has no antecedent in the text but is introduced as part of a document's context. For example, in an article that describes a football game, the reader might encounter the score, the bleachers, the home team, and the goal line. These NPs do not require an explicit antecedent, and the reader understands their meaning because they are all associated elements of a football game. Continued improvement to the precision of definite NP coreference resolution will require a method for addressing such associative existential NPs.

Another issue focuses on contextual roles. BABAR showed that contextual role knowledge improved resolution, and it demonstrated four distinct methods of applying contextual role knowledge. Of the four methods, CFNet—which identifies contextual roles that are related—applies the least often. This happens because it is the only one of the four contextual role knowledge sources that is driven entirely by reliable case resolutions of pairs of NPs (which therefore represent pairs of contextual roles). The number of reliable case resolutions is much smaller than the number of contextual roles surrounding individual NPs, which drive the other three knowledge sources. Increasing the number of training cases should improve CFNet, and there are likely two approaches that may help.

First, are there other reliable case resolutions that BABAR is not identifying? BABAR implements three techniques for identifying reliable case resolutions—lexical repetition of existential definite NPs, proper noun repetition, and a set of heuristics that look for syntactic constraints. Other techniques may exist. For example, the proper name recognizer does not know that company names may be repeated as acronyms or stock ticker symbols.

Second, could one leverage other existing sources of knowledge to expand the contextual role network? For example, in the terrorism texts, CFNet does not learn that there is synonymy among the actions of finding, uncovering, and discovering, because not enough reliable case resolutions share these actions. Yet, these are verbs that a thesaurus should be able to suggest as synonyms. Depending on the domain, groupings that a thesaurus encodes can be overly broad (e.g., verbs of movement). Levin, however, has published a more granular taxonomy of verbs that may be appropriate for this purpose [Lev93].

The semantics involved in extending contextual roles are relatively shallow. Semantic expectations revolve around a set of twenty semantic classes while the main source of semantic knowledge, WordNet, contains thousands of more granular semantic classes. Even with this shallow approach, the semantics of nouns and expectations for nouns demonstrates positive results. It seems reasonable that extending caseframes around semantically similar actions in the same way will also deliver gains.

The behavior of contextual role knowledge in BABAR poses another research question. Pronominal anaphors clearly benefited from contextual role knowledge with increased recall rates accompanied by negligible losses in precision. Definite noun phrase anaphors, however, saw only modest gains in recall and suffered comparatively larger precision drops with the inclusion of contextual role knowledge. With the exception of the scoping knowledge source, BABAR applies its knowledge sources to each anaphor type in the same way. Are there qualities of definite NP anaphors that should be incorporated into how contextual role knowledge is applied to them specifically? In general, could BABAR's performance improve if it weighed evidence in different ways for different types of anaphors?

Finally, BABAR's approximation of contextual roles presents opportunities for improvement. Specifically, BABAR attempts to translate the extracted elements of Autoslog caseframes to thematic roles. This translation is primarily based on recognizing differences in the active vs. passive voice, and it addresses only agent and patient thematic roles. No recognition of other thematic roles (e.g., instrument, theme, beneficiary, etc.) or action-specific roles (e.g., victim, perpetrator, etc.) is performed. It seems likely that BABAR's distinguishing power would increase with improved contextual role understanding.

Implementations

The methods and techniques above may be implemented through computer hardware or through computer software as desired. They may be carried out as methods or processes. The capability to carry out such methods and techniques may be embodied into computer hardware or software as a system or part of a system and transferred to users for later use.

Incorporation

The dissertation submitted to the faculty of The University of Utah entitled "ACQUISITION AND APPLICATION OF CONTEXTUAL ROLE KNOWLEDGE FOR COREFERENCE RESOLUTION" authored by David L. Bean in partial fulfillment of the requirements for the degree of Doctor of Philosophy in Computer Science, School of Computing The University of Utah, and dated May, 2004 is hereby incorporated by reference in its entirety.

While methods and systems have been described and illustrated in conjunction with a number of specific embodiments herein, those skilled in the art will appreciate that variations and modifications may be made without departing from the principles herein illustrated, described, and claimed. The present invention, as defined by the appended claims, may be embodied in other specific forms without departing from its spirit or essential characteristics. The specifics herein are to be considered in all respects as only illustrative, and not restrictive. All changes which come within the meaning and range of equivalency of the claims are to be embraced within their scope.

I claim:

1. A method for associating anaphors with antecedents in a written work, the method comprising:

processing a training corpus containing textual documents that are topically related to the written work, said processing producing interpretive information useful to categorize noun phrases of the training corpus as independent or potentially anaphoric;

identifying noun phrases within the written work;

using the interpretive information, filtering those identified noun phrases to exclude noun phrases that can be identified to be independent in nature;

identifying a set of potentially anaphoric noun phrases occurring in the written work;

following said identifying a set of potentially anaphoric noun phrases, recognizing cases of unambiguous coreferences in the set of potentially anaphoric noun phrases, said recognizing associating a noun phrase with an antecedent for each case;

following said recognizing, identifying coreference combinations for unrecognized noun phrases from the set of potentially anaphoric noun phrases, each coreference combination including an unrecognized noun phrase and a potential antecedent;

applying a plurality of general knowledge sources and contextual role knowledge sources to the coreference combinations, wherein the contextual role knowledge sources include events and a manner of participation in the events to identify relatedness for the coreference combination at a thematic role level, the contextual role knowledge sources including lexical expectations and semantic expectations to resolve the coreference combination by comparing the lexical expectations and the semantic expectations of the coreference combination to the antecedent, said applying producing evidentiary values for the coreference combinations;

applying a factor to each of the produced evidentiary values to favor more credible knowledge sources;

for each unrecognized noun phrase, applying a probabilistic model to the produced evidentiary values associated with the noun phrase; and for each application of the probabilistic model to an unrecognized noun phrase, selecting either an antecedent for that unrecognized noun phrase, if the coreference of that antecedent has a corresponding evidentiary value above a selected threshold value, or no antecedent otherwise.

2. A method according to claim 1, further comprising the step of filtering definite noun phrases that are restrictively modified from the same sentence.

3. A method according to claim 1, wherein said applying a plurality of knowledge sources applies at least two knowledge sources selected from the group of a gender agreement knowledge source, a number agreement knowledge source, a semantic agreement knowledge source, a scoping knowledge source, a syntactic role knowledge source, and a recency knowledge source.

4. A method according to claim 1, wherein the probabilistic model applied to the produced evidentiary values is a Dempster-Shafer Model.

5. A method according to claim 1, further comprising the step of collapsing an anaphoric chain into a single candidate.

6. A method according to claim 1, wherein said recognizing cases of unambiguous coreferences applies a set of syntactic heuristics.

7. A method according to claim 1, wherein said recognizing cases of unambiguous coreferences recognizes repeated proper nouns.

8. A method according to claim 1, further comprising the step of recognizing and filtering pleonastic noun phrases from the identified noun phrases.

9. The method as recited in claim 1, wherein events and a manner of participation in the events to identify relatedness for the coreference combinations include one or more of:

synonymy that identifies synonymous roles between contextual roles;

sequence that identifies sequentially related contextual roles;

set membership that includes a contextual roles that are performed by a noun phrase;

a thematic role associated with the event;

a combination of a predicate and an argument relation that identifies roles of possession, property, or condition.

10. A method for associating anaphors with antecedents in a written work, comprising the steps of:

processing a training corpus containing textual documents that are topically related to the written work, said processing producing interpretive information useful to categorize noun phrases of the training corpus as independent or potentially anaphoric, said processing producing a definite-only list of definite noun phrases, said processing optionally producing 81 extractions of noun phrases from the first sentences of texts comprising the training corpus, said processing further optionally producing existential head patterns, wherein said interpretive information includes the definite-only list of definite noun phrases and optionally the produced 81 extractions or the existential head patterns;

identifying noun phrases within the written work;

using the interpretive information, filtering those identified noun phrases to exclude noun phrases that can be identified to be independent in nature, said filtering using the produced definite-only list to exclude definite noun phrases;

identifying a set of potentially anaphoric noun phrases occurring in the written work;

following said identifying a set of potentially anaphoric noun phrases, recognizing cases of unambiguous coreferences in the set of potentially anaphoric noun phrases, said recognizing associating a noun phrase with an antecedent for each case;

following said recognizing, identifying coreference combinations for unrecognized noun phrases from the set of potentially anaphoric noun phrases, each coreference combination including an unrecognized noun phrase and a potential antecedent;

applying a plurality of general knowledge sources and contextual role knowledge sources to the coreference combinations, said applying producing evidentiary values for the coreference combinations, wherein the contextual role knowledge sources include events and a manner of participation in the events that identifies relatedness for the coreference combinations at a thematic role level and wherein the events and manner of participation in the events of the contextual role knowledge sources include lexical expectations and semantic expectations to resolve the coreference combination by comparing the lexical expectations and the semantic expectations of the coreference combination to the antecedent;

applying a factor to each of the produced evidentiary values to favor more credible knowledge sources;

for each unrecognized noun phrase, applying a Dempster-Shafer model to the produced evidentiary values associated with the noun phrase; and for each application of the model to an unrecognized noun phrase, selecting either an antecedent for that unrecognized noun phrase, if the coreference of that antecedent has a corresponding evidentiary value above a selected threshold value, or no antecedent otherwise.

11. A method according to claim 10, further comprising the step of filtering definite noun phrases that are restrictively modified from the same sentence.

12. A method according to claim 10, wherein said applying a plurality of knowledge sources applies at least two knowledge sources selected from the group of a gender agreement knowledge source, a number agreement knowledge source, a semantic agreement knowledge source, a scoping knowledge source, a syntactic role knowledge source, and a recency knowledge source.

13. A method according to claim 10, further comprising the step of collapsing an anaphoric chain into a single candidate.

14. A method for associating anaphors with antecedents in a written work, comprising the steps of:

processing a training corpus containing textual documents that are topically related to the written work, said processing producing interpretive information useful to categorize noun phrases of the training corpus as independent or potentially anaphoric;

processing the training corpus to extract a set of thematic caseframes;

identifying noun phrases within the written work;

using the interpretive information, filtering those identified noun phrases to exclude noun phrases that can be identified to be independent in nature;

identifying a set of potentially anaphoric noun phrases occurring in the written work;

following said identifying a set of potentially anaphoric noun phrases, recognizing cases of unambiguous coreferences in the set of potentially anaphoric noun phrases, said recognizing associating a noun phrase with an antecedent for each case;

following said recognizing, identifying coreference combinations for unrecognized noun phrases from the set of potentially anaphoric noun phrases, each coreference combination including an unrecognized noun phrase and a potential antecedent;

applying a plurality of general knowledge sources and a contextual role knowledge source to the coreference combinations, said applying producing evidentiary values for the coreference combinations, wherein the contextual knowledge sources apply extracted thematic caseframes that identify relatedness between the noun phrase and potential antecedent in each coreference combination at a thematic role level and wherein the contextual role knowledge sources include lexical expectations and semantic expectations to resolve the coreference combination by comparing the lexical expectations and the semantic expectations of the coreference combination to the antecedent;

applying a factor to each of the produced evidentiary values to favor more credible knowledge sources;

for each unrecognized noun phrase, applying a probabilistic model to the produced evidentiary values associated with the noun phrase; and for each application of the probabilistic model to an unrecognized noun phrase, selecting either an antecedent for that unrecognized noun phrase, if the coreference of that antecedent has a corresponding evidentiary value above a selected threshold value, or no antecedent otherwise.

15. A method according to claim 14, further comprising the step of constructing at least one of a caseframe lexical expectations knowledge base, a caseframe semantic expectations knowledge base, or a caseframe network knowledge base for caseframe co-occurrence relationships; and wherein the constructed knowledge base is one of the plurality of knowledge sources applied to coreference combinations.

16. A method according to claim 14, further comprising the step of constructing a caseframe lexical expectations knowledge base, a caseframe semantic expectations knowledge base, and a caseframe network knowledge base for caseframe co-occurrence relationships; and wherein said applying a plurality of knowledge sources applies the caseframe lexical expectations knowledge base, caseframe semantic expectations knowledge base, and caseframe network knowledge base.

17. A method according to claim 14, further comprising the steps of:

constructing a caseframe lexical expectations knowledge base;

following said recognizing cases of unambiguous coreferences, identifying thematic caseframes for noun phrases of unambiguous coreferences; and expanding the caseframe lexical expectation knowledge base to register identified thematic caseframes for the noun phrases of unambiguous coreferences.

18. A method according to claim 14, further comprising the step of discarding thematic caseframes that occur at a low frequency.

19. A set of computer readable media containing computer instructions for operating a anaphor-antecedent associator, the set of computer readable media comprising at least one medium upon which is stored the computer instructions executable by a computing system to achieve the functions of:

(i) processing a training corpus containing textual documents that are topically related to the written work, said processing producing interpretive information useful to categorize noun phrases of the training corpus as independent or potentially anaphoric;

(ii) identifying noun phrases within the written work;

(iii) using the interpretive information, filtering those identified noun phrases to exclude noun phrases that can be identified to be independent in nature;

(iv) identifying a set of potentially anaphoric noun phrases occurring in the written work;

(v) following said identifying a set of potentially anaphoric noun phrases, recognizing cases of unambiguous coreferences in the set of potentially anaphoric noun phrases, said recognizing associating a noun phrase with an antecedent for each case;

(vi) following said recognizing, identifying coreference combinations for unrecognized noun phrases from the set of potentially anaphoric noun phrases, each coreference combination including an unrecognized noun phrase and a potential antecedent;

(vii) applying knowledge sources including a plurality of general knowledge sources and contextual role knowledge sources to the coreference combinations, wherein the contextual role knowledge sources include events and a manner of participation in the events to identify relatedness for the coreference combination at a thematic role level, the contextual role knowledge sources including lexical expectations and semantic expectations to resolve the coreference combination by comparing the lexical expectations and the semantic expectations of the coreference combination to the antecedent, said applying producing evidentiary values for the coreference combinations;

(viii) applying a factor to each of the produced evidentiary values to favor more credible knowledge sources;

(ix) for each unrecognized noun phrase, applying a probabilistic model to the produced evidentiary values associated with the noun phrase; and (x) for each application of the probabilistic model to an unrecognized noun phrase, selecting either an antecedent for that unrecognized noun phrase, if the coreference of that antecedent has a corresponding evidentiary value above a selected threshold value, or no antecedent otherwise.

* * * * *

UNITED STATES PATENT AND TRADEMARK OFFICE

CERTIFICATE OF CORRECTION

PATENT NO. : 7,813,916 B2
APPLICATION NO. : 10/994196
DATED : October 12, 2010
INVENTOR(S) : David L. Bean It is certified that error appears in the above-identified patent and that said Letters Patent is hereby corrected as shown below:

In the Specification,

Column 1, line 12, insert the following funding clause: --"This invention was made with government support under IRI9704240 and IRI9509820 awarded by the National Science Foundation. The government has certain rights in the invention."--

Signed and Sealed this
Twenty-ninth Day of December, 2015

Michelle K. Lee
*Director of the United States Patent and Trademark Office*